US008220224B2

(12) United States Patent
Ishiwatari et al.

(10) Patent No.: US 8,220,224 B2
(45) Date of Patent: Jul. 17, 2012

(54) MEDICINE SUPPLY APPARATUS

(75) Inventors: Hitoshi Ishiwatari, Gunma (JP); Shinya Uema, Gunma (JP); Manabu Haraguchi, Gunma (JP); Koichi Kobayashi, Gunma (JP); Shigeyuki Nakamura, Gunma (JP)

(73) Assignees: Sanyo Electric Co., Ltd., Osaka (JP); Sanyo Electric Biomedical Co., Ltd., Osaka (JP)

( * ) Notice: Subject to any disclaimer, the term of this patent is extended or adjusted under 35 U.S.C. 154(b) by 0 days.

(21) Appl. No.: 12/646,932

(22) Filed: Dec. 23, 2009

(65) Prior Publication Data

US 2010/0100231 A1 Apr. 22, 2010

Related U.S. Application Data

(62) Division of application No. 10/505,307, filed as application No. PCT/JP03/01844 on Feb. 20, 2003, now Pat. No. 7,637,078.

(30) Foreign Application Priority Data

Feb. 20, 2002 (JP) .................................. 2002-42598
Feb. 20, 2002 (JP) .................................. 2002-42626
Feb. 20, 2002 (JP) .................................. 2002-42649
Feb. 20, 2002 (JP) .................................. 2002-42653

(51) Int. Cl.
*B65B 57/00* (2006.01)
*G06F 17/00* (2006.01)

(52) U.S. Cl. ................................ 53/52; 53/168; 53/493

(58) Field of Classification Search ................ 53/52, 55, 53/168, 493, 495; 221/2, 5, 9, 10, 13, 129, 221/197, 123, 71, 133, 131; 700/242, 237, 700/232, 236, 244

See application file for complete search history.

(56) References Cited

U.S. PATENT DOCUMENTS 3,737,749 A 6/1973 Schmit
4,091,600 A 5/1978 Itoh (Continued)

FOREIGN PATENT DOCUMENTS

CN 489045 6/2002

(Continued)

OTHER PUBLICATIONS

May 31, 2011 Non-Final Office Action issued by the U.S. Patent Office in co-pending divisional U.S. Appl. No. 12/646,943.

(Continued)

*Primary Examiner* — Hemant M Desai
(74) *Attorney, Agent, or Firm* — Dorsey & Whitney LLP

(57) ABSTRACT

A medicine supply apparatus which comprises, in a case accommodating section 8, a plurality of tablet cases 3 for accommodating medicine and charges or supplies medicine into a bag 72, which medicine has been discharged from each tablet case 3 based on a prescription. An identification code 26 is provided for each of the tablet cases 3 and read by an optical sensor 33 provided inside the case accommodating section 8, whereby discharge of medicine is controlled. A motor 14 for driving a discharge drum for the tablet case 3 is checked for disconnection by being regularly energized. The operating time and the frequency of operation of parts that wear out, such as the motors, are stored for use in failure prediction. Time slots in which medicine should be taken are printed, each in a different color, by a color printing mechanism 73 on the bag 72 into which medicine is charged.

17 Claims, 43 Drawing Sheets

U.S. PATENT DOCUMENTS

| | | | | |
|---|---|---|---|---|
| 4,243,920 | A | 1/1981 | Brehm | |
| 4,362,000 | A | 12/1982 | Poore | |
| 4,406,981 | A | 9/1983 | Watanabe | |
| 4,573,606 | A | 3/1986 | Lewis et al. | |
| 4,647,232 | A | 3/1987 | Costa | |
| 4,695,175 | A | 9/1987 | Tsukada et al. | |
| 4,761,593 | A | 8/1988 | Nakase | |
| 4,763,810 | A | 8/1988 | Christiansen | |
| 5,269,120 | A | 12/1993 | Holmes | |
| 5,348,061 | A * | 9/1994 | Riley et al. | 141/104 |
| 5,522,512 | A | 6/1996 | Archer et al. | |
| 5,551,218 | A | 9/1996 | Henderson et al. | |
| 5,593,267 | A * | 1/1997 | McDonald et al. | 414/273 |
| 5,597,995 | A | 1/1997 | Williams et al. | |
| 5,638,657 | A | 6/1997 | Archer et al. | |
| 5,671,592 | A * | 9/1997 | Yuyama et al. | 53/493 |
| 5,679,070 | A | 10/1997 | Ishida et al. | |
| 5,709,063 | A | 1/1998 | Yuyama et al. | |
| 5,720,154 | A | 2/1998 | Lasher et al. | |
| 5,857,308 | A | 1/1999 | Dismore et al. | |
| 5,897,024 | A * | 4/1999 | Coughlin et al. | 221/135 |
| 5,907,493 | A | 5/1999 | Boyer et al. | |
| 5,998,894 | A | 12/1999 | Raad | |
| 6,152,621 | A | 11/2000 | Langan | |
| 6,317,648 | B1 | 11/2001 | Sleep et al. | |
| 6,343,711 | B1 * | 2/2002 | Coughlin | 221/217 |
| 6,349,848 | B1 | 2/2002 | Uema et al. | |
| 6,421,584 | B1 * | 7/2002 | Norberg et al. | 700/242 |
| 6,688,346 | B2 | 2/2004 | Brahier et al. | |
| 6,728,610 | B1 | 4/2004 | Marshall et al. | |
| 6,742,671 | B2 * | 6/2004 | Hebron et al. | 221/9 |
| 7,040,077 | B2 * | 5/2006 | Yasuoka et al. | 53/493 |
| 7,228,198 | B2 * | 6/2007 | Vollm et al. | 700/235 |
| 7,283,919 | B2 * | 10/2007 | Gross et al. | 702/118 |
| 7,289,879 | B2 * | 10/2007 | William et al. | 700/235 |
| 7,293,672 | B2 | 11/2007 | Mori et al. | |
| 7,637,078 | B2 | 12/2009 | Ishiwatari et al. | |
| 7,747,345 | B2 | 6/2010 | Ohmura et al. | |
| 7,946,406 | B2 | 5/2011 | Blake et al. | |
| 2001/0032109 | A1 | 10/2001 | Gonyea et al. | |
| 2007/0185614 | A1 * | 8/2007 | Bain | 700/232 |

FOREIGN PATENT DOCUMENTS

| | | |
|---|---|---|
| EP | 1 179 475 | 2/2002 |
| JP | 57 005282 Y | 2/1982 |
| JP | 60-082130 | 5/1985 |
| JP | 03-41208 | 6/1991 |
| JP | 03-218201 | 9/1991 |
| JP | 05-016929 | 1/1993 |
| JP | 8-119202 | 5/1996 |
| JP | 11-314620 | 11/1999 |
| JP | 2000-103404 | 4/2000 |
| JP | 2000-142602 | 5/2000 |
| JP | 2001-130504 | 5/2001 |
| WO | WO 03/070575 | 8/2003 |

OTHER PUBLICATIONS

Jun. 16, 2011 Non-Final Office Action issued by the U.S. Patent Office in co-pending divisional U.S. Appl. No. 12/646,946.

European Search Report issued Sep. 20, 2011 by the European Patent Office for corresponding foreign application No. EP03703352.9, pp. 1-6 (Sep. 20, 2011).

Final Office Action dated Dec. 19, 2011 issued by the United States Patent Office for corresponding divisional utility U.S. Appl. No. 12/646,946, pp. 1-9 (Dec. 19, 2011).

Filed response to Oct. 12, 2011 Final Office Action in co-pending divisional U.S. Appl. No. 12/646,943, pp. 1-7 (Jan. 12, 2012).

Filed Amendment in reply to May 31, 2011 Non-Final Office Action in co-pending divisional U.S. Appl. No. 12/646,943, pp. 1-7.

Oct. 12, 2011 Final Office Action issued by the U.S. Patent Office in co-pending divisional U.S. Appl. No. 12/646,943, pp. 1-10.

Filed Amendment in reply to Non-Final Office Action dated Jun. 16, 2011 in copending divisional U.S. Appl. No. 12/646,946.

* cited by examiner

MEDICINE SUPPLY APPARATUS

This application is a divisional application of Ser. No. 10/505,307 filed Jun. 13, 2005, now U.S. Pat. No. 7,637,078, which is a national phase filing of International Application No. PCT/JP2003/01844 filed Feb. 20, 2003, which claims the benefit of Japanese patent application Serial Nos. JP2002-42653, JP2002-42649, JP2002-42626 and JP2002-42598 filed Feb. 20, 2002, the entire contents of which are incorporated herein by this reference.

BACKGROUND OF THE INVENTION

1. Field of the Invention

The present invention relates to a medicine supply apparatus that is placed at hospitals and pharmacies and supplies the designated number of medicines accommodated within tablet cases into a container (a bottle or a bag) in accordance with a prescription.

2. Description of the Related Art

In hospitals and pharmacies, a medicine supply apparatus such as one disclosed in, for example, Japanese Utility Model Application Publication (JP-Y) No. 57-5282 (B65B1/30) has been conventionally used to provide medicines prescribed by doctors to patients. In accordance with such a system, the designated number of medicines (tablets, capsules and the like) described in a prescription are discharged one by one from discharge drums (referred to as aligning boards in JP-Y No. 57-5282) within tablet cases. The discharged medicines are collected in a hopper through a chute and then packaged in packaging paper or bottled in a bottle.

Such a medicine supply apparatus is provided with a plurality of tablet cases and control for discharging medicine from each of the tablet cases is performed. In accordance with such control for discharging medicine, it is necessary that a tablet case accommodating medicine corresponding to a prescription is specified and a discharge drum or the like for the corresponding tablet case is rotated.

In such case, there has been conventionally utilized a method in which a memory which stores data for identifying the corresponding tablet case is mounted to a circuit board for the tablet case, electric wirings are connected to the tablet case to read the data, and the resultant data is used for control. In accordance with such a conventional method, however, the electric circuit for the tablet case becomes complicated, and costs are increased. Further, the electric wirings must be connected to a case accommodating section every time that tablet cases are exchanged. Thus, improvements for such drawbacks have been desired.

When medicine is discharged from the tablet case, a discharge drum for discharging the medicine one by one is rotated. If a motor for driving this discharge drum is disconnected, however, medicine cannot be discharged. Various causes of inability to discharge medicine may be considered, such as the case in which there is no medicine within a tablet case and the case in which medicine is clogged within the tablet case.

Such situations can be detected by visually checking tablet cases. However, disconnection of motors cannot be determined visually. Thus, there arises the problem in which it takes a long time to specify causes of failure and perform maintenance for corresponding parts.

Medicine is discharged from a tablet case by driving a discharge drum with a motor. A shutter for temporarily receiving medicine may be provided between a chute and a hopper. Such shutter is driven to be opened/closed by a solenoid. Further, when medicine is packaged in packaging paper, the paper is thermally sealed by a thermal sealing device and a time slot in which medicine should be taken is usually printed onto the packaging paper by a printer.

The aforementioned motor, solenoid, thermal sealing device and printer are parts that wear out and thus have their own durability limits. If such parts are broken, supply of medicine may be stopped.

A name of a patient taking the medicine and a time slot in which the medicine should be taken (before a meal or after a meal) are printed by a printer onto packaging paper or the like into which the medicine is charged. Pharmacists at pharmacies usually draw lines on the packaging paper with marking inks, especially for aged patients so that they can distinguish by colors the time slots in which medicine should be taken. This requires work by human hand, and further, errors may occur, resulting in confusion.

SUMMARY OF THE INVENTION

The present invention was developed in order to solve the above-described conventional technical drawbacks, and an object of the invention is to provide a medicine supply apparatus that realizes simplification of exchanging of tablet cases and of a structure of the apparatus itself.

In order to accomplish the aforementioned object, in accordance with a first aspect of the invention, there is provided a medicine supply apparatus which comprises a plurality of tablet cases for accommodating medicines and a case accommodating section for accommodating the plurality of tablet cases and which selects a tablet case accommodating a designated medicine, takes the medicine out of the tablet case, and charges the same into a container. The medicine supply apparatus comprises an identifier that is provided at each of the tablet cases and indicates identification information for the tablet case, and a reader for reading, in a non-contact manner, the identification information indicated by the identifiers for the tablet cases provided within the case accommodating section. Selection of the tablet case accommodating the designated medicine is controlled on the basis of the identification information read by the reader. The medicine supply apparatus further comprises a control device for controlling discharge of medicine from tablet cases on the basis of the identification information read by the reader.

In accordance with a more preferred aspect, the medicine supply apparatus further comprises an information output device. The control device outputs information about exchange of tablet cases to the information output device on the basis of the identification information read by the reader. The information about exchange of tablet cases includes information indicating medicines to be accommodated within the case accommodating section. Further, the information about exchange of tablet cases preferably includes information for indicating the accommodated positions of the tablet cases accommodating medicines which are not designated among the tablet cases accommodated within the case accommodating section, as exchangeable medicines. The information output device is usually a display device.

The identifier may be an optically readable identification code provided on the surface of each of the tablet cases, and the reader may be an optical sensor for reading the identification code.

Namely, the medicine supply apparatus of the above-described aspects comprises a plurality of tablet cases for accommodating medicines provided within a case accommodating section of a main body, a chute through which medicines discharged from the tablet cases pass, a hopper provided below the chute, and a charging device for charging medicines received by the hopper into a container such as a bag or a bottle. The medicine supply apparatus comprises identification means that is provided at each of the tablet cases and has identification information for identifying the tablet case, and a reader for reading, in a non-contact manner, the identification information in the identification means for the tablet cases provided within the case accommodating section.

In accordance with a more preferred aspect, the medicine supply apparatus comprises control means to which the reader (reading means) is connected. The control means identifies each of the tablet cases on the basis of the identification information read by the reader and controls discharge of medicine from each of the tablet cases.

The control means provided in the medicine supply apparatus outputs instruction information about exchanges of tablet cases on the basis of the identification information read by the reader.

In accordance with the above-described aspects of the medicine supply apparatus, the identification means is an optically readable identification code provided on the surface of each of the tablet cases, and the reader is an optical sensor for reading the identification code.

In accordance with the above-described aspects of the invention, the medicine supply apparatus comprises a plurality of tablet cases for accommodating medicines, provided within a case accommodating section of a main body, a chute through which medicines discharged from the tablet cases pass, a hopper provided below the chute, and a charging device for charging medicines received by the hopper into a container such as a bag or a bottle. The medicine supply apparatus comprises identification means (or an identifier) that is provided at each of the tablet cases and has identification information for identifying the tablet case, and a reader for reading, in a non-contact manner, the identification information in the identification means for the tablet cases provided within the case accommodating section. The control means (or control device) may identify each of the tablet cases on the basis of the identification information read by the reader and control selection of medicine from the tablet cases.

The operation for detaching electric wirings when exchanging tablet cases becomes unnecessary, and thus operational performance is significantly improved.

The control means (control device) may output instruction information about exchanges of tablet cases on the basis of the identification information read by the reader. For example, in the case of charging a plurality types of medicines into a package, exchangeable tablet cases may be designated when medicines that should be charged do not exist within the case accommodating section. Thus, it is possible to prevent the tablet cases accommodating medicines that should be charged into the package from being removed. As a result, convenience is significantly improved.

Further, the identification means (identifier) may be an optically readable identification code provided on the surface of each of the tablet cases, and the reader may be an optical sensor for reading the identification code. As a result, an electric circuit for the tablet cases can be simplified, and a significant reduction in costs can be realized.

In accordance with a second aspect of the invention, there is provided a medicine supply apparatus that is capable of reliably detecting disconnection of a motor for driving a discharge drum for a tablet case and rapidly handling such failure.

In accordance with the second aspect of the invention, there is provided a medicine supply apparatus which comprises a plurality of tablet cases for accommodating medicines and discharges a designated medicine from a selected tablet case. The medicine supply apparatus comprises a plurality of tablet cases, each of which includes an accommodating container for medicine, a discharging device for discharging medicine from the accommodating container by a discharging operation, and a drive motor which is coupled to the discharging device so as to be driven and rotated in a predetermined direction to make the discharging device perform the discharging operation, and a control device for controlling rotation of the driving motors. The control device has an abnormality detection mode in which at least one of the driving motors is driven for a predetermined period of time which is shorter than a time required for the motor to be rotated for discharging medicine, an energized current for the motor is measured, and an abnormality of the motor is detected on the basis of a measured value. The discharging device is formed in a substantial drum configuration and medicine is discharged by the driving motor being rotated in the predetermine direction.

Abnormality of the motor includes disconnection of motor. The abnormality detection mode comprises a forward rotation mode in which the discharging device is rotated in a predetermine direction and a reverse rotation mode in which the discharging device is rotated in a direction opposite to the predetermined direction, and the reverse rotation mode precedes the forward rotation mode. The control device preferably performs the abnormality detection mode for a plurality of driving motors in turn.

The medicine supply apparatus further comprises a display device, and the control device controls the display device to display information indicating driving motors in which abnormalities are detected in the abnormality detection mode.

Namely, the medicine supply apparatus comprises a plurality of tablet cases, each of which includes an accommodating container for accommodating medicine, a discharge drum for discharging medicine from the accommodating container, and a motor for driving the discharge drum, and a control device for rotating the motors forward to discharge medicine. The control device performs an abnormality detection operation in which a motor is rotated in reverse for a predetermined period of time which is sufficiently shorter than a time required for medicine to be discharged and then rotated forward for the predetermined period of time, and determines disconnection of the motor on the basis of an energized current for the motor during the abnormality detection operation.

In accordance with the above-described aspects, the control device performs the abnormality detection operation for a plurality of tablet cases in turn.

In accordance with the above-described aspects, there is provided a medicine supply apparatus which comprises a plurality of tablet cases, each of which includes an accommodating container for accommodating medicine, a discharge drum (discharging device) for discharging medicine from the accommodating container, and a motor for driving the discharge drum, and a control device for rotating forward the motors to discharge medicine. The control device performs an abnormality detection operation (abnormality detection mode) in which a motor is rotated in reverse for a predetermined period of time which is sufficiently shorter than a time interval during which medicine is discharged and then rotated forward for the predetermined period of time, and determines disconnection of a motor on the basis of an energized current for the motor during the abnormality detection operation. Thus, disconnection failure of motor can be reliably detected, and maintenance for such a motor can be rapidly performed.

As the time interval for reverse rotation and forward rotation in the abnormality detection operation is sufficiently shorter than the time interval during which medicine is discharged, medicine cannot be discharged by mistake. Further, as a motor is firstly rotated in reverse, even if the next medicine, with respect to the previous discharge operation, is on the verge of being discharged, the medicine cannot be discharged by mistake.

In accordance with a preferred aspect, the control device in the medicine supply apparatus performs the abnormality detection operation for a plurality of tablet cases in turn. Thus, even if a plurality of tablet cases are provided, disconnection failures of motors corresponding to the tablet cases can be detected smoothly.

A third aspect of the invention is provided in order to minimize the drawback in which supply of medicine is delayed because of failures of operating elements such as parts that wear out used in the medicine supply apparatus.

In accordance with the third aspect of the invention, there is provided a medicine supply apparatus which comprises a plurality of tablet cases for accommodating medicines, and which discharges medicine from a selected tablet case and charges the medicine into a packaging container to supply the medicine. The medicine supply apparatus comprises a plurality of operating elements operated by being energized, a control device for controlling the operations of the operating elements and a storage medium for storing durability limit values for the operating elements. The control device stores data indicating the operating time or the frequency of operation for operating elements in the storage medium.

The data includes a cumulative value for the operating time or the frequency of operation of an operating element from when the operating element started to be used. Alternatively, the control device calculates a cumulative value from the data. The medicine supply apparatus comprises a diagnostic mode. In the diagnostic mode, the control device compares, with respect to at least one operating element, its durability limit value and its cumulative value and performs a predetermined failure prediction operation on the basis of the result of comparison.

The medicine supply apparatus comprises a display device. The control device controls the display device to display, on the basis of the result of the comparison, an operating element whose cumulative value has reached a predetermined value determined based on its durability limit value.

Each of the tablet cases includes a driving motor for discharging medicine accommodated therein, and the operating element may include the driving motor. The medicine supply apparatus further comprises a shutter for temporarily holding medicines discharged from tablet cases, prior to being accommodated in a packaging container, and the operating element may include the shutter. Further, the medicine supply apparatus comprises a thermal sealing device for sealing a packaging container into which medicine is charged, and the operating element may include the thermal sealing device. The medicine supply apparatus further comprises a print mechanism for printing predetermined items onto a packaging container, and the operating element may include the print mechanism.

Namely, the medicine supply apparatus of the above-described aspects comprises a plurality of tablet cases for accommodating medicines, provided within a main body, a chute through which medicines discharged from the tablet cases pass, a hopper provided below the chute, and a charging device for charging medicines received by the hopper into a container such as a bag or a bottle. The medicine supply apparatus comprises a control device for adding up the operating time or the frequency of operation for each of the parts that wear out provided within the main body. If the operating time or the frequency of operation for a part that wears out approximates a predetermined durability limit or reaches the same, the control device performs a predetermined failure prediction operation.

In accordance with a preferred aspect of the medicine supply apparatus, the part that wears out is a motor for driving a drum for discharging medicine from a tablet case.

In accordance with a preferred aspect, the part that wears out is a shutter that is capable of being freely opened/closed in order to temporarily receive medicine that falls into the hopper though the chute.

In accordance with a preferred aspect, the part that wears out is a thermal sealing device for packaging paper, provided in the charging device.

In accordance with a preferred aspect, the part that wears out is a printer for packaging paper, provided in the charging device.

In accordance with the above-described aspects of the invention, there is provided a medicine supply apparatus which comprises a plurality of tablet cases for accommodating medicines, provided within a main body, a chute through which medicines discharged from the tablet cases pass, a hopper provided below the chute, and a charging device for charging medicines received by the hopper into a container such as a bag or a bottle. The medicine supply apparatus comprises a control device for adding up the operating time or the frequency of operation for each of the parts that wear out (operating elements) provided within the main body. If the operating time or the frequency of operation for a part that wears out approximates a predetermined durability limit or reaches the same, the control device performs a predetermined failure prediction operation. Thus, if a part that wears out such as a motor for driving a drum, a shutter, a thermal sealing device for packaging paper, or a printer for packaging paper, approximates its durability limit value or reaches the same, a user is informed of failure prediction, and the user is asked to perform maintenance for the corresponding part that wears out such as exchanging of the part.

As a result, it is possible to exchange such parts that wear out before they are broken and to prevent stoppage of medicine supply by failures.

In accordance with a fourth aspect of the invention, there is provided a medicine supply apparatus that is capable of simply printing information such as how to take medicine provided to patients onto a container or a label for the container.

In accordance with the fourth aspect of the invention, there is provided a medicine supply apparatus which comprises a plurality of tablet cases for accommodating medicines, discharges medicine from a selected tablet case, and charges the medicine into a packaging container to supply the medicine. The medicine supply apparatus comprises a printing mechanism provided so as to print predetermined items about medicine to be charged into a packaging container onto the packaging container. The printing mechanism is capable of printing with two or more different colors. The packaging container has a label attached thereto and the print mechanism prints predetermined items on the label.

The print mechanism may comprise ink ribbons holding thermal transfer ink material and print by heating the ink ribbons to transfer the ink material.

The predetermined items preferably include indication of time slots in which medicine charged into a packaging container should be taken. Further, the print mechanism prints the time slots in which medicine should be taken with different colors for each of the time slots.

Namely, the medicine supply apparatus comprises a plurality of tablet cases for accommodating medicines and charges medicines discharged from the tablet cases into a container such as a bag or a bottle. The medicine supply apparatus comprises a printer for printing on a container or a label for the container. The printer has the function of color printing.

In accordance with a preferred aspect, the printer that the medicine supply apparatus includes performs thermal transfer by color ink ribbons onto a container or a label for the container.

In accordance with another preferred aspect of the medicine supply apparatus, the printer prints the time slots in which medicine should be taken with different colors.

In accordance with the above-described aspects, there is provided a medicine supply apparatus which comprises a plurality of tablet cases for accommodating medicines and charges medicines discharged from the tablet cases into a container such as a bag or a bottle. The medicine supply apparatus comprises a printer for printing on a container or a label for the container, and the printer has the function of color printing. For example, the time slots in which medicine should be taken may be printed by color ink ribbons with different colors. Thus, how to take medicine can be easily indicated with different colors and convenience is significantly improved.

DESCRIPTION OF THE PREFERRED EMBODIMENTS

Figure 1:
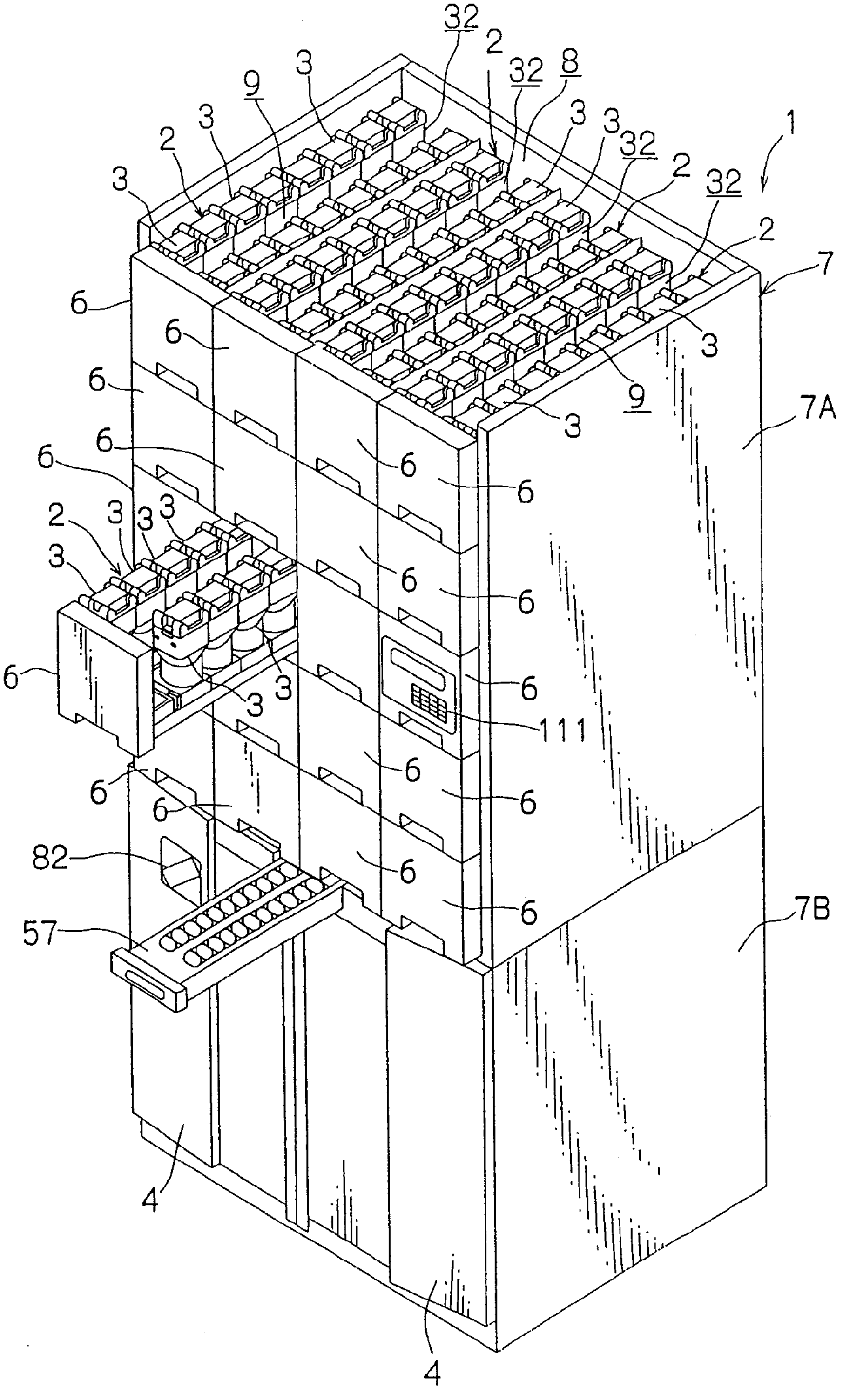
FIG. 1 is a perspective view of a medicine supply apparatus according to an embodiment of the present invention (with a top roof removed).
Figure 2:
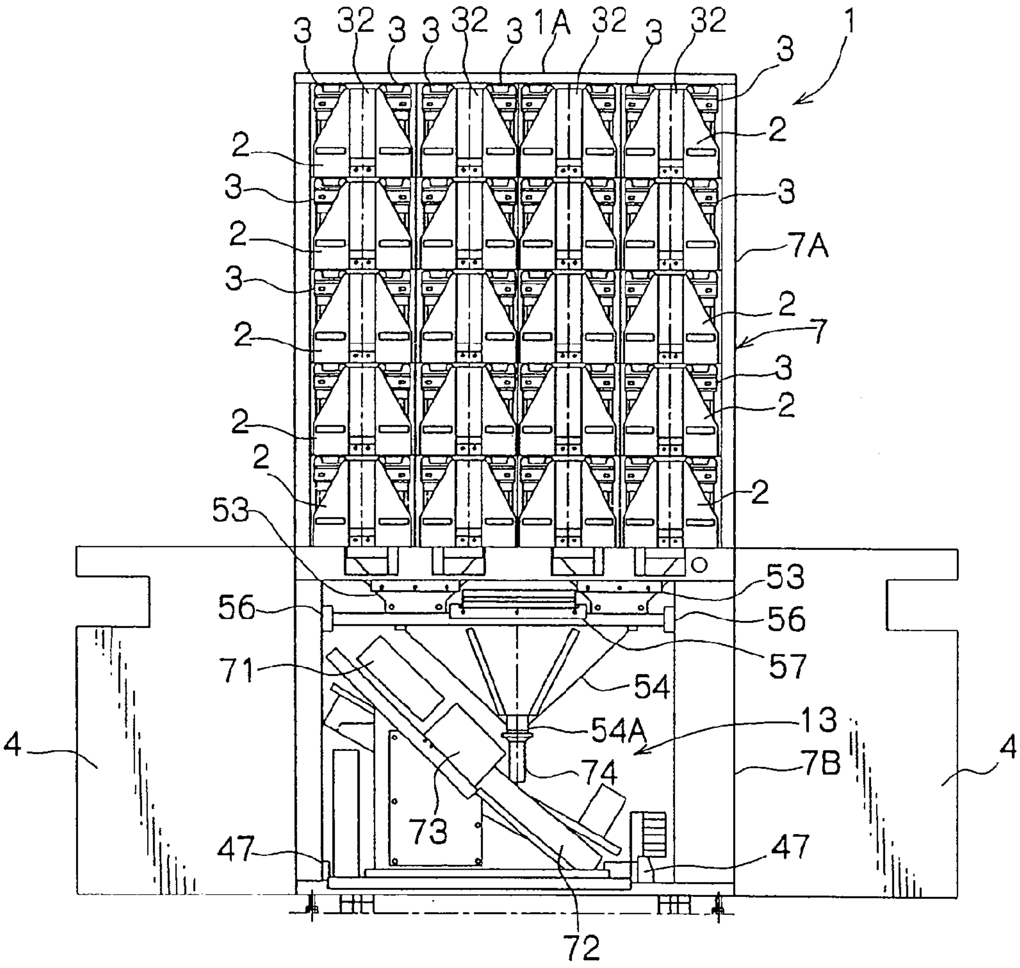
FIG. 2 is a front view of the medicine supply apparatus shown in FIG. 1 with door panels of shelves removed and lower panels opened.
Figure 3:
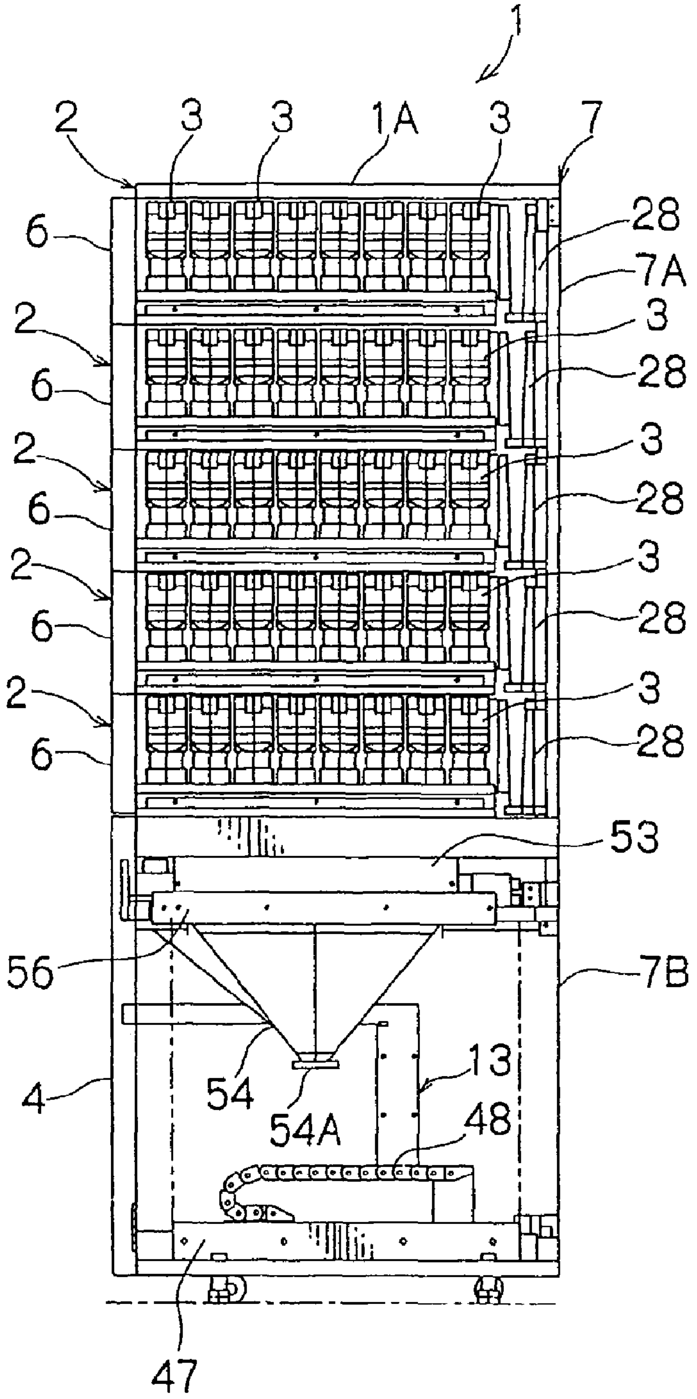
FIG. 3 is a vertical sectional view of the medicine supply apparatus shown in FIG. 1.
Figure 4:
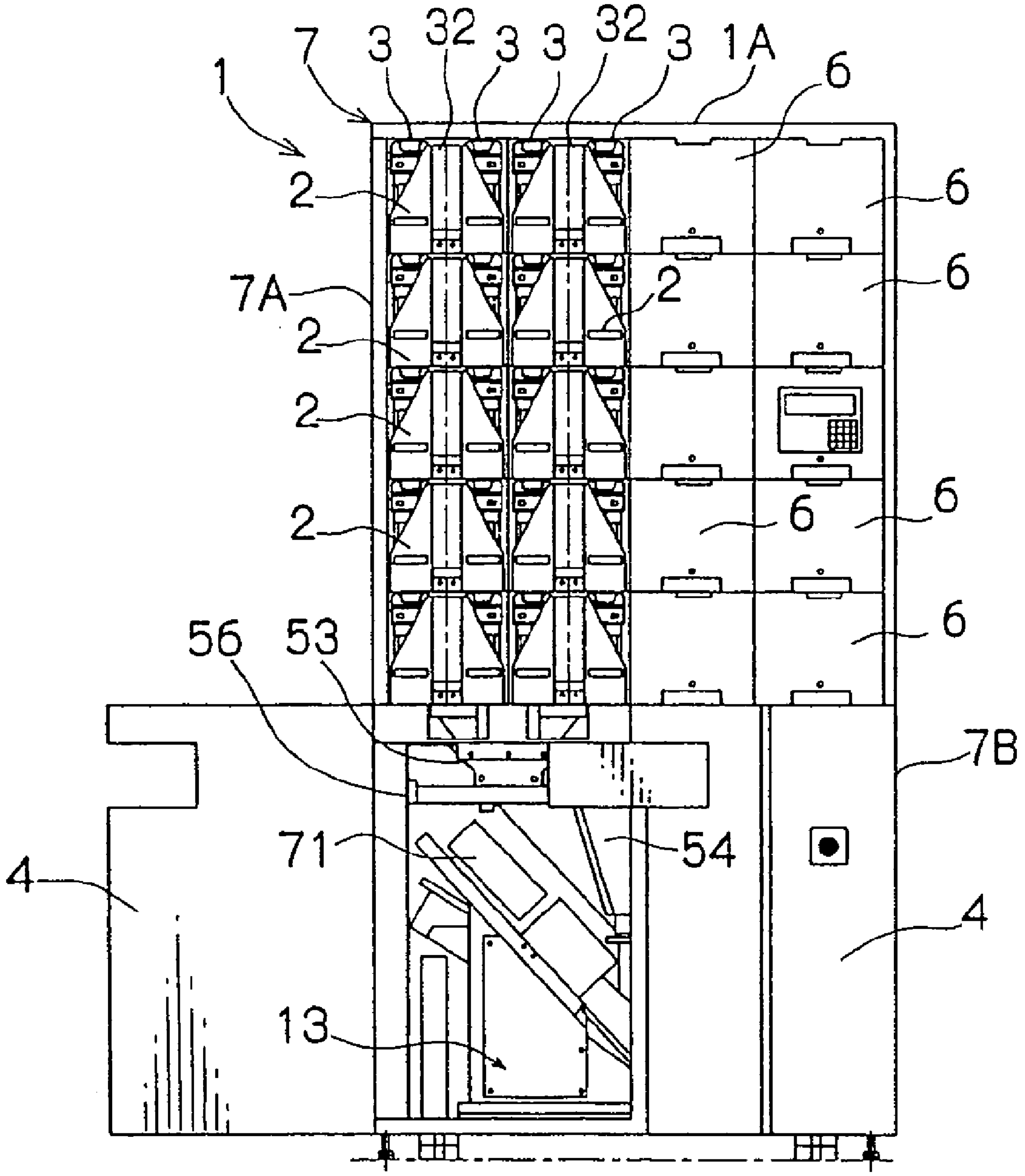
FIG. 4 is another front view of the medicine supply apparatus shown in FIG. 1.
Figure 5:
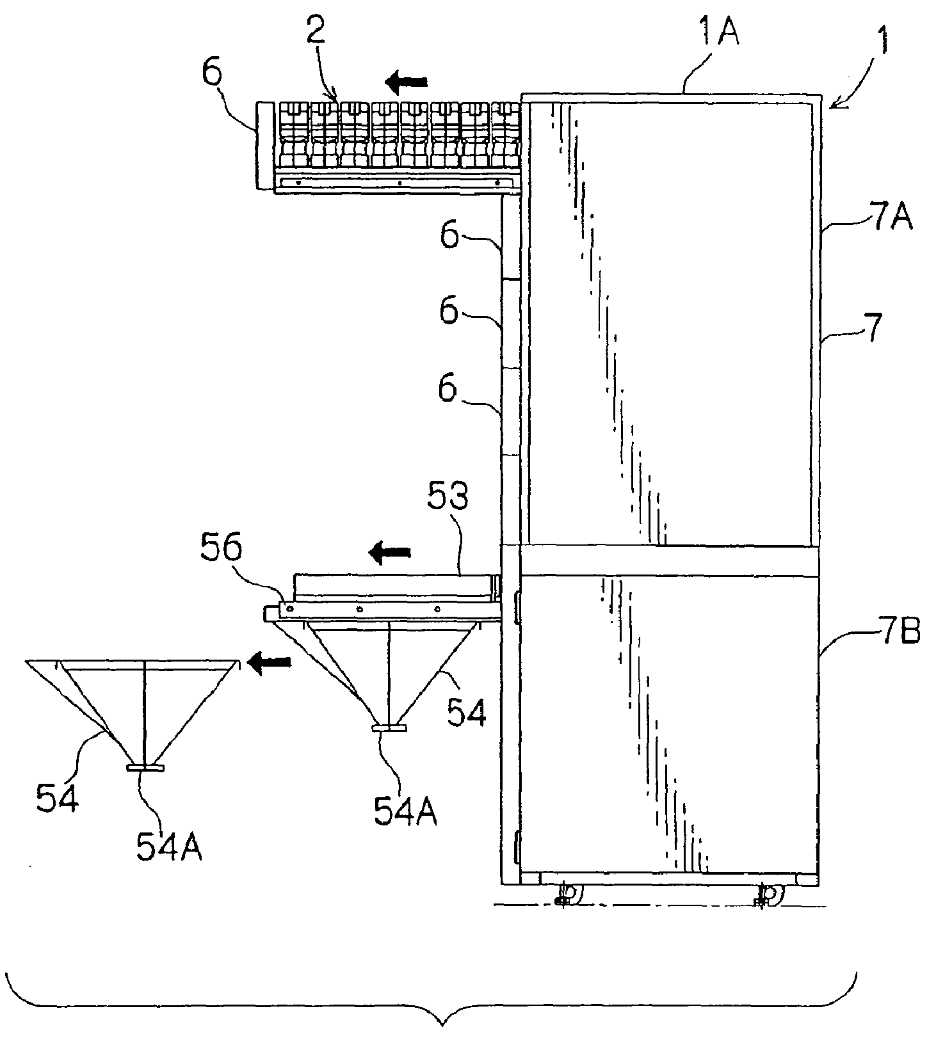
FIG. 5 is a side view of the medicine supply apparatus shown in FIG. 1.
Figure 6:
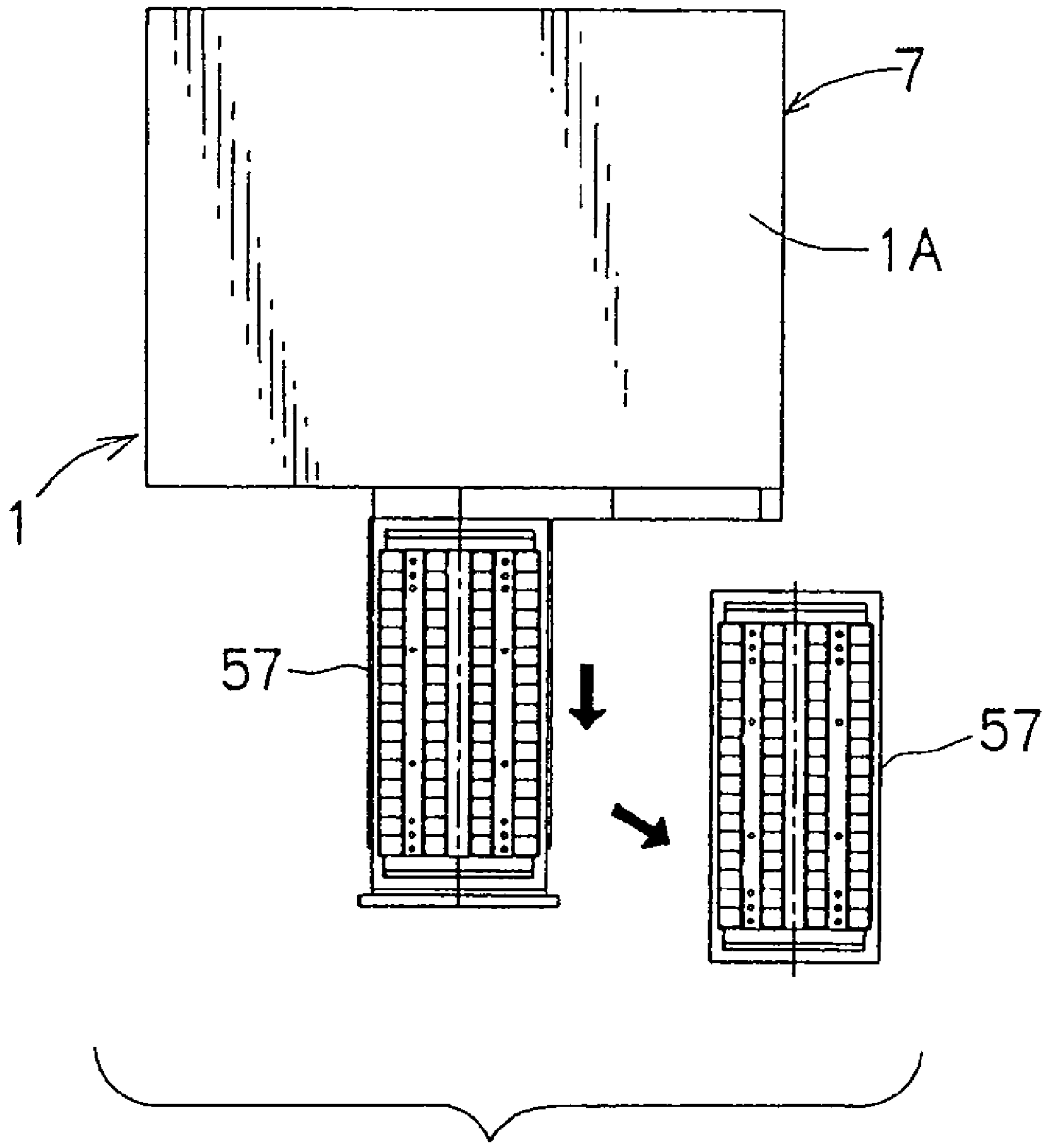
FIG. 6 is a plan view of the medicine supply apparatus shown in FIG. 1 illustrating a state in which an additional medicine feeder is drawn out.
Figure 7:
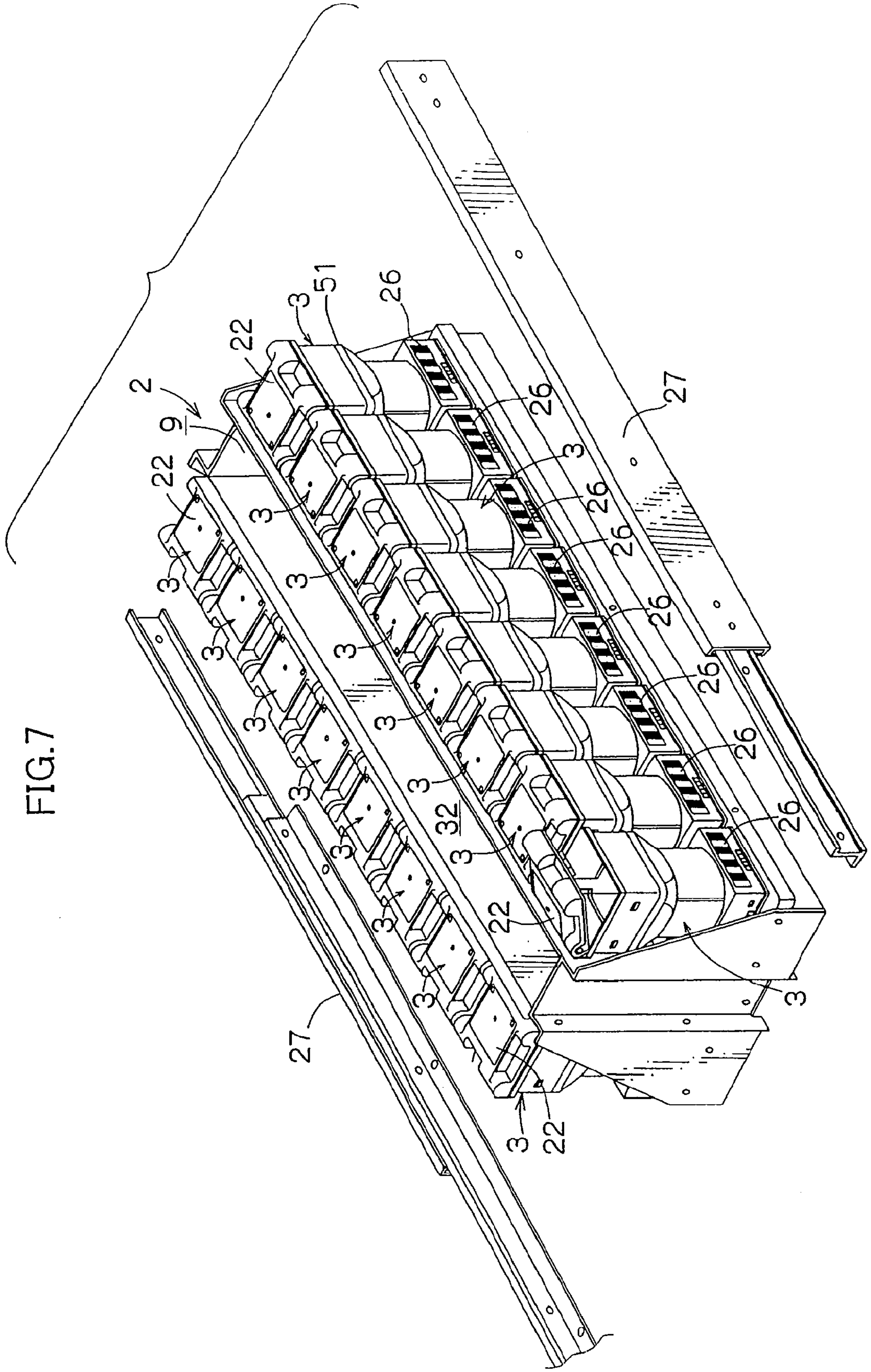
FIG. 7 is a perspective view of a shelf of the medicine supply apparatus shown in FIG. 1.
Figure 8:
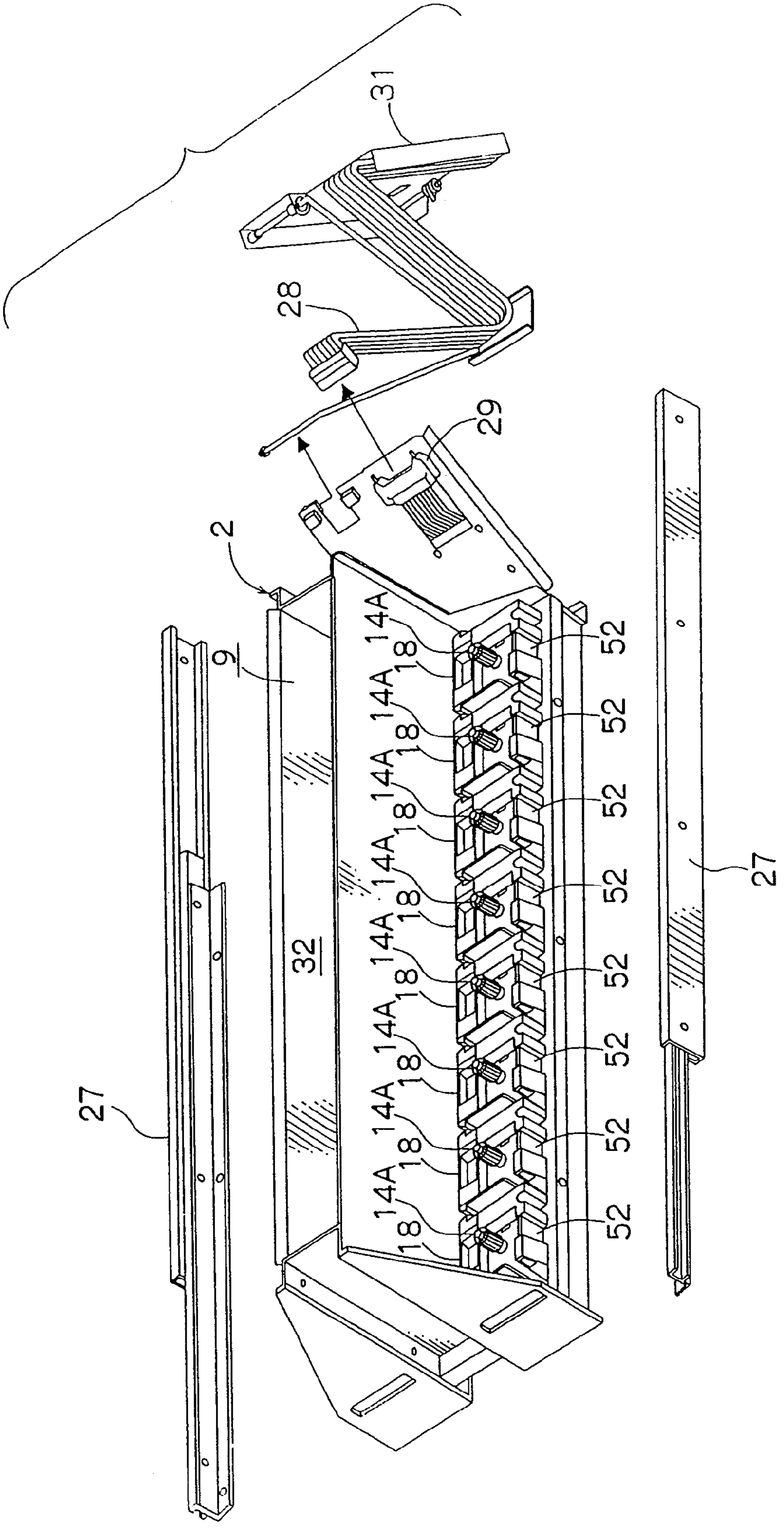
FIG. 8 is a perspective view of the shelf shown in FIG. 7 with accommodating containers of tablet cases removed.
Figure 9:
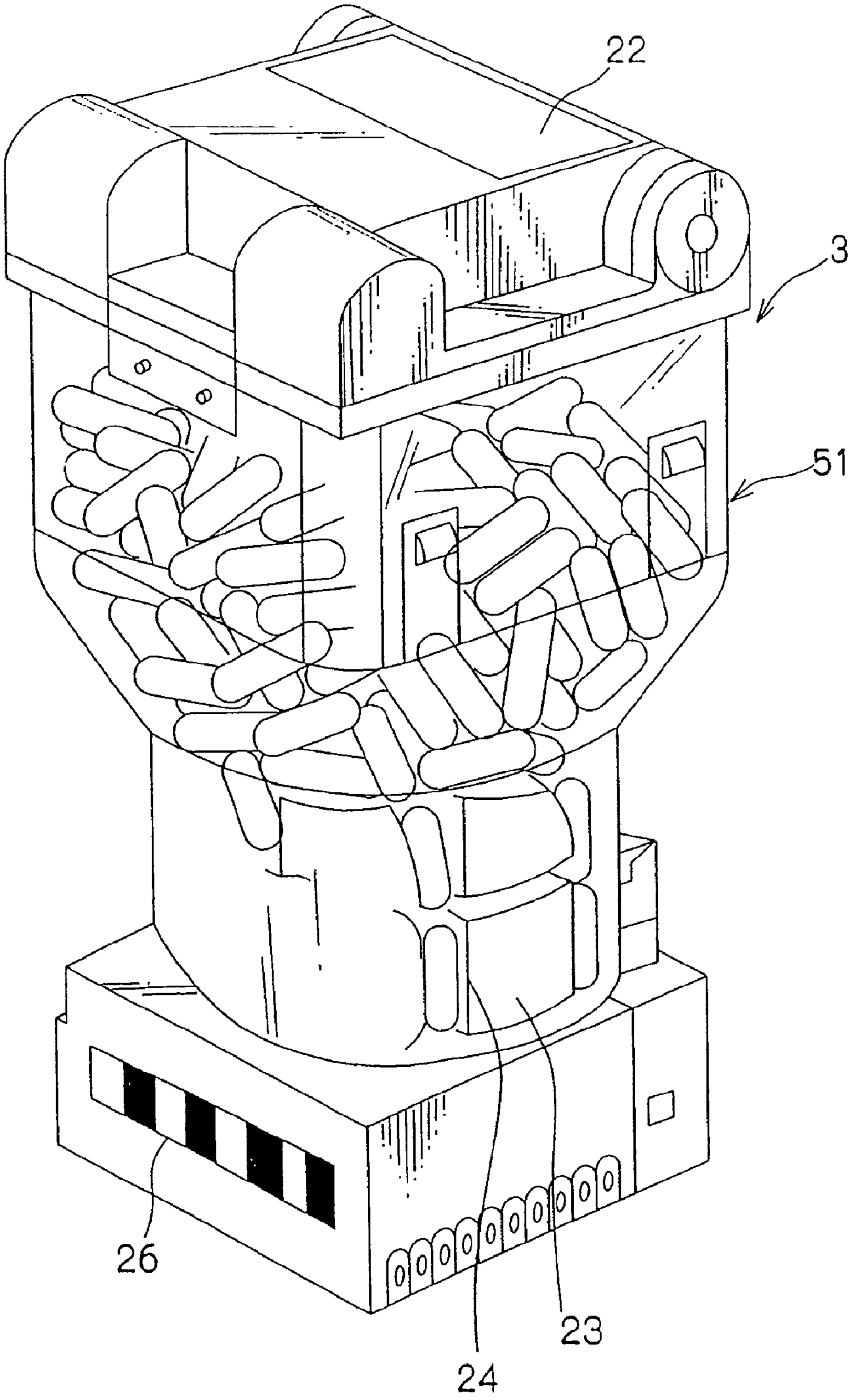
FIG. 9 is a perspective view of an accommodating container of a tablet case of the medicine supply apparatus shown in FIG. 1.
Figure 10:
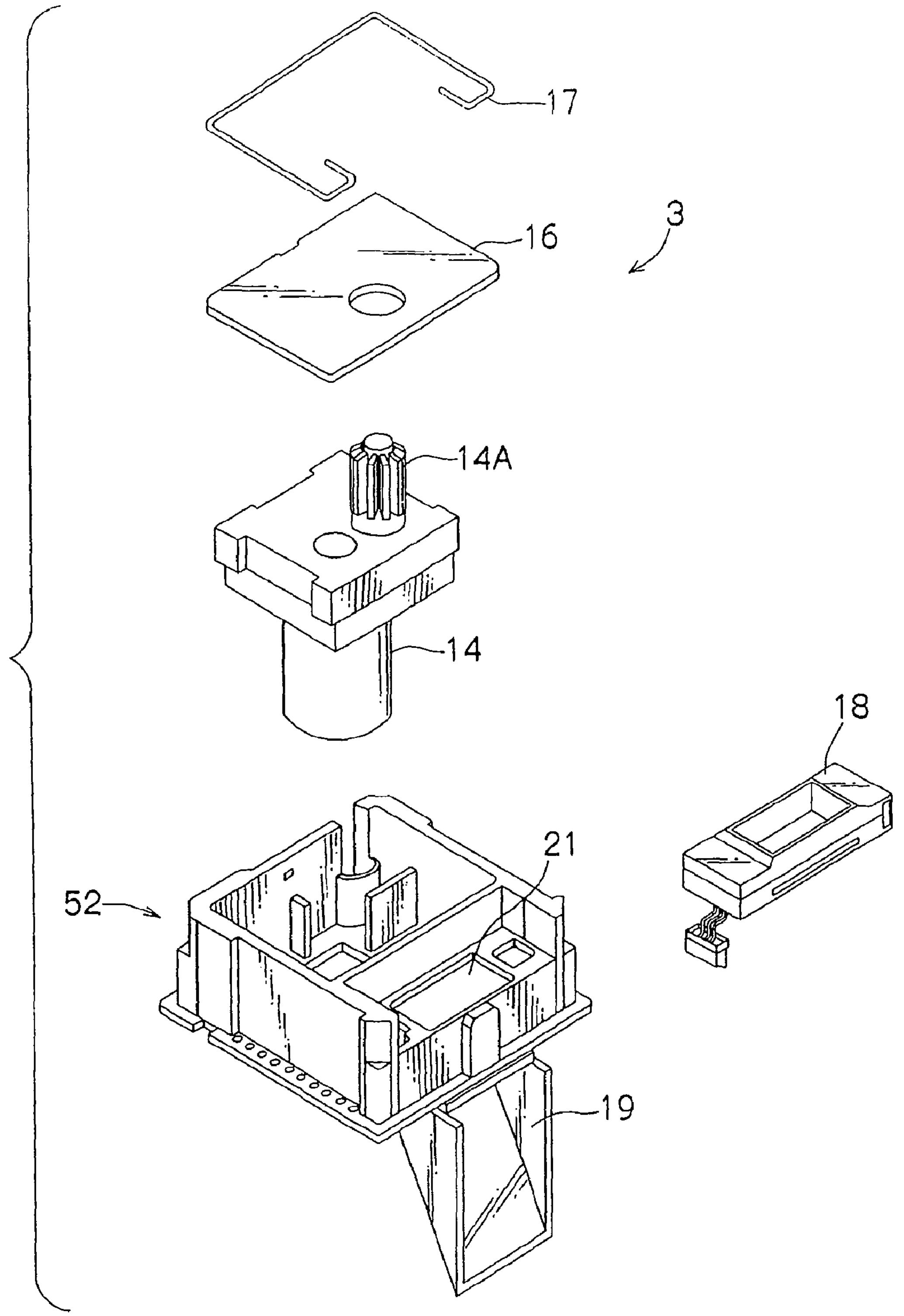
FIG. 10 is an exploded perspective view of a driving base of a tablet case of the medicine supply apparatus shown in FIG. 1.
Figure 11:
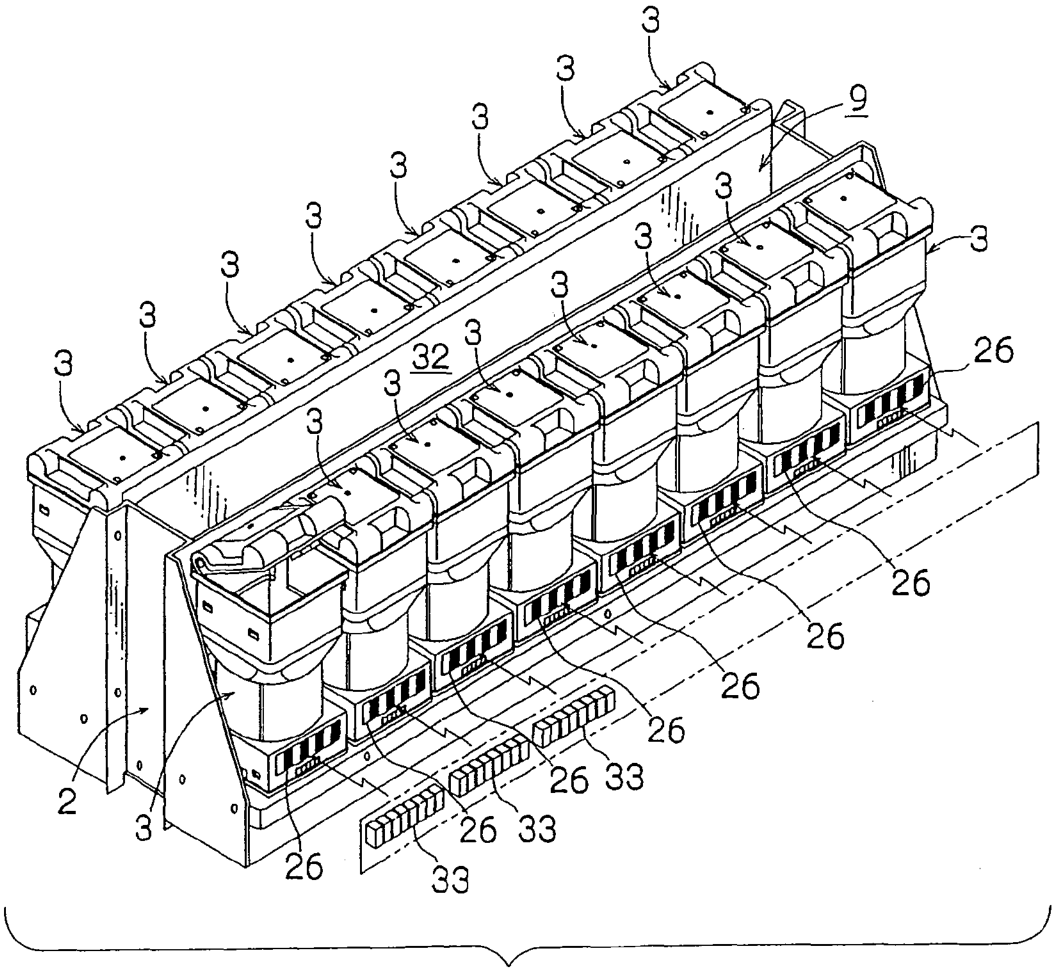
FIG. 11 is a perspective view of the shelf for accommodating the tablet cases and identification sensors in the medicine supply apparatus shown in FIG. 1.
Figure 12:
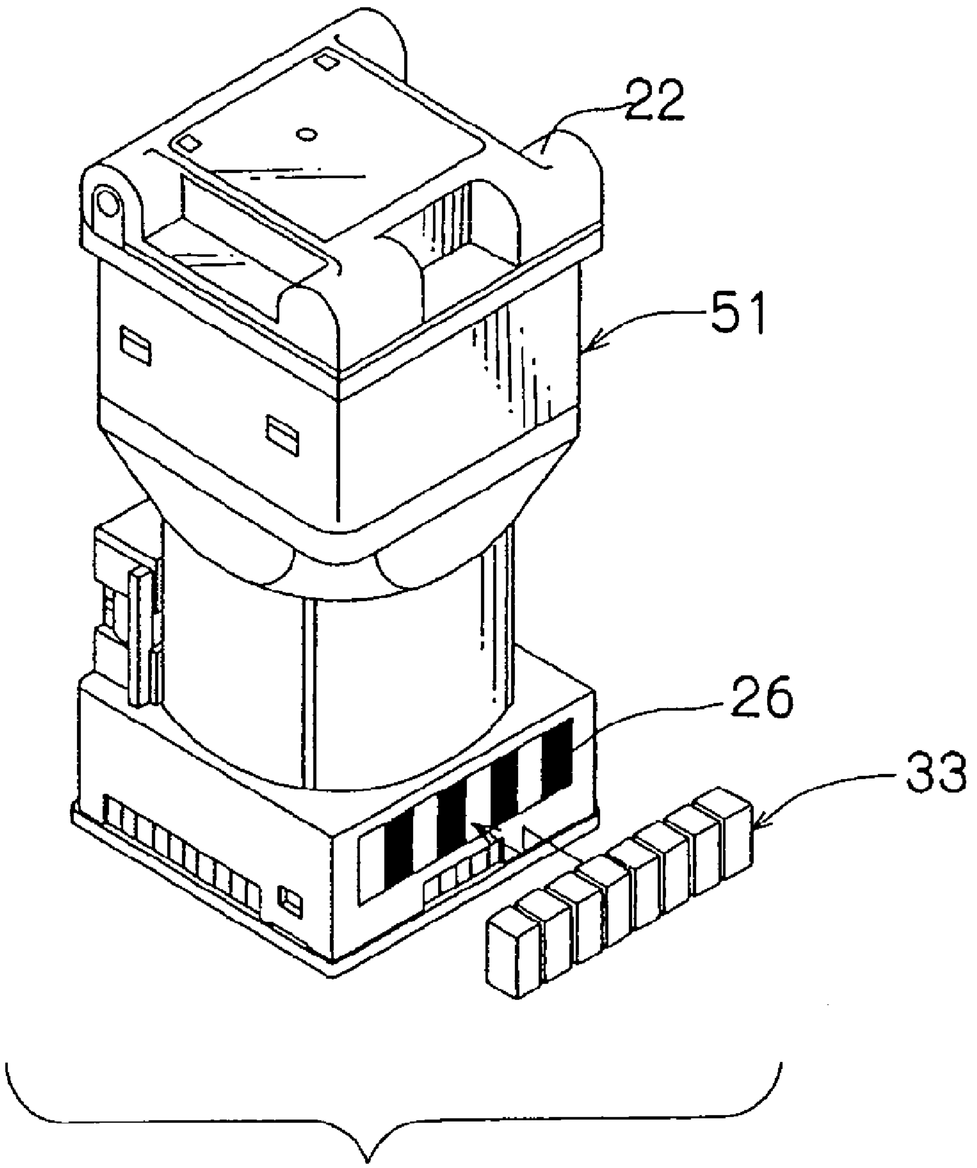
FIG. 12 is a perspective view of a tablet case and an identification sensor in the medicine supply apparatus shown in FIG. 1.

Embodiments of the present invention will be described hereinafter in detail with reference to the drawings. FIG. 1 is a perspective view of a medicine supply apparatus 1 according to an embodiment of the invention (with a top roof 1A being removed). FIG. 2 is a front view of the medicine supply apparatus 1 with door panels 6 of shelves 2 being removed and lower panels 4 being opened. FIG. 3 is a vertical sectional view of the medicine supply apparatus 1. FIG. 4 is another front view of the medicine supply apparatus 1. FIG. 5 is a side view of the medicine supply apparatus 1. FIG. 6 is a flat view of the medicine supply apparatus 1. FIG. 7 is a perspective view of the shelf 2. FIG. 8 is a perspective view of the shelf 2 with accommodating containers 51 of tablet cases 3 being removed. FIG. 9 is a perspective view of the accommodating container 51 of the tablet case 3. FIG. 10 is an exploded perspective view of a driving base 52 of the tablet case 3. FIG. 11 is a perspective view of the shelf 2 and identification sensors 33. FIG. 12 is a perspective view of the tablet case 3 and the identification sensor 33.

A medicine supply apparatus 1 of the invention is installed at hospitals and pharmacies and is formed of a main body 7 formed in a rectangular configuration with longer transverse sides and a personal computer PC for control to be described later (which structures control means). The main body 7 is formed of an upper structure 7A and a lower structure 7B that are capable of being separated from each other. The upper structure 7A is placed on the lower structure 7B and coupled thereto. A case accommodating section 8 with its front, top and bottom portions being opened for accommodating tablet cases 3 to be described later is formed within the upper structure 7A. The top surface of the case accommodating section 8 is closed by the detachable top roof 1A.

The front surface and the top surface of the lower structure 7B are opened. The lower structure 7B is communicated with the top structure 7A at its top surface. A packaging machine 13 or the like serving as a charging device to be described later is accommodated within the lower structure 7B and installed therein. The front opening of the lower structure 7B is closed by lower panels 4 which can freely open together on hinges.

Four columns and five rows (i.e., 20 in total) shelves 2 are placed within the case accommodating section 8 of the upper structure 7A. A door panel 6 is mounted to the front end of each of the shelves 2. In the state that all shelves 2 are accommodated within the case accommodating section 8, the door panels 6 close the front surface opening of the upper structure 7A (the case accommodating section 8). A path 9 with its top and bottom portions being opened is longitudinally formed at the central portion of the shelf 2. Eight driving bases 52 of the tablet cases 3 are respectively arranged at the right and left sides of the path 9 along the longitudinal direction thereof and mounted thereat (i.e., 16 driving bases 52 are mounted in total) (see FIGS. 7 and 8). The tablet case 3 is formed of the driving base 52 and an accommodating container 51 coupled thereon.

A drum motor (motor for driving drum) 14 formed of a DC (direct current) motor with brush serving as a motor for driving drum is accommodated from above within the driving base 52. The drum motor 14 is fixed to the driving base 52 by a cover 16 and a lock tool 17. In the state of the drum motor 14 being fixed, its drive shaft 14A protrudes upward from the cover 16 (see FIG. 10). An optical medicine detection sensor 18 is mounted to a discharge port 21 formed at the driving base 52. A discharge chute 19 extending downward at an incline from the discharge port 21 is formed at the portion of the driving base 52 below the medicine detection sensor 18 (see FIG. 10). The discharge chute 19 is communicated with the path 9 and opened toward the same.

The top surface of the accommodating container 51 of the tablet case 3 is opened. The opened top surface is closed by a lid 22 which can be freely opened/closed (see FIG. 9). A discharge drum 23 is mounted at the bottom portion within the accommodating container 51. A plurality of vertical grooves 24 are formed around the side surface of the discharge drum 23 with predetermined intervals being formed therebetween. Medicine is charged within the accommodating container 51 from its top surface opening (with the lid 22 being opened). Two pieces of medicines are entered within each of the vertical grooves 24 of the discharge drum 23. An identification code 26 as identification means (identifier) that can be optically identified (e.g., a barcode label or the like) is attached to the lower side surface of the tablet case 3. The identification code 26 is used for identifying the type of medicine charged within the accommodating container 51.

Such accommodating container 51 is mounted on the above-described driving base 52 and detachably coupled thereto. At this time, the tablet case 3 is mounted so that the identification code 26 faces the outer side of the shelf 2 (the side opposite to the path 9). In this way, the tablet case 3 is structured. The discharge drum 23 is detachably engaged with the drive shaft 14A of the drum motor 14. When the drum motor 14 is driven in forward, the discharge drum 23 is also rotated forward. Then, the vertical grooves 24 are successively engaged with the discharge port 21 of the driving base 52, so that pieces of medicines within the grooves pass into the discharge chute 19.

The medicine passing through the discharge port 21 is detected by the medicine detection sensor 18. The medicine passing through the discharge chute 19 is discharged into the path 9 of the shelf 2. If the accommodating container 51 becomes empty, the accommodating container 51 is removed from the driving base 52 and then is replenished with medicine.

The shelf 2 to which a plurality of tablet cases 3 are mounted as described above is detachably fixed by screws to a pair of drawing rails 27 mounted within the case accommodating section 8 of the upper structure 7A (see FIGS. 7 and 8). Thus, the shelf 2 and the plurality of tablet cases 3 mounted to the shelf 2 can be accommodated within the case accommodating section 8 so as to be freely drawn. Further, the drawn shelf 2 can be detached from the drawing rails 27 (see FIG. 5).

A harness 28 for energizing (supplying electricity to) the drum motors 14 for the tablet cases 3 and transmitting outputs from the medicine detection sensors 18 is detachably mounted via a connector 29 to the rear edge of the shelf 2. The harness 28 is longer than the distance the shelf 2 is drawn.

Further, the harness 28 is held by a wiring holding member 31 which is mounted to the upper structure 7A and can be folded and extended (see FIG. 8).

When the shelves 2 are accommodated within the case accommodating section 8, the paths 9 of the vertically placed shelves 2 correspond with each other. Thus, a series of vertically communicating chutes 32 are structured. Accordingly, in accordance with the embodiments, four vertically extending chutes 32 are formed within the case accommodating section 8. The shelves 2 capable of being drawn independently are vertically provided within the case accommodating section 8. Thus, when the accommodating container 51 for the tablet case 3 is exchanged, each of the shelves 2 can be drawn and then exchange is performed.

Thereby, as compared to the structure that vertically arranged shelves 2 are drawn at the same time, intervals between the vertically arranged shelves 2 for exchanging the accommodating containers 51 can be reduced. Thus, the number of tablet cases 3 accommodated within the case accommodating section 8 can be increased. The path 9 is formed at the central portion of the shelf 2 and the vertically extending chute 32 is formed in the state the vertically arranged shelves 2 are accommodated within the case accommodating section 8. Thus, as compared to the case chute is formed at the side portion of the shelf 2, intervals of the chutes 32 at the right and left sides can be reduced. Consequently, areas of top surface openings of shutters 53 and a hopper 54 can be reduced resulting in a compact apparatus.

A plurality of optical identification sensors 33 serving as readers (reading means) are mounted to the right and left side surfaces of the case accommodating section 8 of the upper structure 7A so as to correspond to the tablet cases 3 in the shelves 2 placed at the right and left sides (see FIGS. 11 and 12). The identification sensors 33 are disposed so as to correspond to the identification codes 26 of the tablet cases 3 in the shelves 2 at the sides of corresponding to the right and left sides of the case accommodating section 8, and used for reading information of the identification codes 26 in a non-contact manner.

Figure 13:
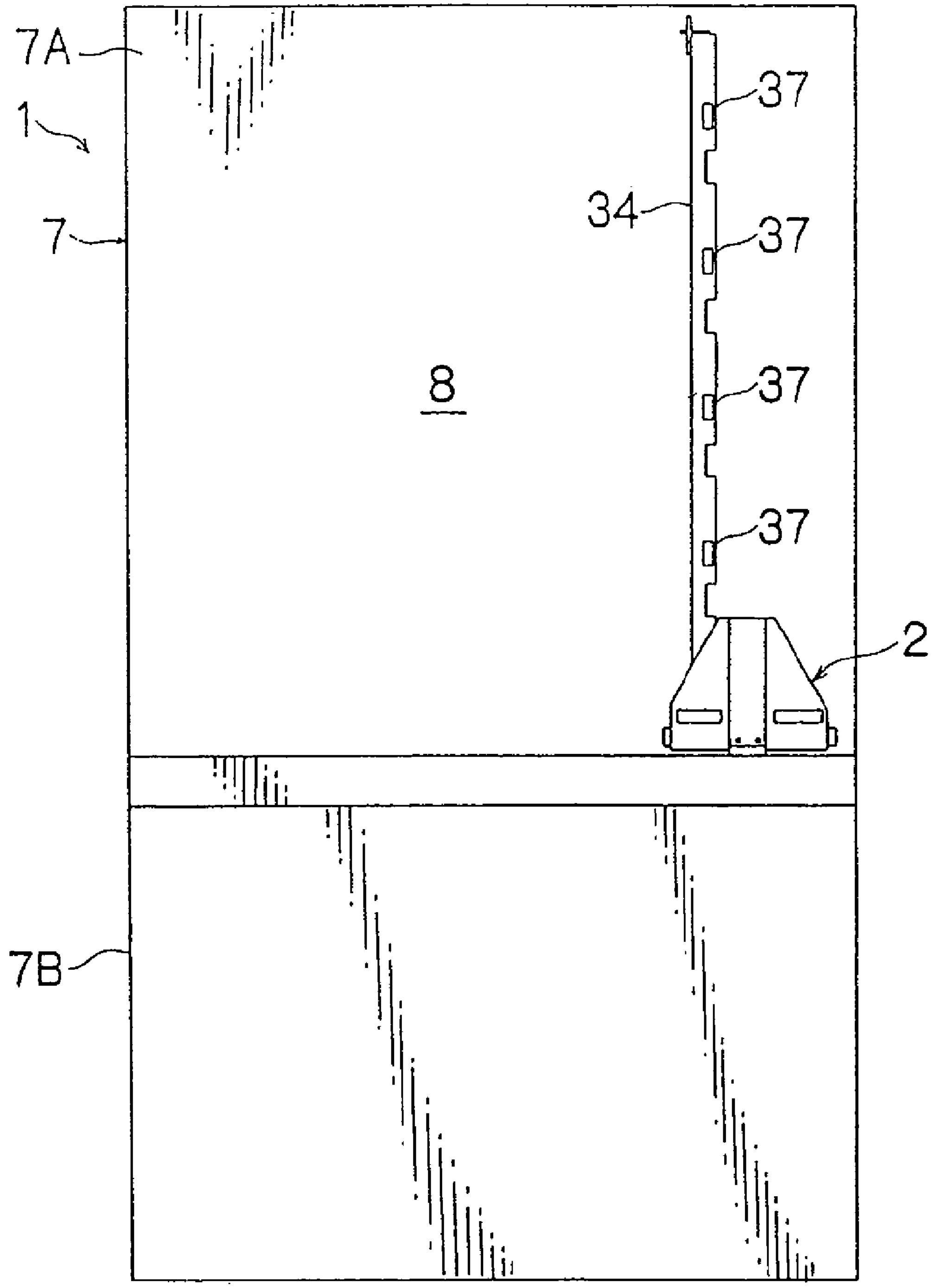
FIG. 13 is a perspective front view illustrating the relationship between a shelf and a stay in the medicine supply apparatus shown in FIG. 1.
Figure 14:
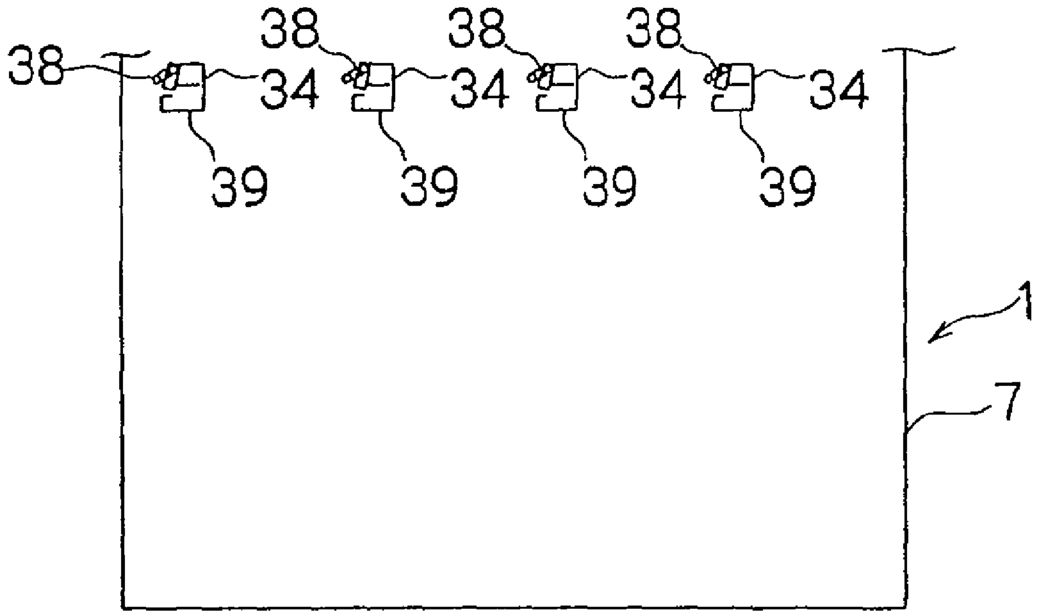
FIG. 14 is a perspective plan view illustrating the positional relationship between stays in the medicine supply apparatus shown in FIG. 1.
Figure 15:
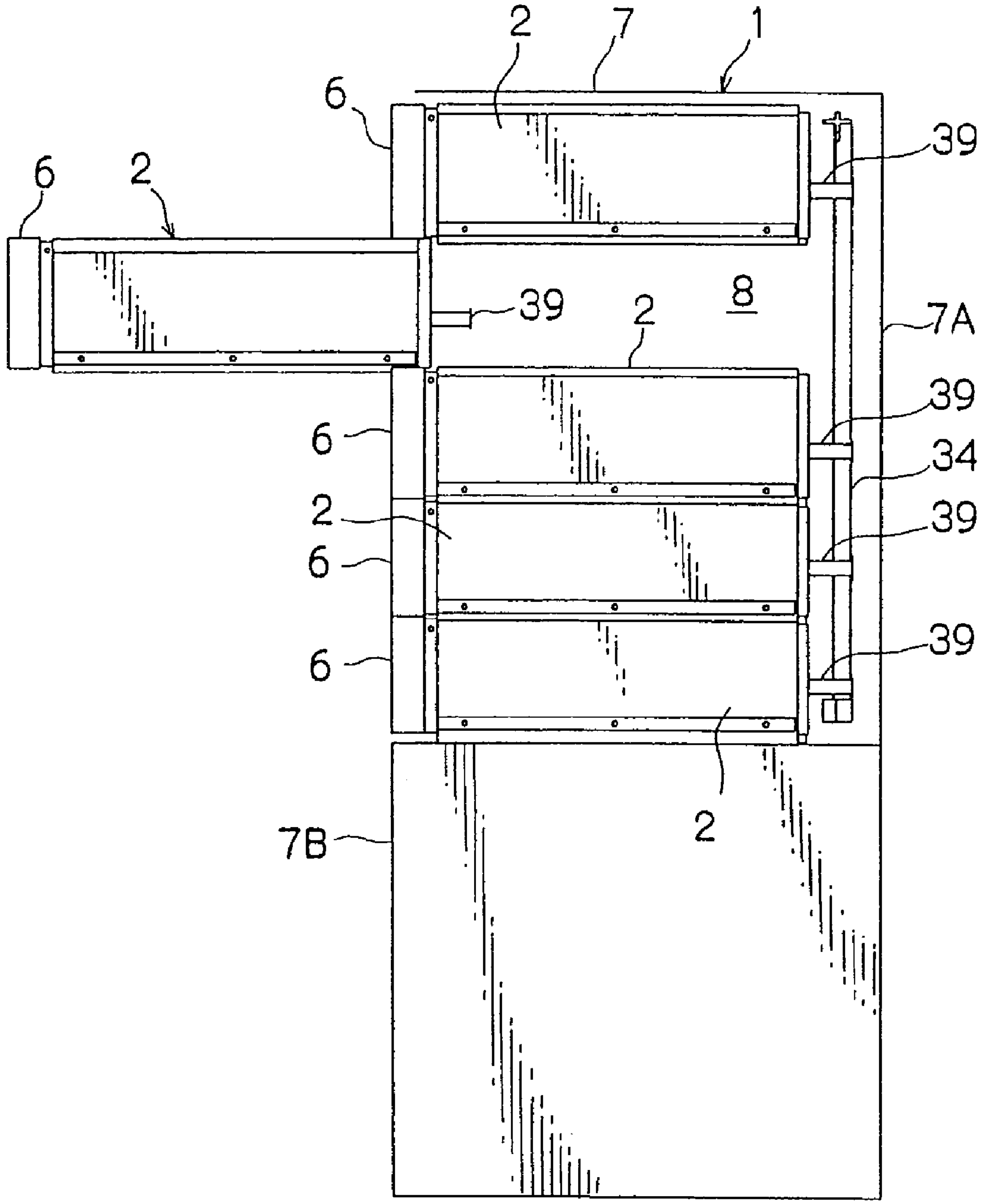
FIG. 15 is a perspective side view illustrating the relationship between the shelves and the stay in the medicine supply apparatus shown in FIG. 1.
Figure 16:
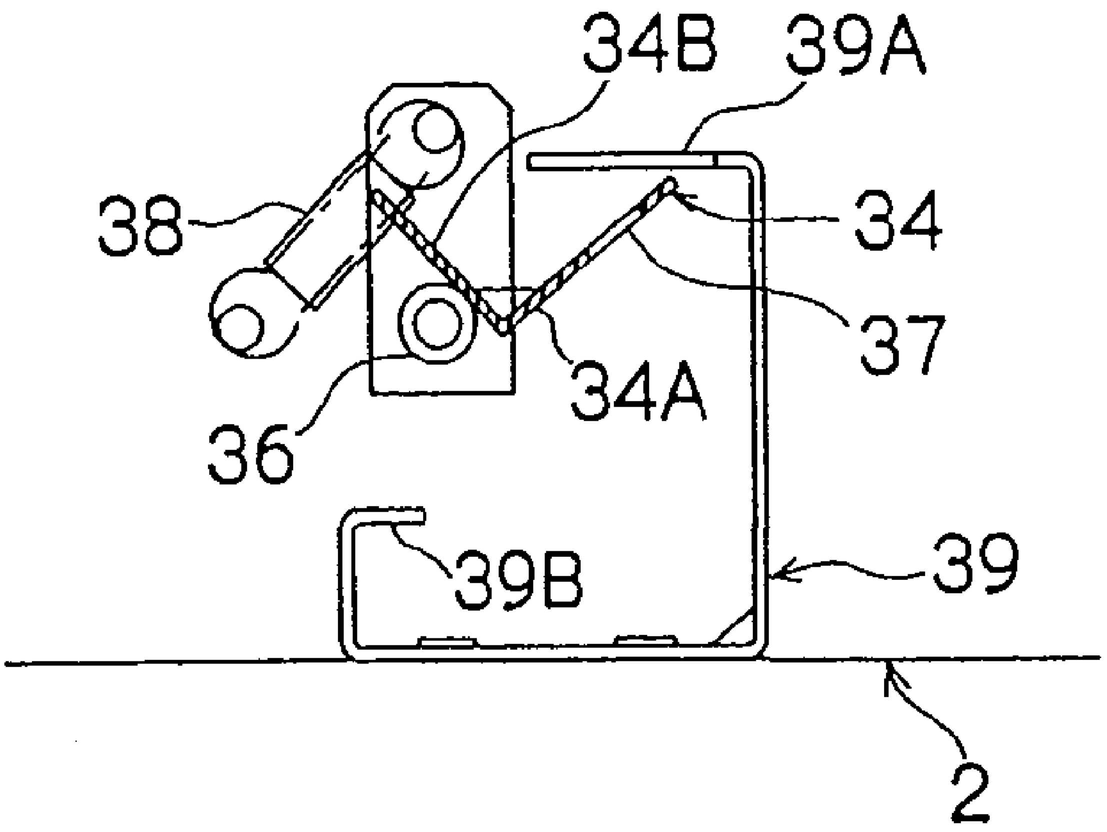
FIG. 16 is a view for explaining the operation of the stay in the medicine supply apparatus shown in FIG. 1.
Figure 17:
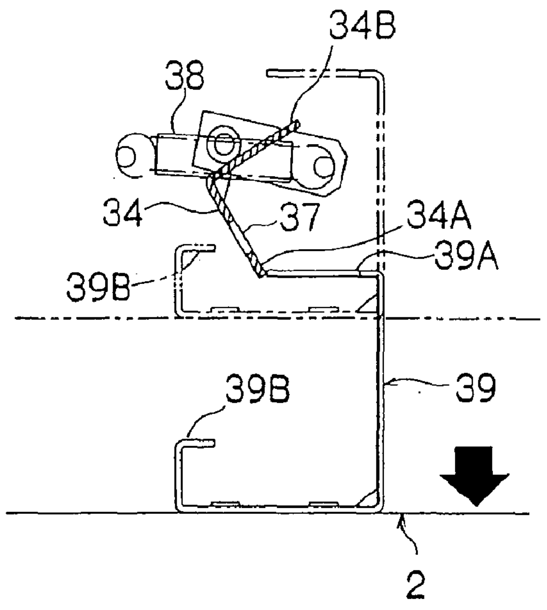
FIG. 17 is a view for explaining the operation of the stay in the medicine supply apparatus shown in FIG. 1.

Four vertically extending stays 34 serving as restriction means are provided at the rear portion within the case accommodating section 8 of the upper structure 7A so as to correspond to the rear portions of the four columns of the shelves 2 (see FIGS. 13 to 15). Each of the stays 34 is mounted so as to be rotated about shafts 36 at upper and lower ends. The stay 34 has, as shown in FIGS. 16 to 21, an L-shaped cross sectional configuration. Further, the stay 34 has a restricting side 34A with five engagement holes 37 being vertically formed and a releasing side 34B vertically extending from the end portion of the restricting side 34A. A coil spring 38 is engaged with the stay 34. By a restoring force of the coil spring 38, the stay 34 is structured so as to be stably held in a released state the sides 34A and 34B face backward as shown in FIG. 16 and a restricted state the restricting side 34A faces forward.

An operating member 39 extending rearward is mounted at the rear surface of the shelf 2 so as to be protruded rearward. The operating member 39 is provided in accordance with the height of each of the engagement holes 37 of the stay 34, and has an L-shaped operating side 39A extending rearward and an L-shaped engaging side 39B placed forward.

When a column of shelves 2 is accommodated within the case accommodating section 8, the stay 34 is in a released state as shown in FIG. 16. This state is maintained stably by the coil spring 38. At this time, the operating side 39A of the operating member 39 is placed at the rear side of the restricting side 34A of the stay 34. When any of the shelves 2 is drawn forward under such state, the operating side 39A presses the restricting side 34A so that the stay 34 is rotated clockwise in FIG. 16 (see FIG. 17). When the operating side 39 is moved forward with respect to the stay 34, the stay 34 becomes in a restricted state that the restricting side 34A of the stay 34 faces forward and the releasing side 34B faces the right side.

Figure 18:
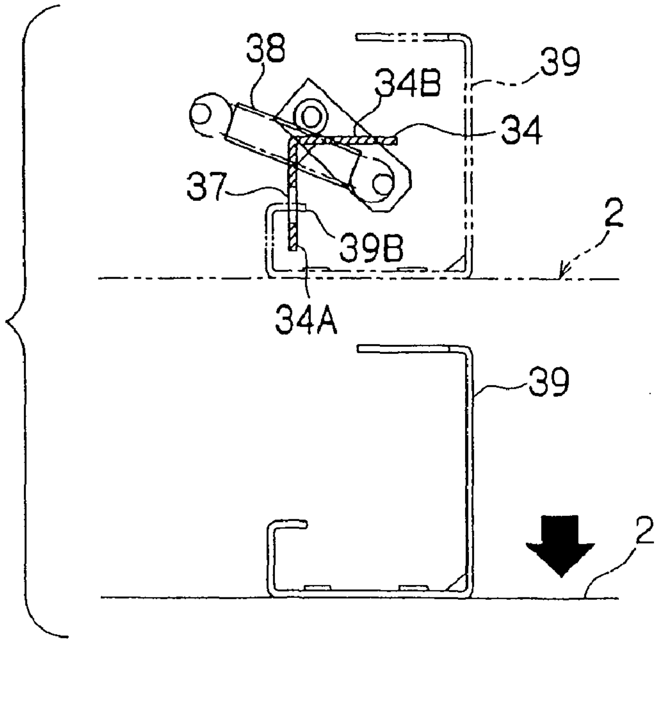
FIG. 18 is a view for explaining the operation of the stay in the medicine supply apparatus shown in FIG. 1.
Figure 19:
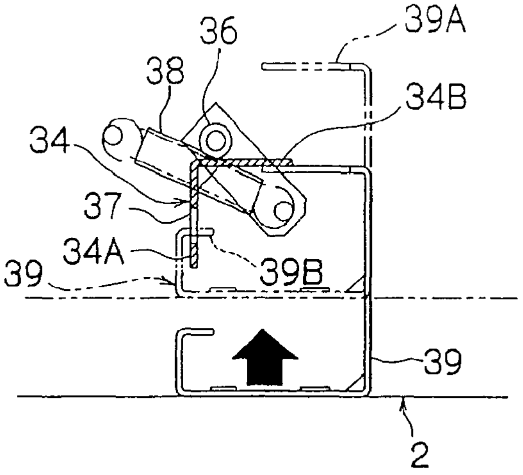
FIG. 19 is a view for explaining the operation of the stay in the medicine supply apparatus shown in FIG. 1.
Figure 20:
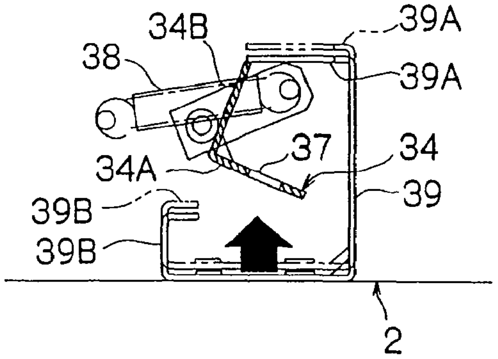
FIG. 20 is a view for explaining the operation of the stay in the medicine supply apparatus shown in FIG. 1.
Figure 21:
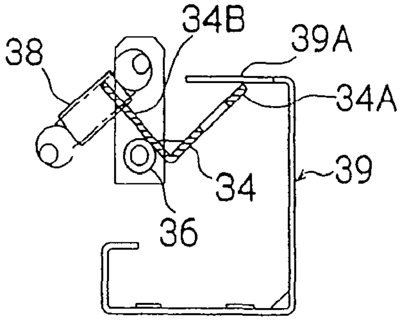
FIG. 21 is a view for explaining the operation of the stay in the medicine supply apparatus shown in FIG. 1.

Under such restricted state, the engaging sides 39B of the operating members 39 for other shelves 2 enter respectively the engagement holes 37 of the restricting side 34A of the stay 34 and engaged therewith (see FIG. 18). As a result, other shelves 2 cannot be drawn. Then, when the drawn shelf 2 is pushed, the operating side 39A of the operating member 39 abuts the releasing side 34B of the stay 34 (see FIG. 19) and presses the same, so that the stay 34 is rotated counter-clockwise in FIG. 19 (see FIG. 20). The restricting sides 34A are moved away from the engaging sides 39B for the other shelves 2 and thus the engaging sides 39B are disengaged from the engagement holes 37. In this way, the other shelves 2 can be drawn. When the corresponding shelf 2 is accommodated within the case accommodating section 8, the stay 34 returns to its initial released state and this state is stably maintained by the coil spring 38 (see FIG. 21).

Because of the above-described structure, only one of the shelves 2 in a column in vertical direction can be drawn and a plurality of shelves 2 cannot be drawn at the same time. As a result, it is possible to prevent a drawback that a plurality of shelves 2 arranged in a column are drawn at the same time and thus the main body 7 falls forward because of loads of the drawn shelves 2.

Figure 22:
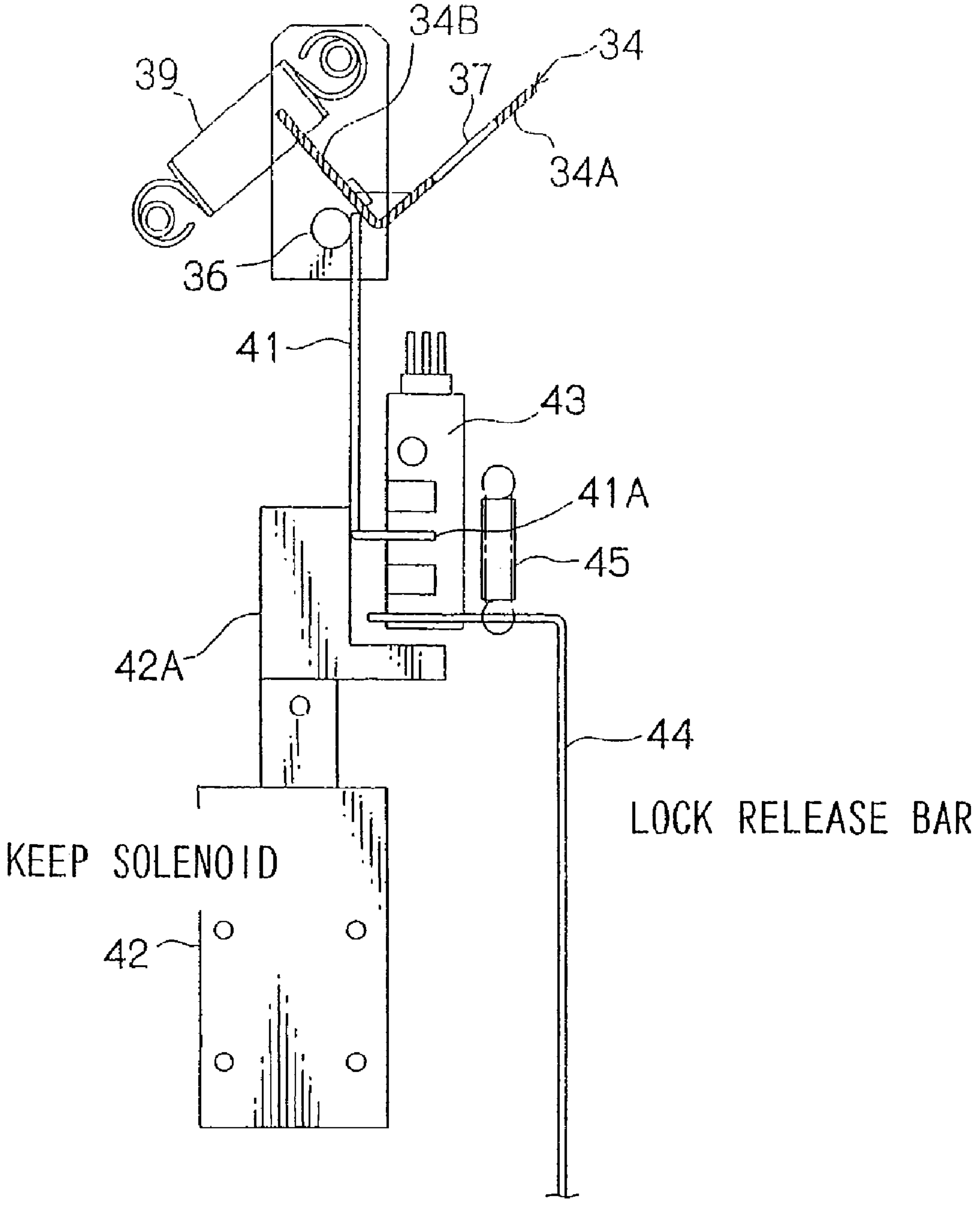
FIG. 22 is a view for explaining the operation of a keep solenoid in the medicine supply apparatus shown in FIG. 1.

Lock members 41 protruding forward in the above-described released state are mounted to the stays 34. Keep solenoids 42 serving as lock means are mounted to the upper structure 7A so as to correspond to the front sides of the lock members 41 of the stays 34. Plungers 42A of the keep solenoids 42 are protruded rearward. In the state that the keep solenoid 42 makes the plunger 42A protrude rearward, the plunger 42A abuts against the lock member 41 in the released state and rotation of the stay 34 is prohibited (see FIG. 22). Thus, the stay 34 cannot be rotated and the operating member 39 cannot be moved from the state shown in FIG. 16. As a result, all shelves 2 arranged in a column corresponding to the corresponding stay 34 cannot be drawn.

Figure 23:
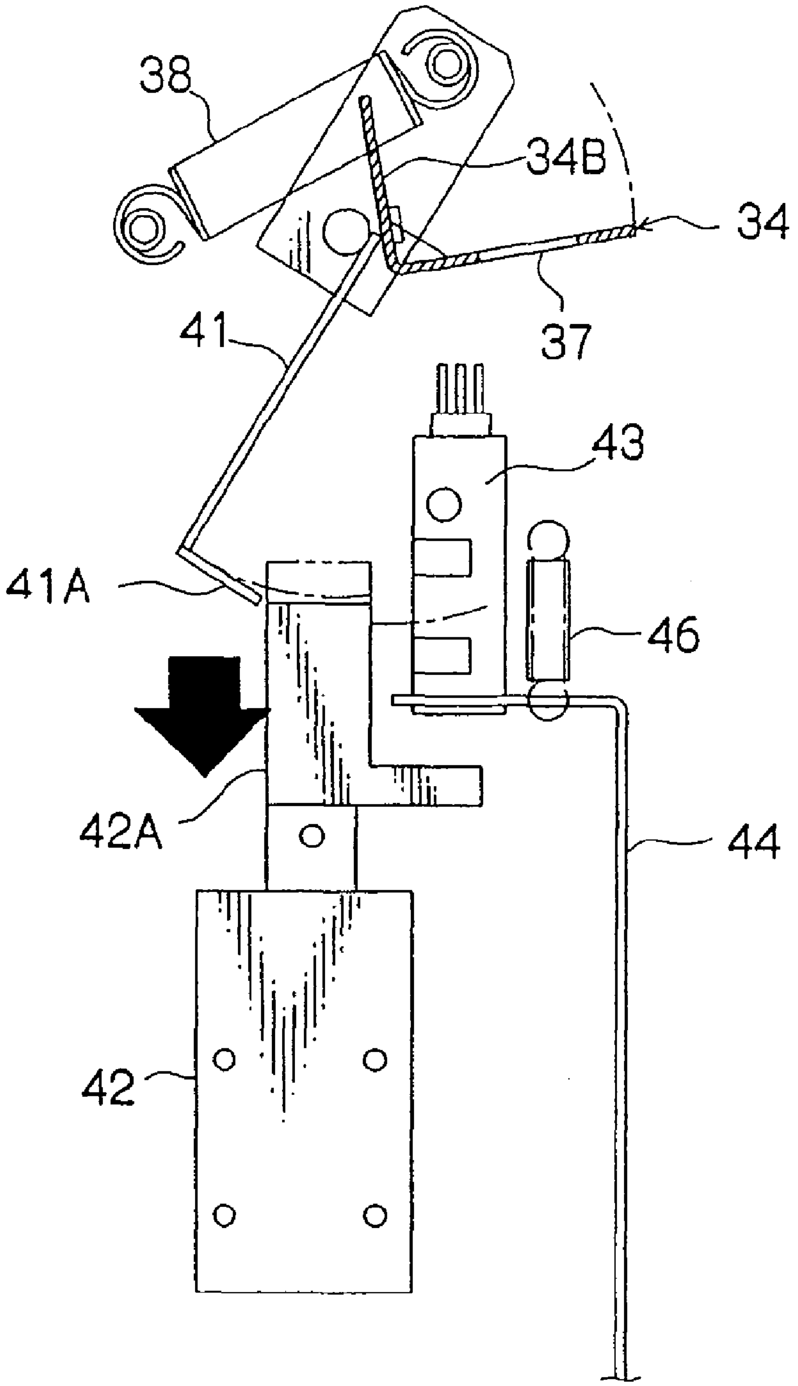
FIG. 23 is a view for explaining the operation of a keep solenoid in the medicine supply apparatus shown in FIG. 1.

When the plunger 42A is retracted, the stay 34 becomes rotatable as shown in FIG. 23 and thus unlocked. A reference numeral 43 denotes a lock sensor provided at a position into which a leading edge 41A of the lock member 41 enters when the stay 34 is in an unlocked state. The lock sensor detects the lock member 41 under such state. When the leading edge 41A of the lock member 41 is moved away from the lock sensor 43, the sensor 43 does not detect the lock member 41. In this way, the state of the stay 34 can be identified.

Figure 24:
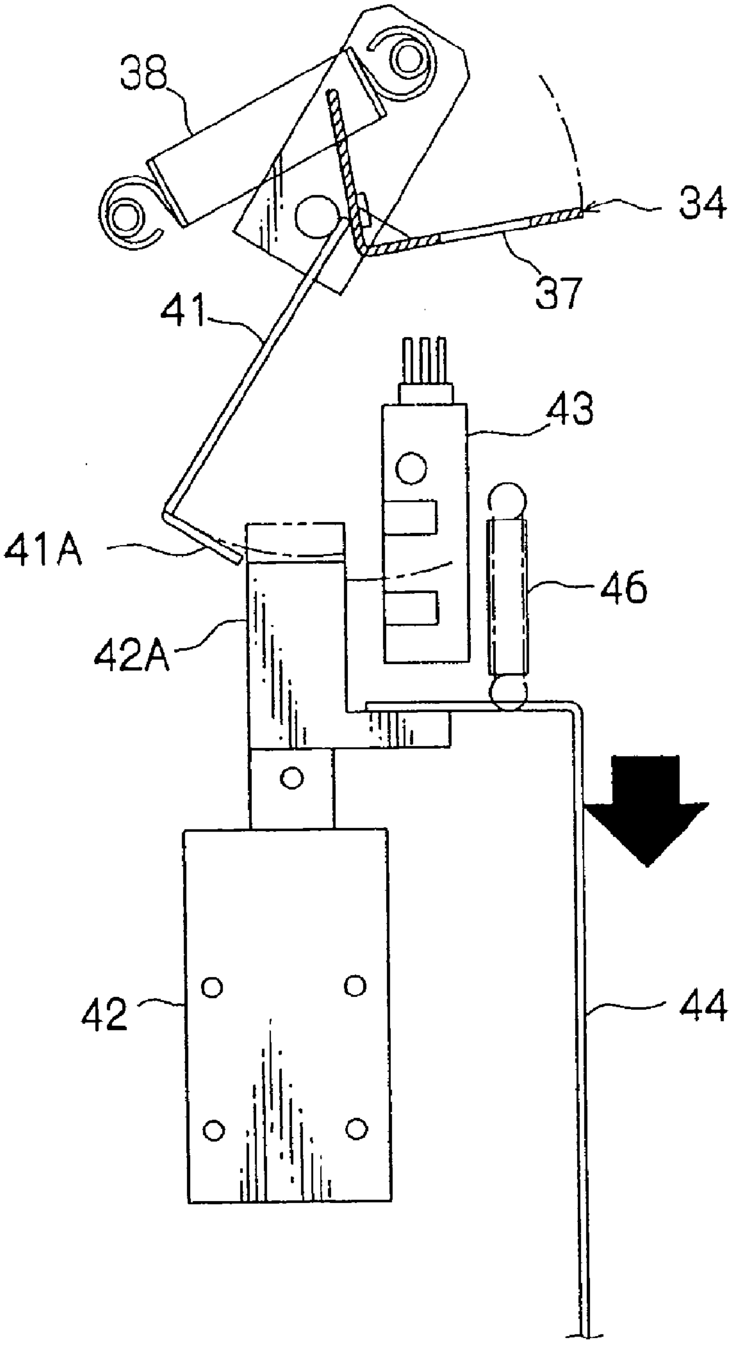
FIG. 24 is a view for explaining the operation of a lock release bar in the medicine supply apparatus shown in FIG. 1.

A reference numeral 44 denotes a lock release bar serving as manual unlock means. A plurality of the lock release bars are provided so as to respectively correspond to the keep solenoids 42. The lock release bar 44 is formed in an L-shaped configuration. The trailing edge of the lock release bar 44 is mounted to the position of engaged with the plunger 42A. The lock release bar 44 is normally retracted rearward by a coil spring 46 and thus set apart from the plunger 42A (see FIGS. 22 and 23). When the lock release bar 44 is drawn forward, the plunger 42A is retracted toward the keep solenoid 42, so that the keep solenoid 42 is unlocked (see FIG. 24). Thus, all shelves 2 vertically arranged in a column can be unlocked manually.

In accordance with this embodiment, a plurality of shelves 2 vertically arranged in a column cannot be drawn at the same time and are locked. Nevertheless, the invention is not limited to this case. Shelves transversely arranged in a row may be set not to be drawn at the same time and to be locked. In this case, transverse stays are mounted in accordance with five rows of shelves.

On the other hand, the packaging machine 13 (charging device) is accommodated at the lower portion within the lower structure 7B of the main body 7. The structure of the packaging machine 13 will be described later in detail. As shown in FIG. 3, the packaging machine 13 is detachably fixed to drawing rails 47 mounted at the right and left sides of the bottom surface within the lower structure 7B. Thus, while the lower panels 4 are open, the packaging machine 13 can be drawn forward from the lower structure 7B. The drawn packaging machine 13 can be detached from the drawing rails 47. A reference numeral 48 indicates a harness for packaging machine that is detachably connected by connectors between the packaging machine 13 and the lower structure 7B. The harness 48 has a length sufficient for permitting an amount the packaging machine 13 is drawn.

Two shutters 53 are transversely provided at the upper portion within the lower structure 7B. Each of the shutters 53 corresponds to lower portions of the chutes 32. The right side shutter 53 corresponds to the chute 32 at the right end side and the chute 32 next to the same and the left side shutter 53 corresponds to the chute 32 at the left end side and the chute 32 next to the same. The shutters temporarily receive medicine falling through the chutes 32 into the hopper 54 to be described later.

The hopper 54 is provided within the lower structure 7B so as to correspond to the lower portions of the shutters 53. The hopper 54 is formed in a rectangular funnel configuration so as to have widely opened top surface and gradually reduced diameter toward its lower end. The hopper 54 receives medicine falling through the chutes 32 and passing through the shutters 53 and discharges the medicine from its lower end opening 54A.

The right and left upper ends of the hopper 54 are detachably fixed by screws to drawing rails 56 mounted to the right and left upper portions within the lower structure 7B. The shutters 53 are placed on the drawing rails 56 and detachably fixed by screws to the drawing rails 56. Thus, while the lower panels 4 are open, the hopper 54 and the shutters 53 can be freely drawn forward from the lower structure 7B at the same time. Further, the drawn hopper 54 and the shutters 53 can be detached from the drawing rails 56 (see FIG. 5). Although not illustrated, detachable harnesses for the shutters 53 are also provided. These harnesses have the length sufficient to permit an amount the shutters 53 are drawn.

Because of such structure, when the maintenance such as exchange for tablet cases 3, cleaning for the chutes 32 formed of the paths 9 and the hopper 54 and exchange for parts for the packaging machine 13 is performed, components to be subjected to the maintenance are drawn from the upper structure 7A or the lower structure 7B of the main body 7 and then detached.

The workability of the maintenance for the medicine supply apparatus 1 is significantly improved and smooth charging of medicine can be realized. In particular, a plurality of the tablet cases 3 in the shelf 2 can be drawn from the upper structure 7A at the same time. The accommodating containers 51 for the tablet cases 3 are detachably mounted. Thus, the workability for exchanging the accommodating containers 51 for the tablet cases 3 is further improved.

Further, also the shutters 53 are mounted so as to be drawn from the lower structure 7B and to be freely detached therefrom. Thus, the workability of the maintenance for the shutters 53 for temporarily receiving medicine falling into the hopper 54 is also improved. In particular, the shutters 53 and the hopper 54 are mounted so as to be drawn from the lower structure 7B at the same time. Then, the workability of the maintenance for the shutters 53 and the hopper 54 is even further improved.

An additional medicine feeder (UTC) 57 is mounted at the upper central portion within the lower structure 7B so as to be placed between the shutters 53. In this case, the additional medicine feeder 57 is mounted so as to be independently drawn forward without being covered by the lower panels 4 and to be freely detached from the lower structure 7B (see FIGS. 1 and 6). The additional medicine feeder 57 is used for arbitrarily supplying additional medicine and communicates with the hopper 54.

Figure 25:
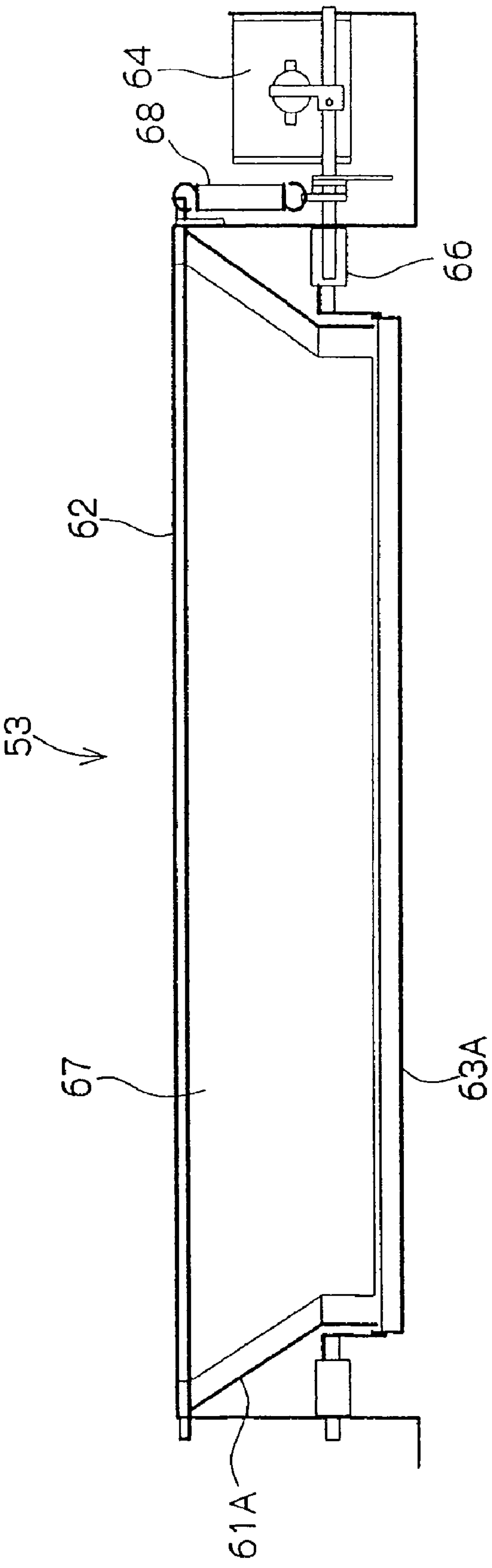
FIG. 25 is a vertical sectional view of a shutter in the medicine supply apparatus shown in FIG. 1.
Figure 26:
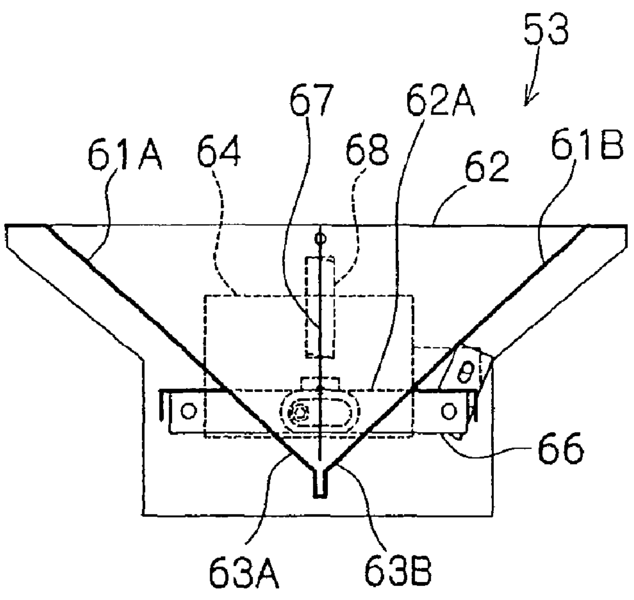
FIG. 26 is a vertical front view of the shutter in the medicine supply apparatus shown in FIG. 1.

Next, the structure of the shutters 53 will be described with reference to FIGS. 25 to 27. Each of the shutters 53 is formed in a substantially symmetrical configuration with longer sides in a rearward direction of the lower structure 7B. Further, the shutter 53 is formed of inclined walls 61A and 61B set apart from each other from downwards toward upwards while being inclined, a main body 62 formed in a rectangular funnel configuration with its top surface being widely opened and a pair of open/close plates 63A and 63B for opening/closing a narrowed lower end opening 62A of the main body 62.

The open/close plates 63A and 63B are operated by a shutter solenoid 64, a coil spring 58 and a link mechanism 66 provided at the rear portion of the shutter 53. The open/close plates 63A and 63B are driven so as to be in a closed state shown in FIG. 26 that the open/close plates 63A and 63B substantially continues the inclined walls 61A and 61B respectively from their lower ends and the lower ends of the open/close plates 63A and 63B abuts with each other to close the lower end opening 62A of the main body 62 and in an open state shown in FIG. 27 that the open/close plate 63A is rotated clockwise in the figure and the open/close plate 63B is rotated counter-clockwise in the figure such that their lower ends are moved away from each other to open the lower end opening 62A.

A curtain 67 serving as a cushioning member is mounted within the shutter 53. The curtain 67 is made of materials with flexibility capable of absorbing kinetic energies for medicines falling though chutes 32, colliding the inclined walls 61A and 61B and bouncing back, such as thin fabric, rubber and synthetic resins. The curtain 67 is hung down from the upper central portion within the main body 62. The lower end of the curtain 67 is extended even further than the lower end opening 62A and nipped by the closed open/close plates 63A and 63B as shown in FIG. 26.

Because of the above-described structure, kinetic energies of medicines falling within the shutter 53 and bouncing back are absorbed by the curtain 67 and the medicines are rapidly collected from the lower end opening 62A onto the open/close panels 63A and 63B, and then becomes stationary. Especially, as the curtain 67 is extended from the upper portion of the shutter 53 to the lower end portion thereof, falling medicine easily abuts against the curtain 67 resulting in an improvement in impact absorption action. As a result, the time required for medicine to become stationary is even further reduced. Further, as the curtain 67 is nipped by the open/close plates 63A and 63B, noise occurring when the lower ends of the open/close plates 63A and 63B abut can be absorbed.

Figure 28:
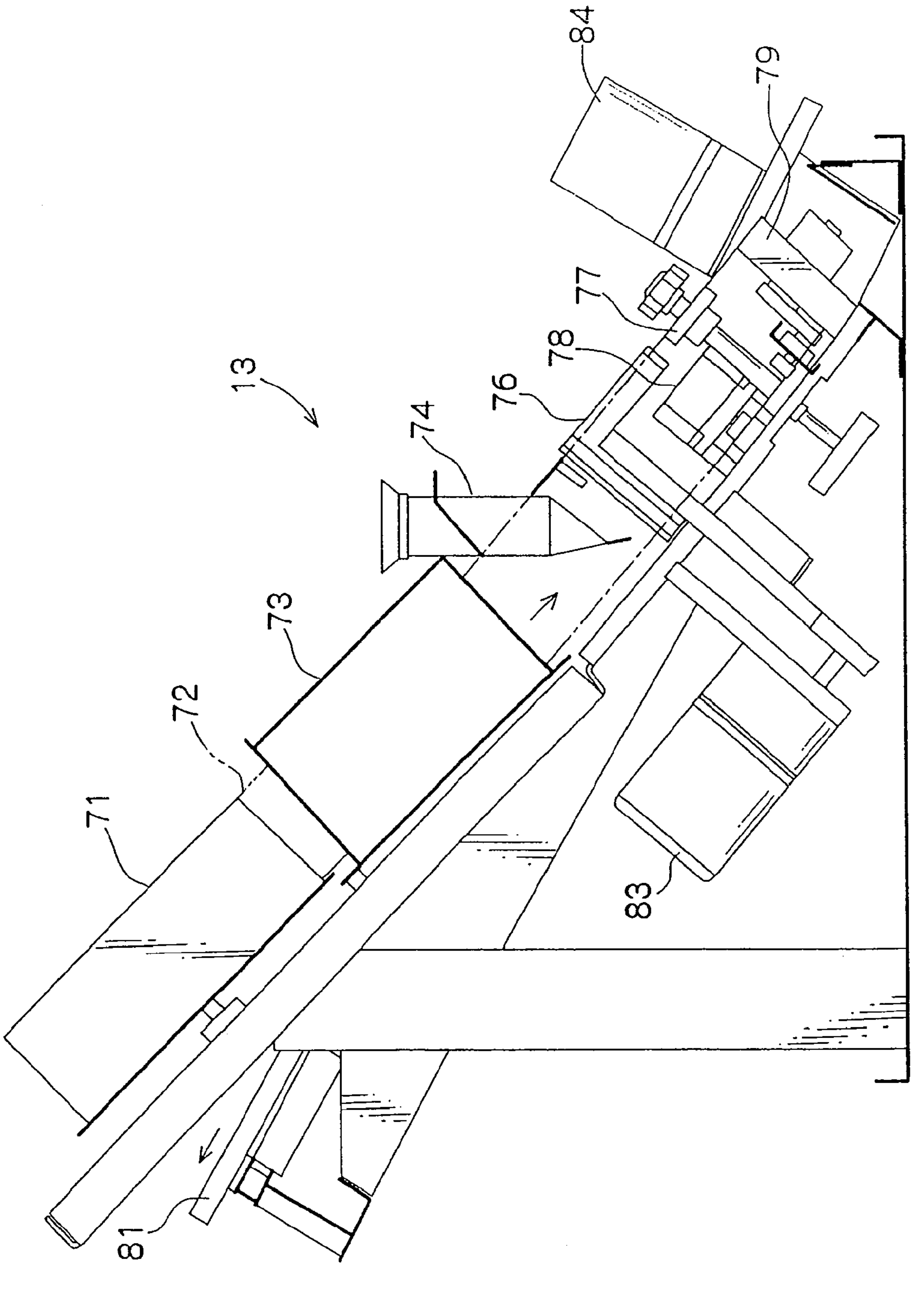
FIG. 28 is a front view of a packaging machine in the medicine supply apparatus shown in FIG. 1.

Then, the structure of the packaging machine 13 will be described with reference to FIG. 28. A reference numeral 71 indicates a roll around which a thermally adhering packaging paper 72 (which structures a container) is rolled. A reference numeral 73 indicates a printer, a reference numeral 74 indicates a nozzle attached to the lower end opening 54A of the hopper 54 and a reference numeral 76 indicates a thermal sealing head (thermal sealing device) made of a silicon rubber. A reference numeral 77 indicates a roller for conveying the packaging paper 72 drawn from the roll 71, a reference numeral 79 indicates a cutter for cutting the packaging paper 72 and a reference numeral 81 indicates a conveyer for conveying the packaging paper 72 packaging medicine and then cut to an output port 82 provided at the lower panel 4. The conveyer is successively provided along a conveyance path for the packaging paper 72. A reference numeral 83 is a motor for operating the thermal sealing head 76, a reference numeral 78 indicates a motor for driving the roller 77 and a reference numeral 84 indicates a motor for the conveyer 81.

The packaging paper 72 rolled around the roll 71 has a substantially V-shaped cross-sectional configuration so that its top surface is opened and its lower end is folded and closed. The packaging paper 72 is drawn from the roll 71 downward at an incline to the right by the roller 77. Then, printing is performed upon the surface of the packaging paper 72 by the printer 73 as described later. Medicine discharged from the nozzle 74 is charged into the packaging paper 72. The packaging paper 72 is divided for each piece of medicine by thermal adhesion performed by the thermal sealing head 76. The divided packaging paper 72 packaging pieces of medicines is cut by the cutter 79 and then conveyed to the output port 84 placed at the top left portion of the lower structure 7B by the conveyer 81.

Figure 29:
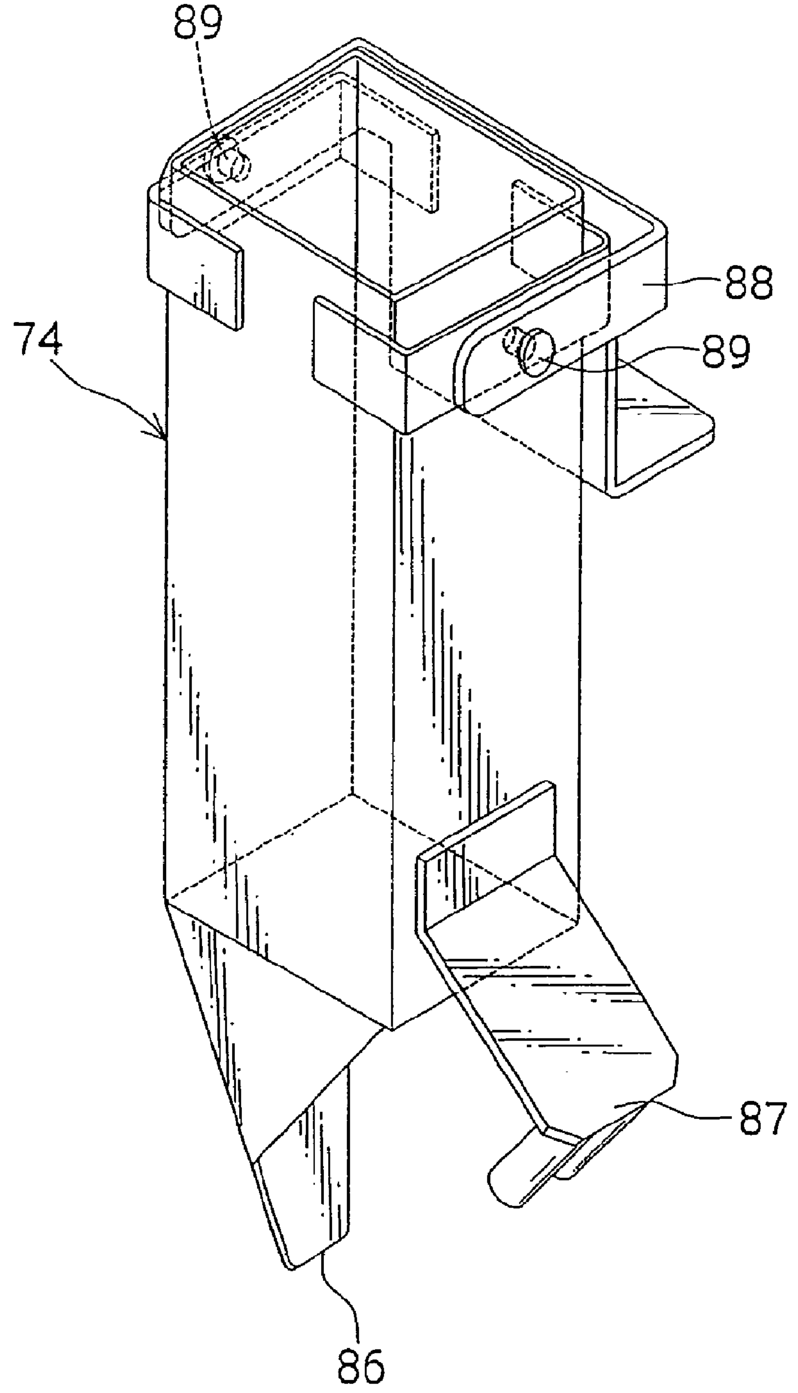
FIG. 29 is a perspective view of a nozzle in the medicine supply apparatus shown in FIG. 1.

The nozzle 74 is formed in a rectangular cylindrical configuration with its top and bottom surfaces being opened as shown in FIG. 29. An insertion guide side 86 inserted into the packaging paper 72 is formed in a protruded manner at the lower end of the nozzle 74 at the side of the printer 73. A paper guide side 87 for closing the top surface opening of the packaging paper 72 is formed so as to oppose the insertion guide side 86. The upper end opening of the nozzle 74 opposes the lower end opening 54A of the hopper 54. Medicine received by the hopper 54 enters the nozzle 74 and then charged within the packaging paper 72 guided by the insertion guide side 86.

The nozzle 74 is mounted to the hopper 54 so as to swing about a rotating shaft 89 of a holding member 88 in a direction perpendicular to a direction the packaging paper 72 is advanced (indicated by the arrow shown in FIG. 28) (i.e., swing in a longitudinal direction). Thus, even if the positions of the hopper 54 and the nozzle 74 do not strictly coincide the position of the packaging paper 72 in the packaging machine 13, the nozzle 74 swings by a positional error, so that the insertion guide side 86 is smoothly inserted into the packaging paper 72 and medicine can be charged into the packaging paper. Consequently, the workability for mounting such components is improved.

Figure 30:
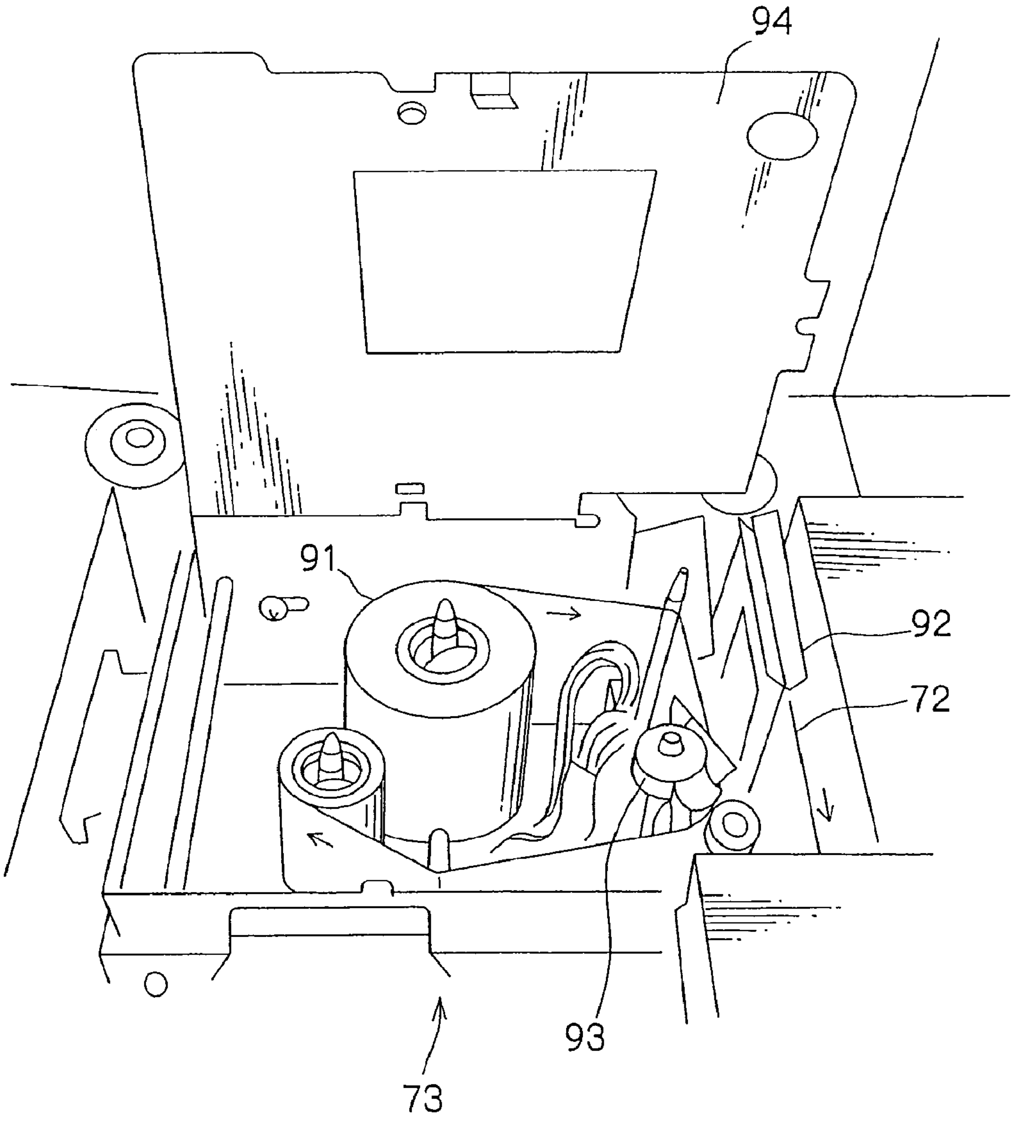
FIG. 30 is a perspective view of a printer in the medicine supply apparatus shown in FIG. 1.

Next, the printer 73 will be described. The printer 73 is a thermal transfer type printer using ink ribbons. As shown in FIG. 30, the packaging paper 72 is pressed toward a color ink ribbon 91 by a pressing plate 92 and predetermined printing is performed onto the surface of the packaging paper 72 by a thermal transfer head 93. A reference numeral 94 is an open/close cover for the printer 73. Directions that the color ink ribbon 91 and the packaging paper 72 are advanced are indicated by arrows in the figure.

Figure 31:
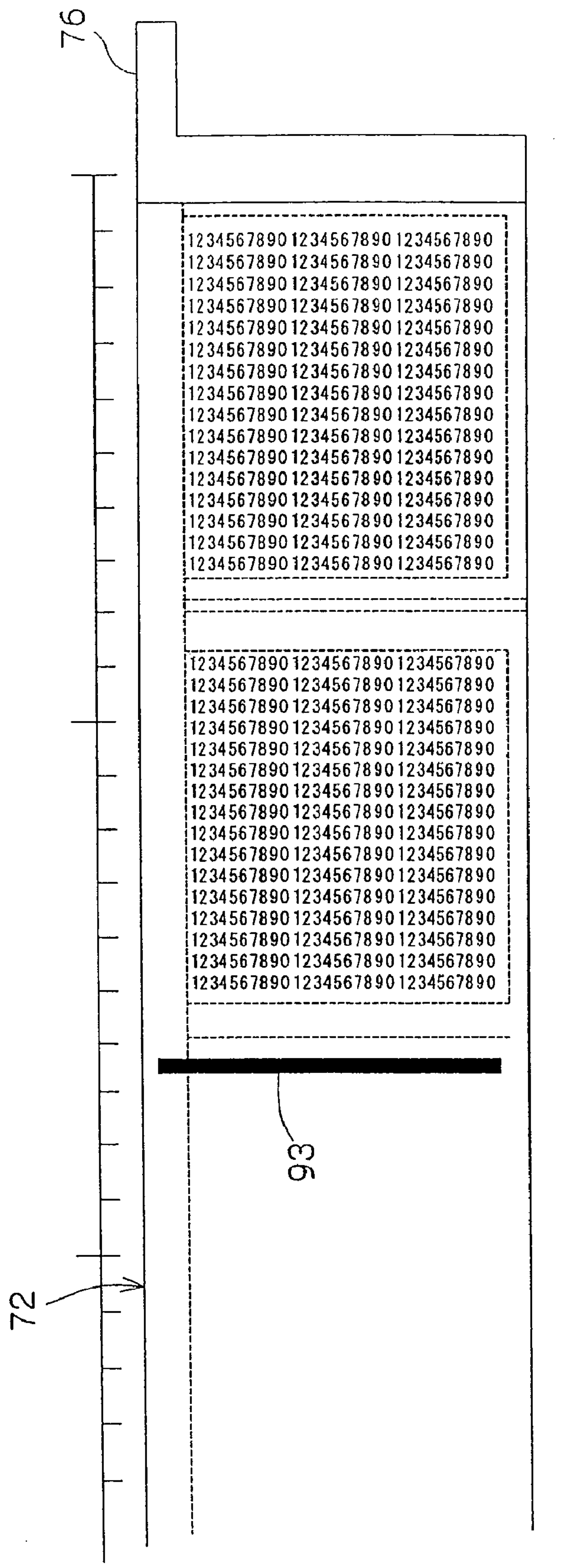
FIG. 31 is a view illustrating the positional relationship between a printer head and a thermal sealing head relative to packaging paper in the medicine supply apparatus shown in FIG. 1.
Figure 32:
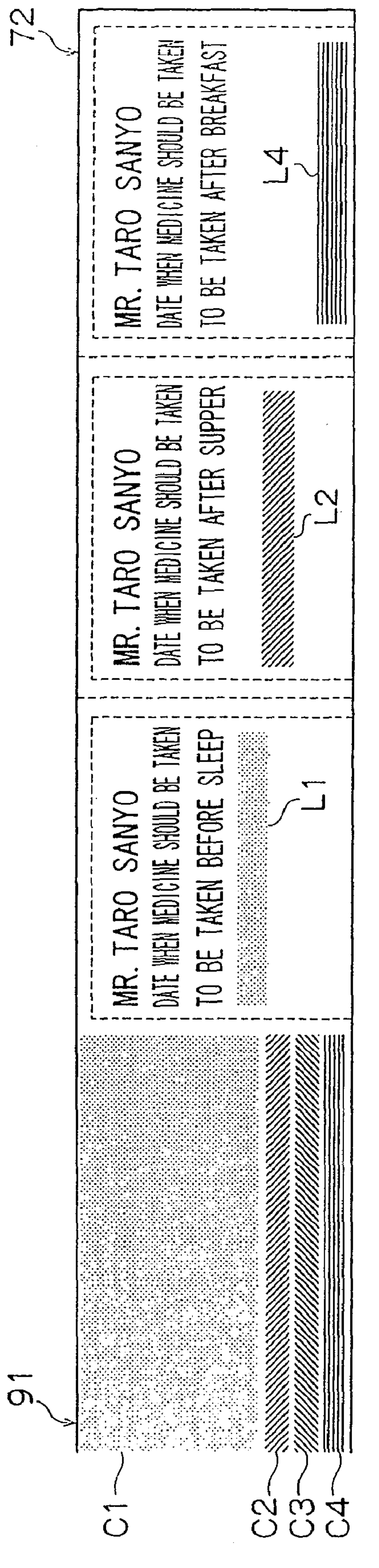
FIG. 32 is a view illustrating the result of printing onto the packaging paper in the medicine supply apparatus shown in FIG. 1.

FIG. 31 shows the positional relationship between the printer head 93 and the thermal sealing head 76 with respect to the packaging paper 72 and the state printing is performed between the printer head 93 and the thermal sealing head 76. In accordance with this embodiment, as shown in FIG. 32, the color ink ribbon 91 is formed of four different color bands extended in its widthwise direction. The largest band C1 for printing is, for example, black, a band C2 is blue, a band C3 is red and a band C4 is a yellow.

The printer 73 with the above-described structure prints in black a name, a date when medicine should be taken and a time slot in which medicine should be taken at the band C1. Further, a black line L1 is printed for medicine package to be taken before sleep, a blue line L2 is printed for medicine package to be taken after supper and a yellow line L4 is printed for medicine package to be taken before breakfast. In this way, time slots in which medicine should be taken are displayed by different colors. Accordingly, the time slot in which medicine should be taken is easily discriminated and mistakes such as taking wrong medicine can be effectively eliminated. The time slots in which medicine should be taken may be printed by characters in the lines L1, L2 and L4 as shown in FIG. 32.

Data printed onto the packaging paper is prepared on the basis of data inputted to a prescribed medicine table to be described later. Written into the prescribed medicine table are, in addition to a patient's name, a medicine's name and a medicine code, a positional code for the tablet 3 accommodating the medicine, the number of medicines prescribed, a time slot in which the medicine should be taken and the number of the medicines taken at a time on the basis of the inputted prescription data or by making reference to a database for accommodated medicines to be described later. The data to be printed is read out from the prescribed medicine table. At the printer driver, print data of corresponding item to be printed is supplied to each of print heads placed so as to correspond to the respective colors of the color ink ribbon.

Figure 34:
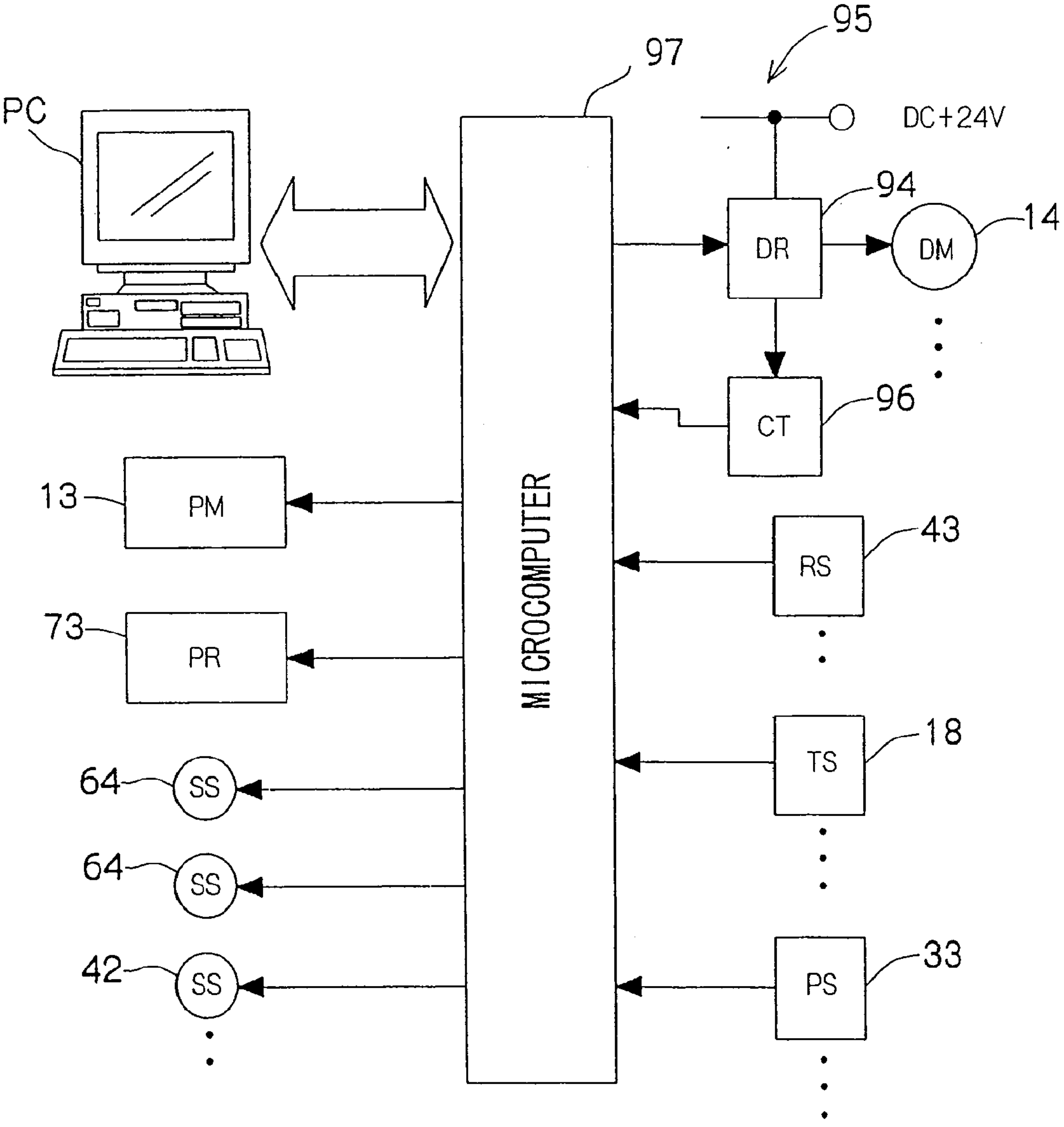
FIG. 34 is a block diagram of an electric circuit for a control device in the medicine supply apparatus shown in FIG. 1.

FIG. 34 shows a block diagram of an electric circuit for a control device 95 in the medicine supply apparatus 1. The control device 95 serving as control means is structured so as to include a general purpose microcomputer 97. Connected via a driver circuit 94 to an output of the microcomputer 97 are the drum motors 14 for the tablet cases 3, the packaging machine 13, the printer 73, the shutter solenoids 64 and the keep solenoids 42. The microcomputer 97 controls the driver circuit 94 to apply a DC24V power source to the drum motors 14. Then, the drum motors 14 are rotated forward or in reverse.

The microcomputer 97 is illustrated as a single block. The microcomputer 97 is provided with required number of processors in accordance with the number of processings performed in parallel.

A memory (not shown) serving as an external storage is connected to the microcomputer 97. A hard disk for a personal computer PC may be also used as the storage.

Connected to an input of the microcomputer 97 are an output of a current transformer 96 for detecting the communicating current of each drum motor 14, the outputs of the lock sensors 43, the outputs of the medicine detection sensors 18 and the outputs of identification sensors 33. The microcomputer 97 is connected to the personal computer PC so as to accomplish data communication with the same.

The operation of the medicine supply apparatus 1 of the invention with the above-described structure will be described. When a power source is switched on, the shutters 53 are closed. Further, assume that the shelves 2 that the tablet cases 3 accommodating predetermined medicine are mounted are mounted within the case accommodating section 8 of the upper structure 7A as described above.

When a power source for the medicine supply apparatus 1 is switched on, the microcomputer 97 for the control device 95 reads by the identification sensors 33 identification codes for the tablet cases 3 in the shelves 2 placed at the right and left end of the case accommodating section 8 of the upper structure 7A. Data about types of medicines accommodated in the tablet cases 3 is stored together with the positions of the tablet cases 3. The data is also sent to the personal computer PC.

The microcomputer 97 has a database about the types of medicines within the tablet cases 3 accommodated within the case accommodating section 8 and the position of the corresponding tablet case 3 (i.e., a database for accommodated medicines) in an unillustrated external storage connected to the microcomputer 97. The database is also sent to the personal computer PC. The identification codes read by the identification sensors 33 are also added to the database.

Figure 44:
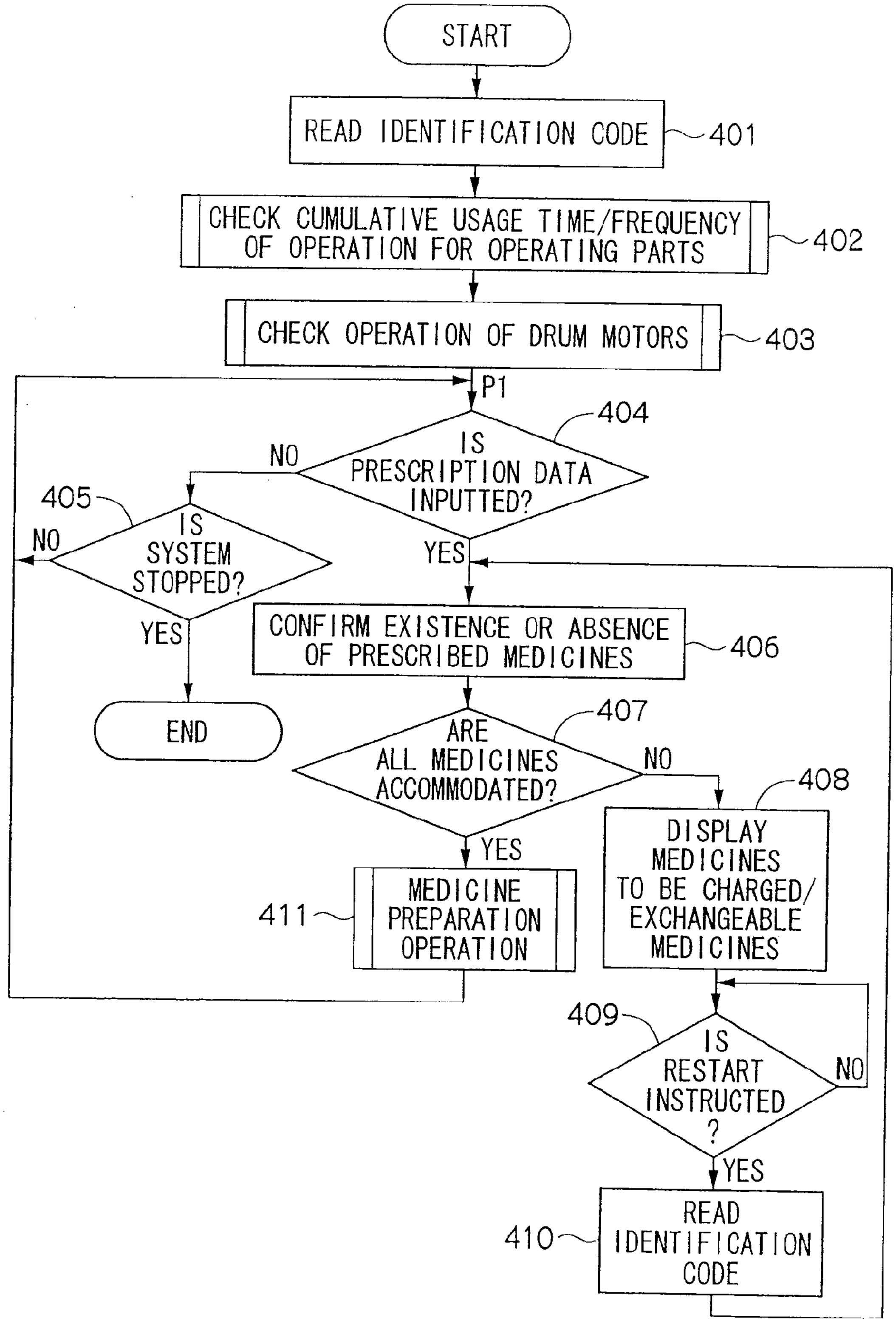
FIG. 44 is a flowchart illustrating a basic procedure (main routine) for a medicine preparation system performed in the medicine supply apparatus of the invention.

Firstly, a system for preparing medicines related with a series of medicine preparation operations will be described. FIG. 44 shows a control procedure performed by the microcomputer 97 (a main processor). Firstly, when a system for preparing medicines is activated by switching on a power source, an identification code is read in step 401. A name of medicine accommodated within each of the tablet cases is recognized and an identification code (a medicine's name) is stored, together with a positional code indicating its accommodated position, in an accommodated medicine database (step 401). The database is shared with the personal computer PC.

Next, operating elements (operating parts) serving as parts that wear out are periodically checked. An add-up value for usage of the operating parts, i.e., a cumulative usage time or a frequency of operation is checked (step 402). This routine will be described later in detail with reference to FIG. 48. When the cumulative usage time or the frequency of operation serving as the add-up value for the operating parts has been checked, operations of the drum motors for the tablet cases are periodically checked (step 403). The procedure for this operational check (routine) will be described later in detail with reference to FIG. 47. In accordance with this embodiment, it is structured so that such periodic checks are performed every time when a power source is switched on. The periodic checks may be performed at an appropriate time or when the number a power source is switched on reaches a predetermined number.

When steps 402 and 403 for such checks are completed, the system is placed in a state of waiting for prescription data to be inputted. Unless it is determined in step 405 that the system is instructed to end, the system is in a state of waiting for prescription data to be inputted (steps 404 and 405). When an operator inputs the prescription data from the personal computer PC on the basis of a prescription prepared by a doctor, a table for prescribed medicines is prepared on the basis of one medicine or two or more medicines prescribed at the same time. Then, it is checked whether the medicine is accommodated within any tablet cases 3 in the medicine supply apparatus 1 by making reference to a database for accommodated medicines (step 406). In the table for prescribed medicines, in addition to a patient's name, a medicine's name and a medicine code, a positional code that the medicine is accommodated, the number of the medicines, a time slot in which the medicine should be taken, a number of medicines to be taken at a time, a presence or absence of other medicines to be packaged within the same package are prepared on the basis of the inputted prescription data or the database for accommodated medicines. In step 406, presence or absence of medicines in the table for prescribed medicines is checked by verifying the accommodated medicine database. If the medicine exists in the accommodated medicine database, the positional code of the medicine is written by making reference to the accommodated medicine database. On the other hand, if any of medicines to be prescribed is not accommodated within the medicine supply apparatus 1, namely if a tablet case 3 for medicine required for prescription does not exist in the case accommodating section 8, the positional code for such medicine is not written.

When all medicines in the table for prescribed medicines are verified with respect to the database for accommodated medicines, it is determined in step 407 whether or not all medicines are accommodated. A name of medicine whose positional code is not written is sent to the personal computer PC and displayed on a display screen for the personal computer PC as an unaccommodated medicine (step 408). The operator watches the display, draws the shelf 2 accommodating the tablet case 3 and loads the accommodating container 51 for the medicine to be replenished therein. At this time, the required number of positions of the accommodating containers 51 for the tablet cases 3 accommodating medicines that may be exchanged for new medicines are also displayed on the display screen. Such exchangeable accommodating containers 51 may be containers for medicines that need not to be accommodated in a package. Thus, the exchangeable accommodating containers 51 for the tablet cases 3 may be, among the medicines existing in the database for accommodated medicines, for medicines that do not exist in the prescribed medicine table. Alternatively, the database for accommodated medicines may include, with respect to each medicine, information about its frequency of being prepared and tablet cases 3 accommodating medicines with lower frequencies of being prepared may be successively displayed.

When unaccommodated medicines and exchangeable medicines are displayed on the display screen for the personal computer PC, the system is placed in a waiting state of waiting an instruction of restart of the medicine preparation operation (step 409). When the accommodating containers 51 for medicines to be newly added have been loaded, the operator instructs to restart the operation for preparing medicines. When the instruction for restart is recognized (step 409), identification codes are read again, the database for accommodated medicine is updated on the basis of results of reading and the routine returns to step 406. When it is confirmed that all medicines necessary for a prescription have been accommodated (step 407), the process proceeds to an operation for preparing medicines (step 411).

Figure 45:
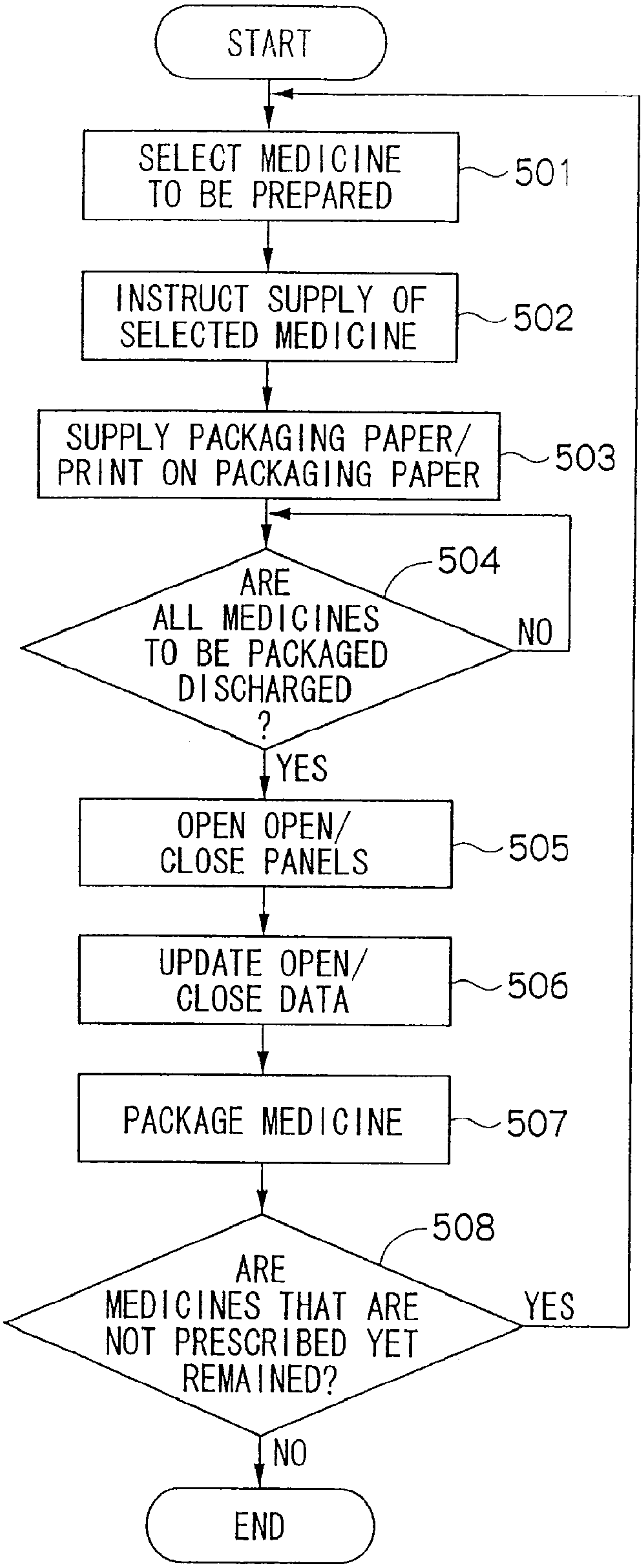
FIG. 45 is a flowchart illustrating a procedure (subroutine) for a medicine preparation operation performed in a step of medicine preparation in the medicine preparation system.

FIG. 45 illustrates a procedure (subroutine) for performing the operation for preparing medicines. The tablet cases 3 for medicines to be prepared are successively selected on the basis of the prescribed medicine table on a package basis in the order of being inputted (step 501).

Then, the selected medicine is instructed to be supplied from the tablet case 3 accommodating the selected medicines (step 502). In accordance with this instruction, the processor for controlling the operation for supplying medicine starts a predetermined procedure (routine) for supplying medicine to be described later. This routine is preferably performed in parallel with other processings in order to improve the efficiency of the system. Thus, this routine proceeds by being controlled by different processor on the basis of the instruction to start supply of the selected medicine. The microcomputer 97 of this embodiment is structured so as to have two or more processors capable of processing in parallel. The routine for supplying the selected medicine is performed and medicine to be packaged is supplied onto the open/close panels 63A and 63B of the shutter 53.

During this routine, in step 503, the packaging paper 72 for packaging medicine starts to be supplied. The printer 73 prints predetermined items about selected prescribed medicine onto a fed packaging paper on the basis of the data of the prescribed medicine table.

When it is confirmed by an unillustrated sensor or the like that the routine for supplying medicine ends (step 504), the open/close panels 63A and 63B are opened (step 505) and medicine is charged through the hopper 54 into the packaging paper 72 placed immediately below the nozzle 74. This opening/closing updates data in a table for managing operating parts to be described later as a part of data for performing maintenance of operating parts (step 506).

Then, it is instructed in step 507 to start packaging of medicine. A packaging paper is fed to the thermal sealing head and the opening portion of the packaging paper 72 is closed thereat. Then, the packaging paper 72 is cut at a predetermined position and outputted outside from the output port 72.

When it is instructed to start packaging of medicine in step 507, the procedure proceeds to step 508. It is determined by making reference to the table for prescribed medicines whether there exists medicines that are in the table for prescribed medicines but not selected yet as medicines to be prepared (step 508). If the answer to the determination in step 508 is affirmed, the routine returns to step 501. Then, the medicine in the next order in the prescribed medicine table is selected and the above-described procedure is repeated for this medicine.

Figure 27:
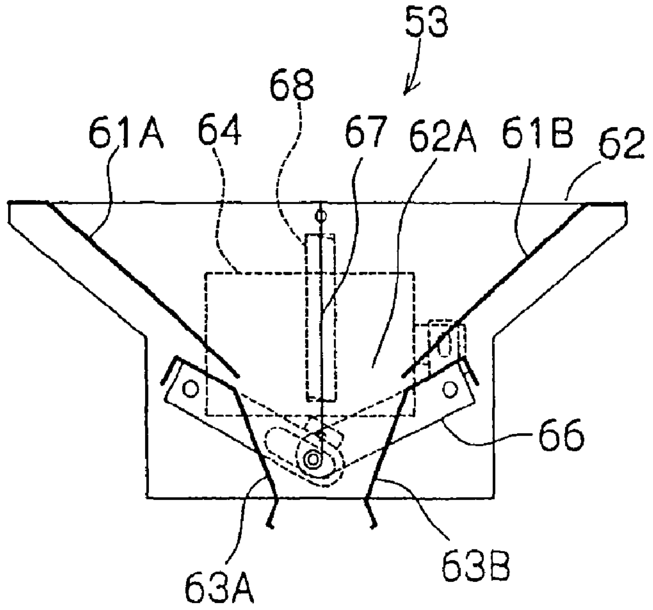
FIG. 27 is another vertical front view of the shutter in the medicine supply apparatus shown in FIG. 1.

Namely, the microcomputer 97 energizes the shutter solenoid 64 to open the open/close panels 63A and 63B (see FIG. 27). Medicine passes into the hopper 54 and is charged into the packaging paper 72 via the nozzle 74. The medicine is packaged by the above-described packaging machine 13 and then sent to outside at the output port 82. Packaging starts when the medicine passes from the shutter 53 to the hopper 54 and the next medicine is discharged before the previous packaging is completed. Thus, the microcomputer 97 reduces the time required for packaging. Above-described printing with respect to medicine to be packaged is performed by the printer 73 before the medicine is charged.

If the answer to the determination in step 508 is negative, the procedure for performing the medicine preparation operation ends. Then, the process returns to P1 in the routine for medicine preparation system shown in FIG. 44 and is placed in a state of waiting for next prescription data to be inputted. Namely, the process waits to an instruction to stop the system or an instruction to start a new prescription.

Figure 46:
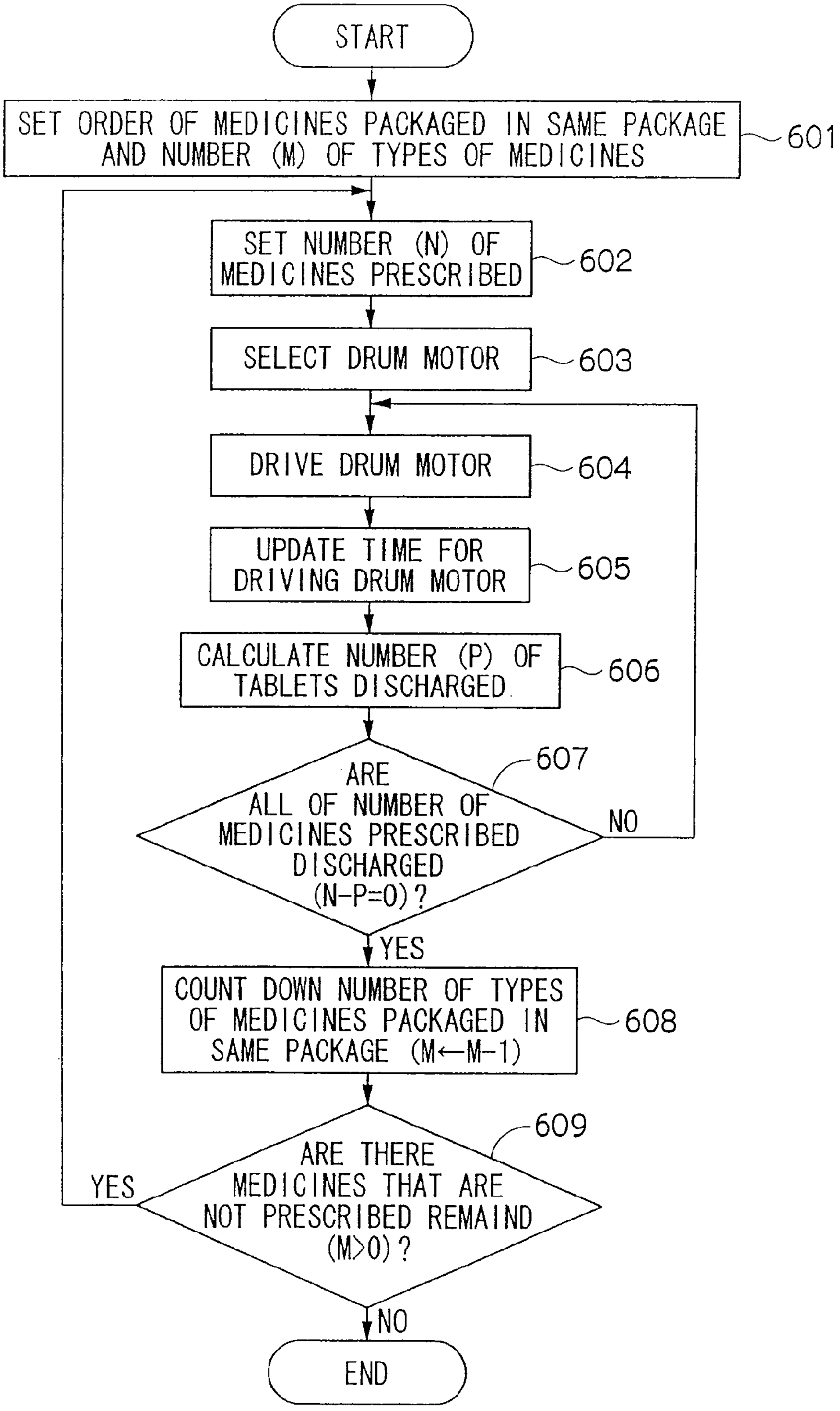
FIG. 46 is a flowchart illustrating a medicine supply procedure (routine) performed by a processor different from a processor performing the main routine on the basis of an instruction made in a step of supplying selected medicine in the procedure for the medicine preparation operation.

FIG. 46 illustrates a procedure for supplying the selected medicine. In accordance with this procedure, the drum motor 14 for the tablet case accommodating the selected medicine is rotated forward by the driver 94 and thus the discharge drum 23 is rotated (in forward), so that medicine within the vertical groove 24 is discharged one by one into the discharge port 21. At this time, the processor of the microcomputer 97 governing this control inputs a medicine detection signal from the medicine detection sensor 18 and counts discharged medicines. When a predetermined number of medicines are discharged, the drum motor 14 is stopped. Discharged medicines enter from the discharge chute 19 into the chute 32 formed of the paths 9 and are temporarily received by the shutter 53.

Specifically, when it is instructed to supply selected medicines in the procedure for performing the medicine preparation operation shown in FIG. 45 (step 502), a routine for performing supply of selected medicines shown in FIG. 46 starts and an initial setting is performed. Namely, with respect to medicines selected on the basis of a package in step 501 in the procedure for performing the medicine preparation operation, the number (M) of types of medicines to be accommodated within the same package and the order of supplying the medicines are set on the basis of the prescribed medicine table data and stored in a predetermined storage region.

The procedure proceeds to step 602. In step 602, a medicine in the first order is selected and the prescribed number (N) of the medicines is stored in another predetermined storage region on the basis of the prescribed medicine table data.

Then, the procedure proceeds to step 603. The drum motor 14 for the tablet case 3 for the firstly selected medicine is driven for a predetermined period of time so that the vertical groove 24 of the drum coincides the discharge port 21 (step 604). The drive time is used for updating the data of the table for managing operating parts to be described later as a part of the operating part maintenance data (step 605). When the medicines pass into the discharge port 21, its number (P) is detected by the medicine detection sensor 18 and counted (step 606). In step 607, the number (P) does not reach the prescribed number (N) of the medicines in the prescribed medicine table (N−P>0), namely, if it does not satisfy N−P=0, the routine returns to step 604 and a discharge operation is repeated until the number of discharged medicines coincides the prescribed number of medicines. If the discharged number of medicines does not satisfy the prescribed number of the medicines after a predetermined period of time passes, the medicine supply apparatus 1 may be structured to indicate an abnormality that the selected medicine does not remain within the accommodating container 51.

When the discharged number coincides with the prescribed number, this routine proceeds to step 608. The number of types of medicines to be accommodated within the same packaging paper that is stored in a predetermined storage region is subtracted 1 (M→M±1). In next step 609, it is determined whether or not medicines that are not prescribed yet exist (M=0?). If there exists medicines that are not prescribed yet, the procedure returns to step 602 and the medicine in the next prescription order is selected and its number (N) is set again. Then, the operation for supplying the medicine is repeated. If it is determined in step 609 that all types of medicines to be accommodated within the same package have been supplied, this routine ends.

As described above, 320 tablet cases 3 are accommodated within the tablet case accommodating section 8 in this embodiment. Accordingly, at most 320 types of medicines can be supplied and packaged. When medicines used cannot be accommodated within the case accommodating section 8, the accommodating containers 51 for the tablet cases 3 in the shelves 2 at the right and left end sides of the case accommodating section 8 (i.e., at the side walls of the case accommodating section 8) are exchanged for the accommodating containers 51 accommodating necessary types of medicines. Identification codes for the exchanged accommodating containers 51 are read by the identification sensors 33 and inputted to the microcomputer 97. Read data of new medicines is added to the database.

One or a plurality of tablet cases 3 for one or a plurality of types of medicines to be charged do not exist within the case accommodating section 8, the microcomputer 97 sends data to the personal computer PC to display a guide about exchange of tablet cases 3 on the screen of the personal computer PC. The microcomputer 97 sends data to the personal computer PC to display, on the screen thereof, a guide about the positions (addresses) of the accommodating containers 51 for the tablet cases 3 that may be removed. For example, when a plurality of types of medicines are charged into a package, accommodating containers 51 other than the accommodating containers 51 accommodating the medicines to be charged are displayed in a guide as exchangeable containers. Thus, it is possible to prevent a drawback that when a plurality of types of medicines are charged into a package, in order to mount accommodating containers 51 for medicines that do not exist in the case accommodating section 8, accommodating containers 51 accommodating medicines that should be charged into the package are removed.

Then, the microcomputer 97 controls the driver 94 to perform an abnormality detection operation. In accordance with this abnormality detection operation, the drum motor 14 is periodically rotated in reverse for a predetermined short period of time (e.g., for 10 ms) and then rotated forward for the same period of time. The time interval during which the drum motor 14 is rotated forward or in reverse in the abnormality detection operation is sufficiently shorter than a time interval during which the vertical groove 24 coincides the discharge port 21 by rotation of the discharge drum 23 (i.e., a time interval during which medicine is discharged).

The microcomputer 97 fetches an energized current value for the drum motor 14 during the abnormality detection operation by the current transformer 96. If a current is not applied to the drum motor 14, it is determined that windings of the drum motor 13 are disconnected and an alarm operation is performed. Data of this alarm is sent to the personal computer PC and displayed on its screen. This abnormality detection operation is successively performed upon the drum motors 14 for all tablet cases 3. Because the time during which the drum motor is rotated forward or in reverse in the abnormality detection operation is sufficiently shorter than the time required for medicine to be discharged, medicine is not discharged.

In particular, the drum motor 14 is firstly rotated in reverse. Thus, even if a medicine tends to fall into the discharge port 21 from the vertical groove 24 in the previous discharge operation (the drum motor 14 was rotated forward), this medicine is not discharged into the discharge port 21.

Figure 47:
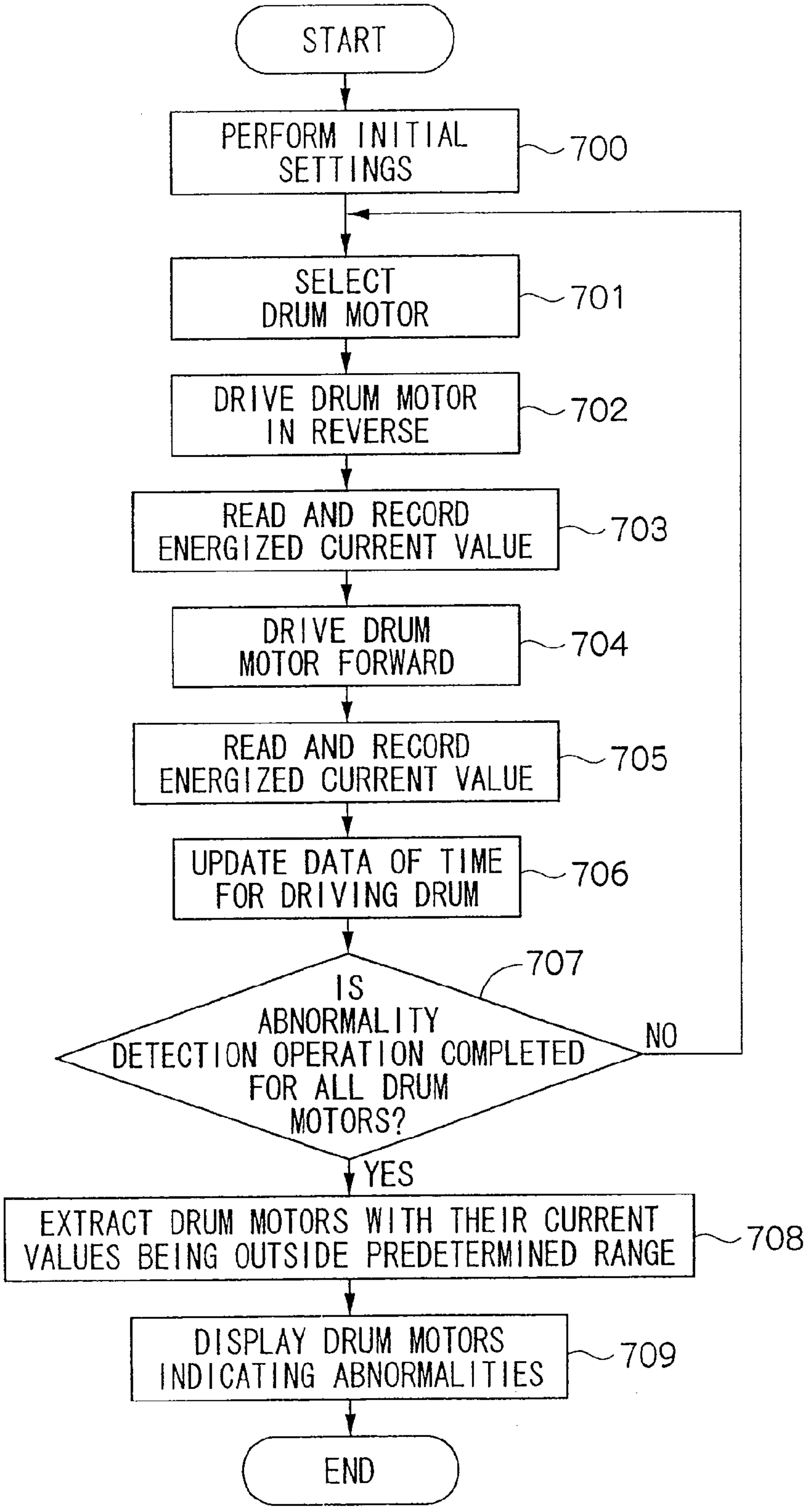
FIG. 47 is a flowchart illustrating a processing procedure (subroutine) performed in a step of checking the operation of a drum motor in the medicine preparation system.

FIG. 47 illustrates a control procedure (routine) for a processing for checking the operation of the drum motor 14 for the tablet case 3.

The drum motors 14 are ordered in advance for check and the abnormality detection operation is performed in this order. When the routine starts, in a step for initial setting in step 700, order information for the abnormality detection operation is read and settings necessary for performing this routine are performed. The order information may be stored in the external storage or in the personal computer PC.

In step 701, the first drum motor 14 to be subjected to the abnormality detection operation is selected in accordance with the order (step 701). The selected drum motor 14 is energized for a predetermined period of time so as to be rotated in reverse (step 702) and a current value at that time is read and recorded in a predetermined storage region (step 703). Then the drum motor 14 is energized for a predetermined period of time so as to rotate forward (step 704) and a current value at that time is also read and recorded in a predetermined storage region (step 705). The time during when the drum motor 14 is driven for such check operations is added to the table for operating parts to be described later and the data of the table is updated (step 706).

Then, the routine proceeds to step 707 and it is determined whether the abnormality detection operation has been ended for all drum motors 14 to be subjected to operational check (step 707). If the answer to the determination in step 707 is negative, the routine returns to step 701 and the drum motor 14 in the next order is selected and the steps 701 to 707 are repeated for the drum motor. If it is determined in step 707 that the abnormality operation has been ended for all drum motors 14, the routine proceeds to step 708. In step 708, it is determined on the basis of the current value data in the storage region whether the current values read by experimentally driving the drum motors 14 are within a predetermined range, extremely larger or smaller than the predetermined range, or whether none of current values is measured. Then, drum motors 14 with current values outside the predetermined range are extracted. If a current value is extremely small or not measured at all, it is estimated that connection inferior or disconnection may occur. If a current value is extremely large, it is estimated that overload may occur because of some causes.

Basically, such abnormality detection operation is periodically performed for all drum motors 14 in turn. A drum motor list for identifying a drum motor 14 is prepared for each of types of abnormalities. A display for identifying the drum motor 14 that an abnormality operation occurs (e.g., positional information of the tablet case 3) is displayed on the screen of the personal computer PC (step 709) and then this routine ends.

The microcomputer 97 energizes, on the basis of the instruction data from the personal computer PC, one or a plurality of the keep solenoids 42 corresponding to one column of the shelves 2 or all columns of the shelves 2 identified by an input operation to the personal computer PC to protrude the plungers 42A rearward, so that the corresponding stays are in a locked state. Thus, all shelves 2 in a column corresponding to the keep solenoid 42 (or all columns of the shelves 2) cannot be drawn as described above (see FIG. 22). In order to unlock, the keep solenoid 42 is energized in an opposite direction on the basis of an input operation to the personal computer PC. The plunger 42A is retracted as described above (see FIG. 23).

An access right for lock and unlock operations is set by a user in the personal computer PC (a password or the like). Thus, it is possible to prevent the drawback that the shelves 2 are carelessly drawn and different medicines are accommodated within the tablet cases 3.

The microcomputer 97 determines by the lock sensor 43 whether the stay 34 is in the above-described released state or in a restricted state. When any of the shelves 2 is drawn, the keep solenoid 42 corresponding to the column with the stay 34 being in a restricted state is not subjected to the above-describe lock operation. Thus, it is possible to prevent the lock member 41 of the stay 34 in a restricted state from being engaged with the plunger 42A of the keep solenoid 42 and not being capable of rotating.

As described above, the locked state of the keep solenoid 42 may be manually released by drawing the unlock lever 44. Thus, even if the keep solenoid 42 is broken and its locked state cannot be released, the shelves 2 can be drawn smoothly.

The microcomputer 97 adds up the operating time for the drum motors 14 in the above-described operation for discharging medicine and packaging the same. Further, the microcomputer 97 also adds up the frequencies of operations for the shutter solenoids 64, the keep solenoids 42, the thermal sealing head 76 for the packaging machine 13 and the thermal transfer head 93 for the printer 73. Durability limit values for such parts that wear out are inputted and set in the microcomputer 97.

When the operating time or the frequency of operation for such part that wears out approximates or reaches its durability limit value, the microcomputer 97 sends failure prediction data to the personal computer PC to display on the screen for the personal computer PC a failure prediction that the corresponding wear-out part may be broken with high possibility. Thus, a user can exchange in advance the drum motor 14, the shutter solenoid 64, the keep solenoid 42, the thermal sealing head 76 or the thermal transfer head 93 approximating or reaching their durability limits. Consequently, it is possible to prevent a delay of supply of medicines due to such wear-out parts being broken.

Figure 48:
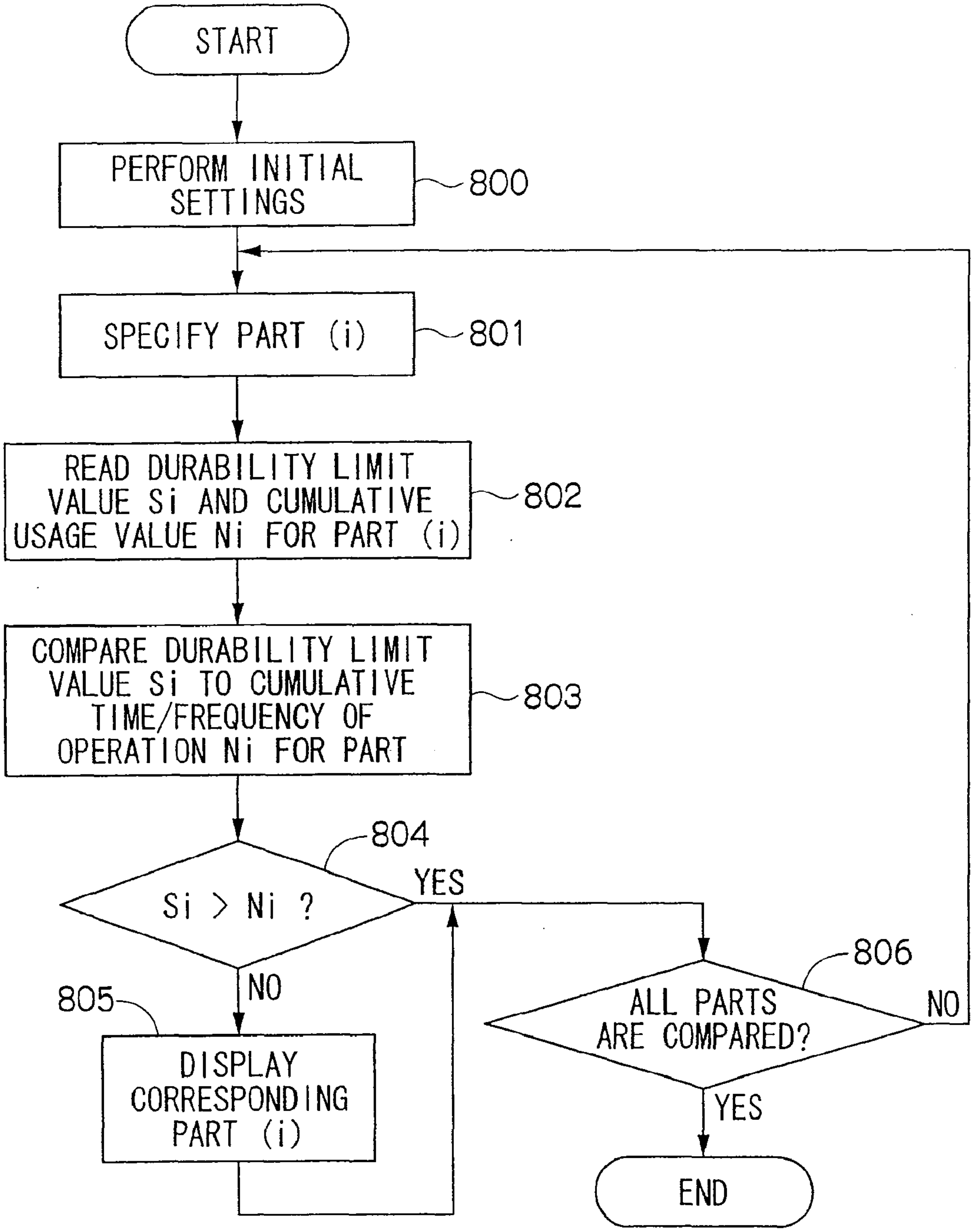
FIG. 48 is a flowchart illustrating a processing procedure (subroutine) performed in a step of checking a cumulative value for usage time/frequency of operation for an operating part in the medicine preparation system.

FIG. 48 illustrates a procedure for checking an add-up value that relates to the usage for the operating elements (operating parts) serving as the wear-out parts, i.e., a cumulative usage time or a frequency of operation. A table for operating parts stores data of the order of the operating parts used for the system being checked with respect to their operations and durability limit values for such parts relating to their usage (i.e., cumulative usage times or cumulative frequencies of operation). This table is stored in a memory (which may be a storage externally connected to the microcomputer 97 or a hard disk for the personal computer PC). When the microcomputer 97 instructs each of the operation parts to operate, its usage time or its usage number is accumulated every time when the operation of the operating part ends and written in the table for each corresponding operating part.

When it is instructed in step 402 shown in FIG. 44 to check the cumulative usage time or the usage number for operating parts, a processing procedure (a routine) shown in FIG. 48 starts. In step 800, the data of the checking order is read and thus the order is set. Further, initial settings necessary for performing this routine are performed. In step 801, the first part is specified in accordance with the predetermined order and then the data relating to this part in the operating part table is read (step 802).

In steps 803 and 804, the durability limit value (Si) for this part (i) relating to the usage time or the frequency of operation is compared to the cumulative usage time or the cumulative frequency of operation (Ni) at that time for the part. If the cumulative usage time or the cumulative frequency of operation (Ni) coincides the durability limit value (Si) or exceeds the same in step 804, it is determined that the part reaches its durability limit and is displayed on the screen for the personal computer PC (step 805).

Thereafter, similar to the case that it is determined in step 805 that the part does not reach its durability limit, this routine proceeds step 806. Then, this routine returns to step 801 unless it is determined that all operating parts to be checked are compared, and a part to be compared next is specified in accordance with the order. On the other hand, if all parts have been compared, this routine ends.

Figure 35:
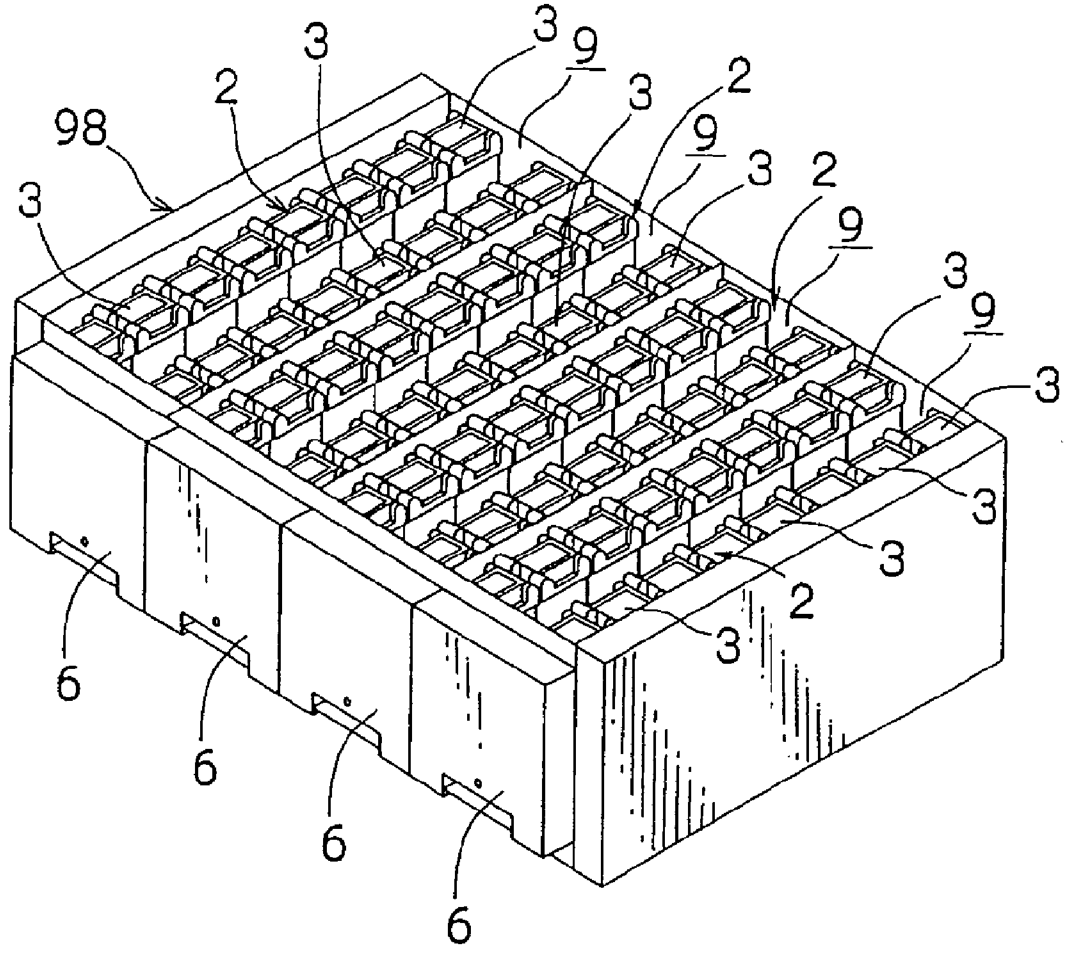
FIG. 35 is a perspective view of an additional unit in the medicine supply apparatus shown in FIG. 1.

FIG. 35 illustrates an additional unit 98 which can be mounted to the medicine supply apparatus 1. For example, in a large-scale hospital, 320 tablet cases 3 as shown in FIG. 1 may be insufficient. Then, in such case, the top roof 1A of the upper structure 7A is removed and the additional unit 98 is connected on the upper structure 7A with its top surface being opened and fixed thereto (the top roof 1A is mounted on the top surface of the additional unit 98). Four shelves 2 are arranged horizontally in the additional unit 98 so as to be freely drawn. Thus, 64 tablet cases 3 are added.

Each of the lower ends of the paths 9 for the shelves 2 in the additional unit 98 corresponds to each of the upper ends of the paths 9 for the underlying shelves 2 within the case accommodating section 8. Such paths 9 structure chutes 32. The drum motors 14 for the tablet cases 3 and the medicine detection sensors 18 in the additional unit 98 are connected to the microcomputer 97 and the same discharge operation as the above-described one is performed.

Figure 36:
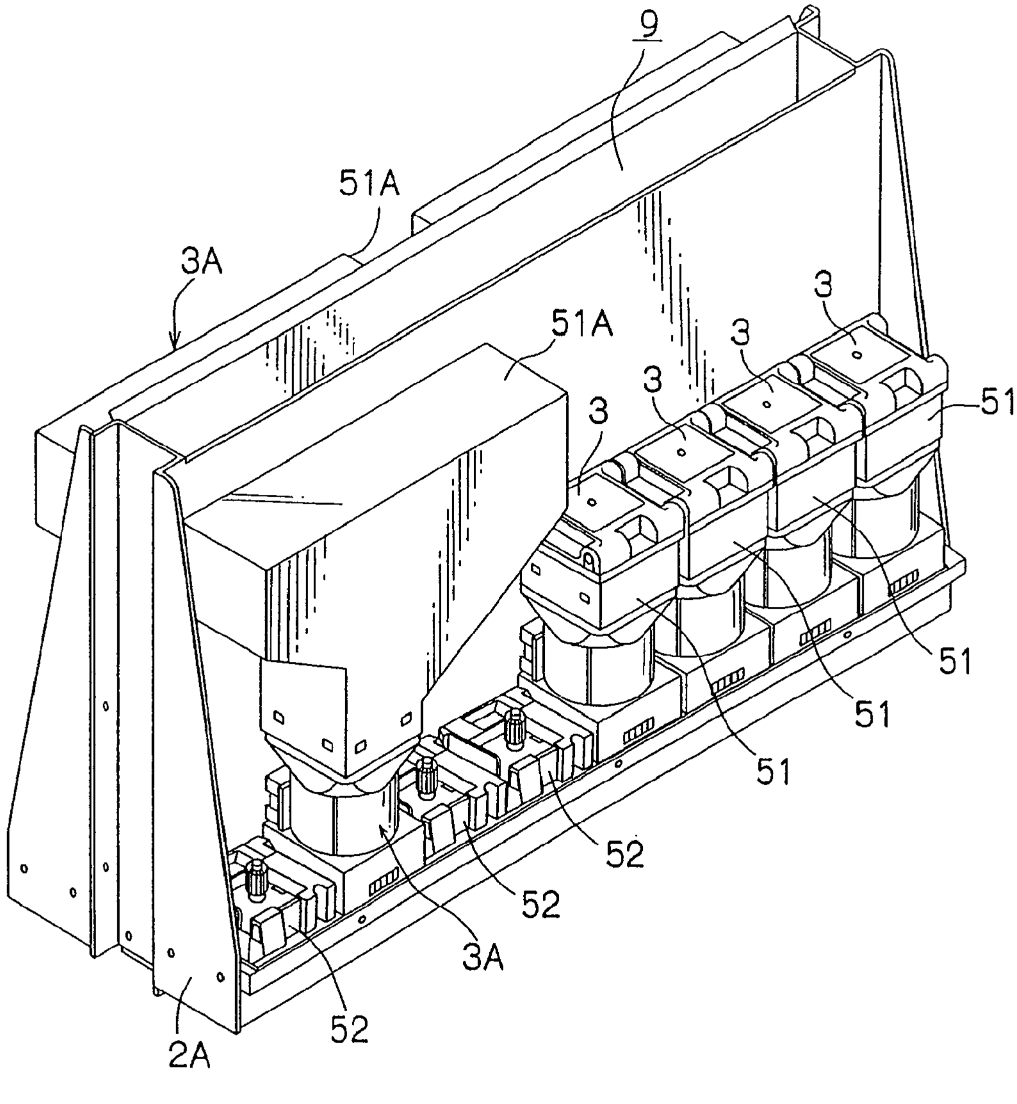
FIG. 36 is a perspective view of another example of a shelf in the medicine supply apparatus shown in FIG. 1.
Figure 37:
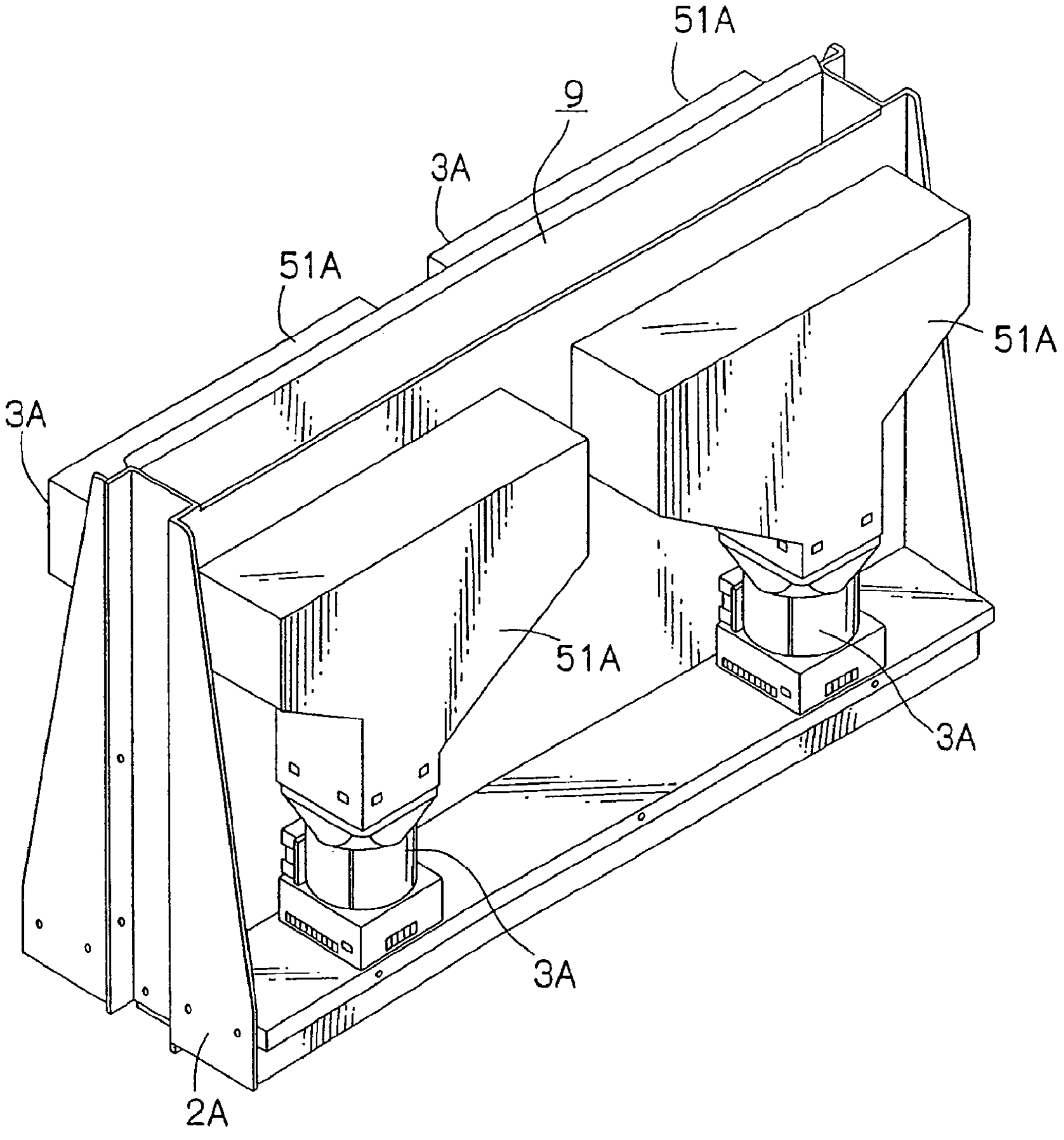
FIG. 37 is a perspective view of yet another example of a shelf in the medicine supply apparatus shown in FIG. 1.

As shown in FIGS. 36 and 37, a shelf 2A which has a height twice higher than the shelf 2 can be provided within the case accommodating section 8 so as to be freely drawn. As shown in the figures, a tablet case 3A with an accommodating container 51A with large capacity is mounted to the shelf 2. FIG. 36 illustrates the example that the normal tablet case 3 and the tablet case 3A with large capacity are mounted in a mixed manner. FIG. 37 illustrates the example that only the tablet case 3A with large capacity is mounted. In both cases, the above-described harness 28 is connected to the shelves by connectors.

Figure 38:
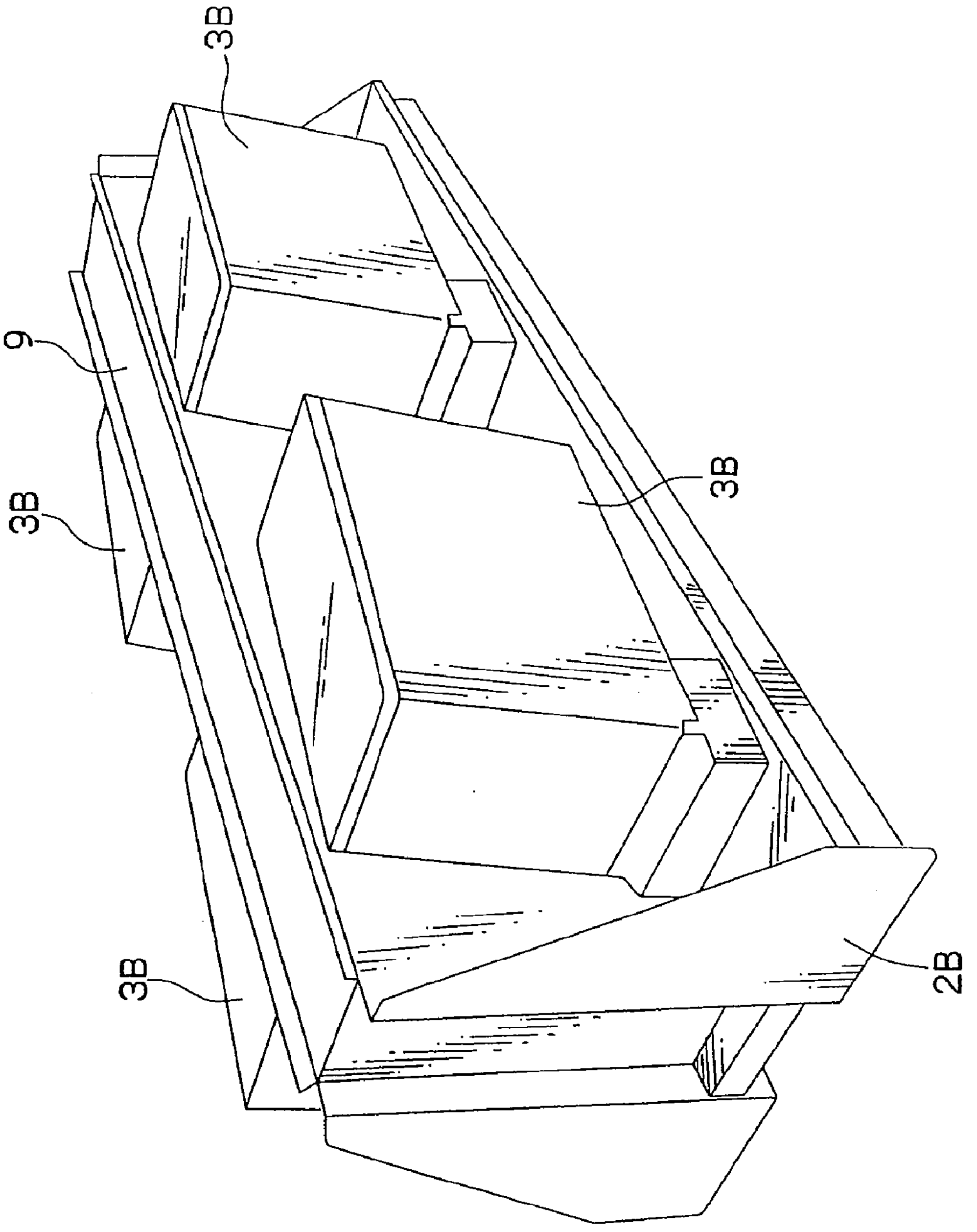
FIG. 38 is a perspective view of yet another example of a shelf in the medicine supply apparatus shown in FIG. 1.
Figure 39:
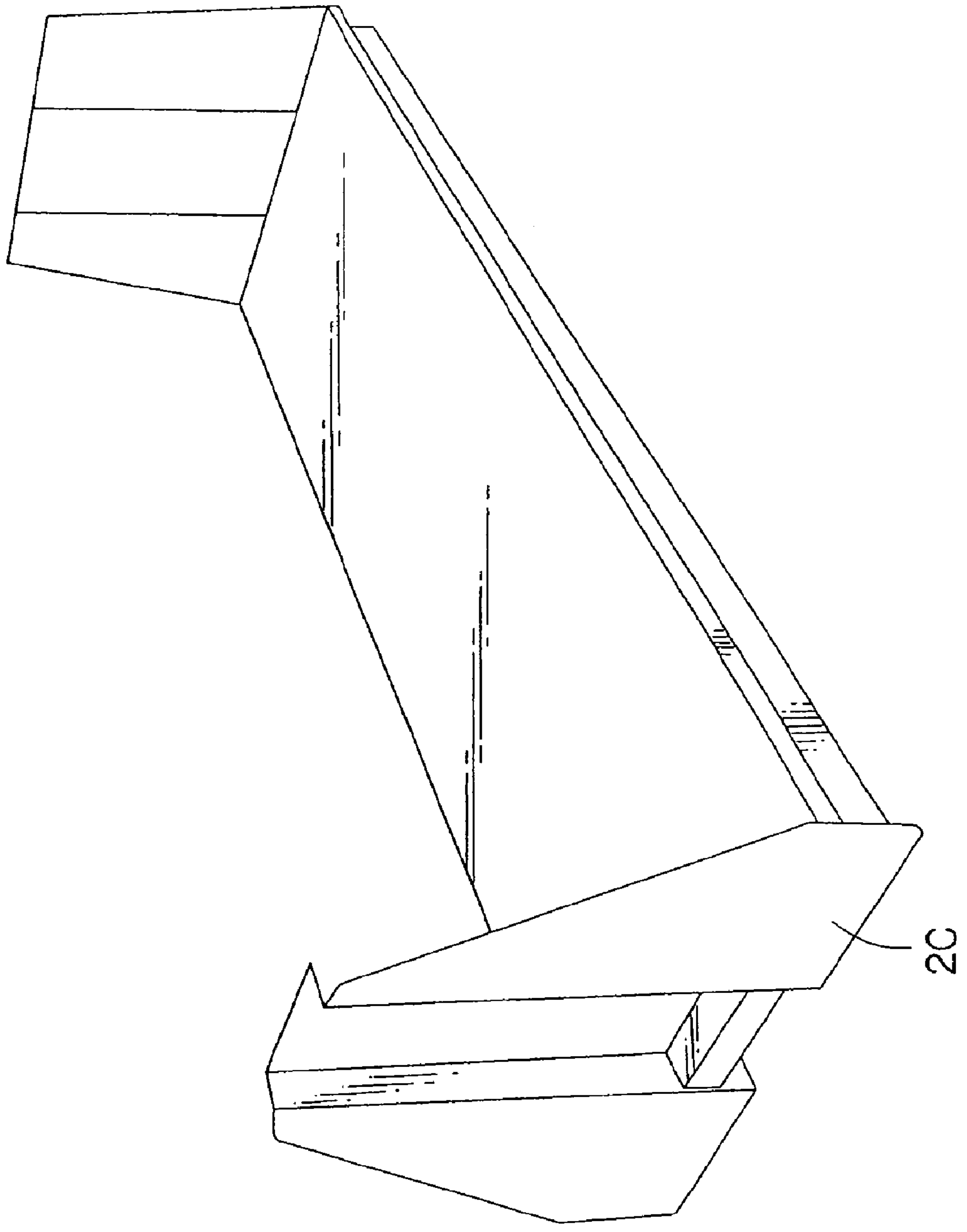
FIG. 39 is a perspective view of yet another example of a shelf in the medicine supply apparatus shown in FIG. 1.

A shelf 2B to which a tablet case 3B for half-tablet medicine (halved tablet) is mounted can be provided within the case accommodating section 8 so as to be freely drawn, as shown in FIG. 38. The above-described harness 28 is also connected to this shelf 2B by connectors. As shown in FIG. 39, a shelf 2C with none of tablet cases being mounted thereto can be provided within the case accommodating section 8 so as to be freely drawn. For example, medicine that is packed in a corrugated cardboard box and is not opened yet is mounted on the shelf 2C. Naturally, the harness is not connected to this shelf.

As described above, various shelves including the shelves 2A and 2B with different tablet cases being mounted thereto and the shelf 2C which is not connected to a power source can be provided within the case accommodating section 8 so as to be freely drawn. Thus, the facility of the medicine supply apparatus 1 is significantly improved.

Figure 40:
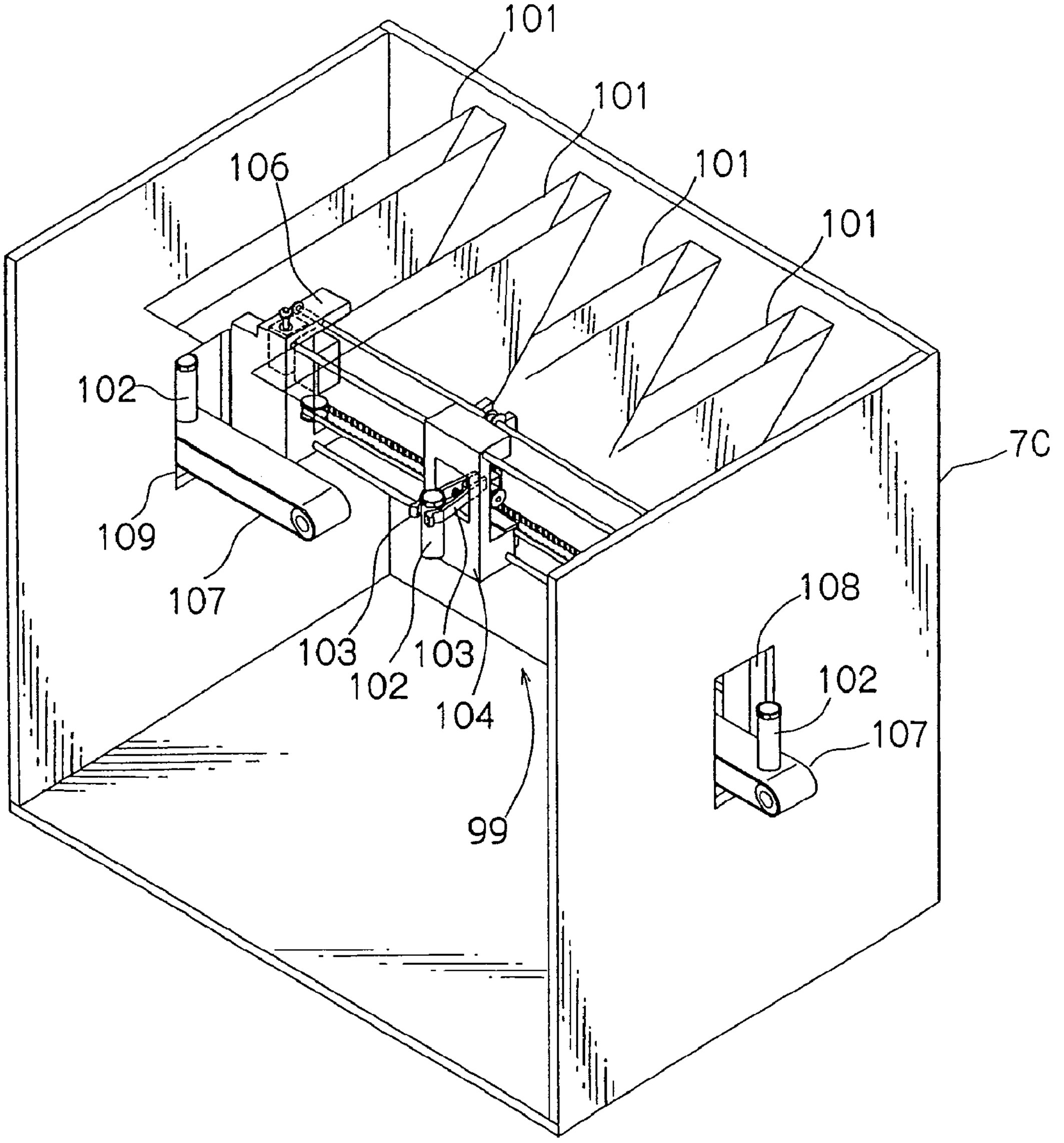
FIG. 40 is a perspective view of another example of a lower structure in the medicine supply apparatus shown in FIG. 1.
Figure 41:
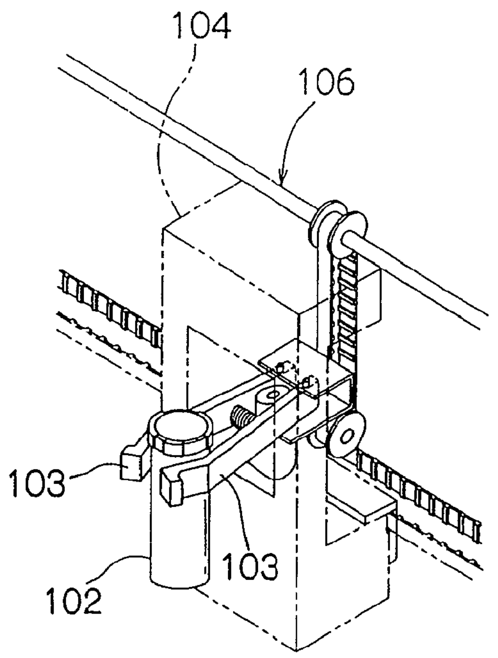
FIG. 41 is a perspective view of a catcher portion of the lower structure shown in FIG. 40.
Figure 42:
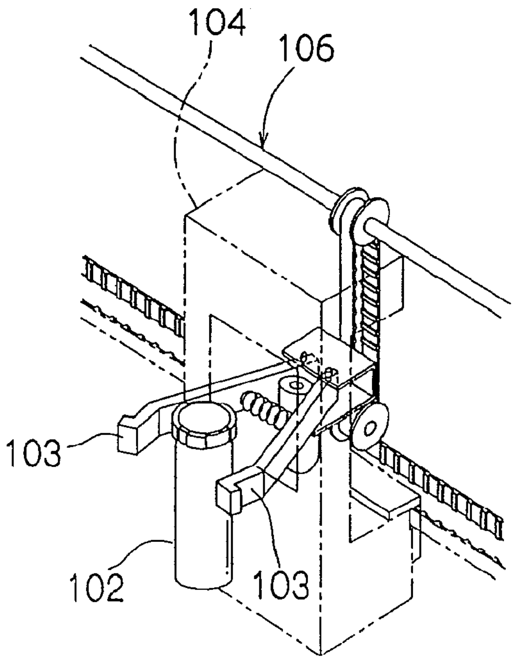
FIG. 42 is another perspective view of the catcher portion of the lower structure shown in FIG. 40.

FIG. 40 illustrated another lower structure 7C. The lower structure 7C can be connected to the lower end of the upper structure 7A. By the lower structure 7C being connected to the upper structure 7A, the main body 7 for the medicine supply apparatus 1 is structured. A bottling machine 99 serving as a charging device is mounted within the lower structure 7C. Four hoppers 101 are arranged in parallel above the bottling machine 99 so as to correspond to the lower ends of the chutes 32 in the upper structure 7A. The shutter 53 is not provided.

The bottling machine 99 is formed by a catcher 104 with grip arms 103 for gripping a bottle 102 serving as a container, a moving device 106 for horizontally and vertically moving the catcher 104 and a conveyor 107 for conveying the bottle 102. The bottle 102 conveyed from an insertion opening 109 by the conveyer 107 is gripped by the grip arms 103 of the catcher 104. While gripped by the grip arms 103, the bottle 102 is moved by the moving device 106 under the lower end opening of the hopper 101 through which a discharged medicine passes. In this way, the medicine is charged into the bottle 102. The bottle 102 with the medicine being charged therein is conveyed by the conveyer 107 to an output port 108.

In addition to lower structures accommodating the above-described packaging machine 13 and the bottling machine 99, there may be considered a lower structure that accommodates a charging device referred to as a so-called blister packaging machine. As the lower structures 7B and 7C with various types of charging devices can be alternatively connected to the lower side of the same upper structure 7A, medicine supply apparatuses comprising a case accommodating section and various charging devices need not to be prepared individually. Thus, the flexibility of the medicine supply apparatus is significantly improved and a reduction in production costs may be accomplished.

In accordance with this embodiment, data is inputted to the medicine supply apparatus 1 by a separate personal computer PC. Nevertheless, the invention is not limited to this case. Alternatively, or in addition to such case, a control panel 111 may be mounted to any of the shelves 2. The prescription data may be inputted by the control panel 111. Further, an alarm may be displayed on the control panel 111.

Figure 43:
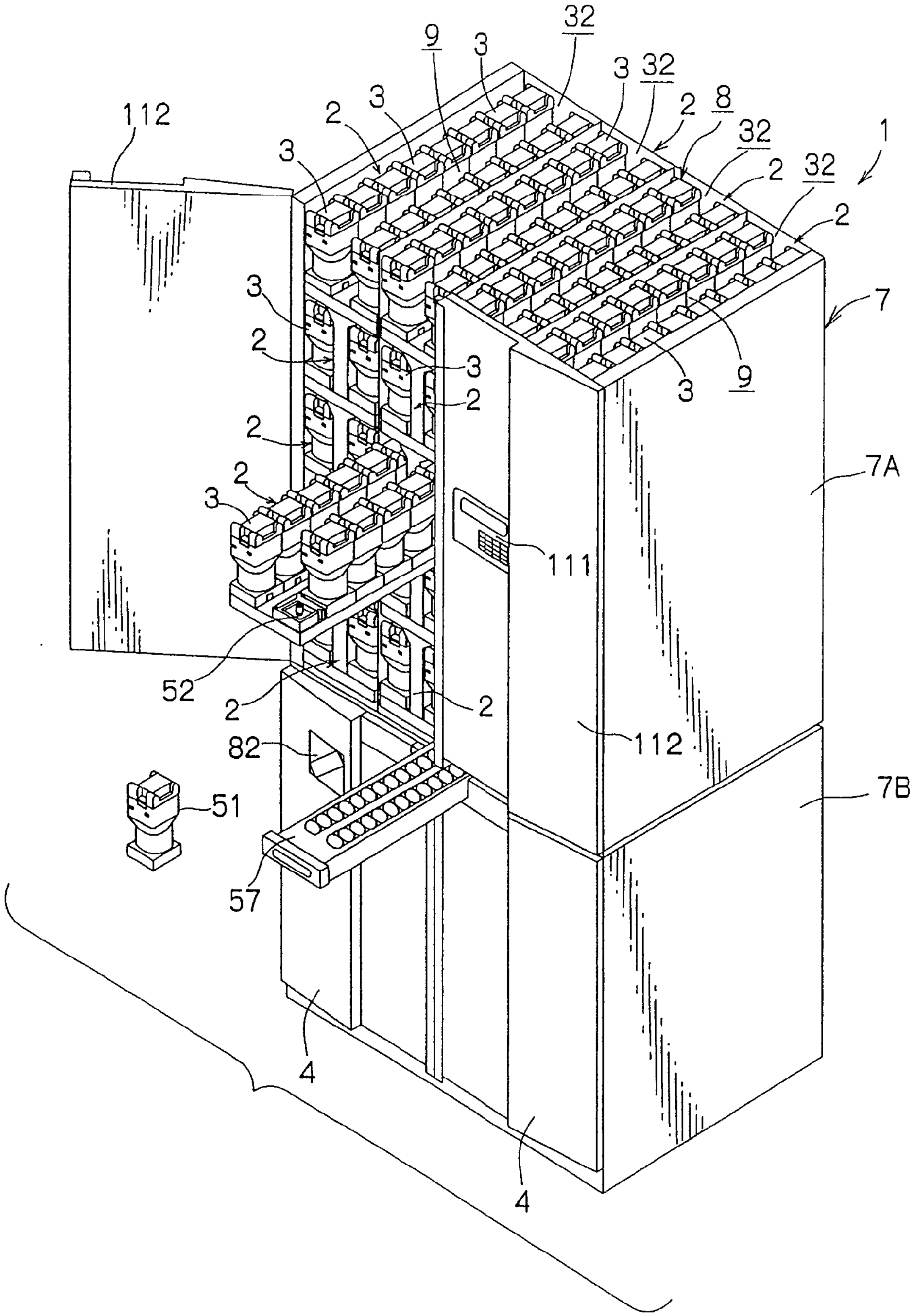
FIG. 43 is a perspective view of a medicine supply apparatus relating to another embodiment of the invention (with a top roof removed).

In accordance with this embodiment, a plurality of door panels 6 are respectively mounted to a plurality of shelves 2 accommodated within the case accommodating section 8 so as to be freely drawn, so that the front surface opening of the upper structure 7A (the case accommodating section 8) is closed by the panels 6. Nevertheless, the invention is not limited to this case. As shown in FIG. 43, panels are not mounted to the shelves 2. Instead, the front surface opening of the upper structure 7A may be closed by upper panels 112 opening together on hinges. In such case, a lock operation for prohibiting drawing of all shelves 2 is accomplished by locking the upper panels 112.

Further, in accordance with this embodiment, the identification code 26 is provided as the means for identifying the tablet case 3 and the optical identification sensor 33 is provided as the reading means. Nevertheless, an IC memory with identification information recorded therein may be provided at the tablet case 3, and a sensor for reading the information recorded in the IC memory by an electric field in an untouched manner may be provided at the case accommodating section 8. Moreover, in accordance with this embodiment, only the identification codes 26 for the tablet cases 3 at the right and left wall sides of the case accommodating section 8 are read by the identification sensors 33. The identification codes 26 for all tablet cases 3 within the case accommodating section 8 may be read.

The drum motor 14, the keep solenoid 64, the thermal sealing head 76 and the thermal transfer head 93 are provided as parts that wear out (operating elements) in this embodiment. Nevertheless, the invention is not limited to this case. Various types of parts that wear out used in this type of the medicine supply apparatus 1 may be provided as the parts that wear out.

Figure 33:
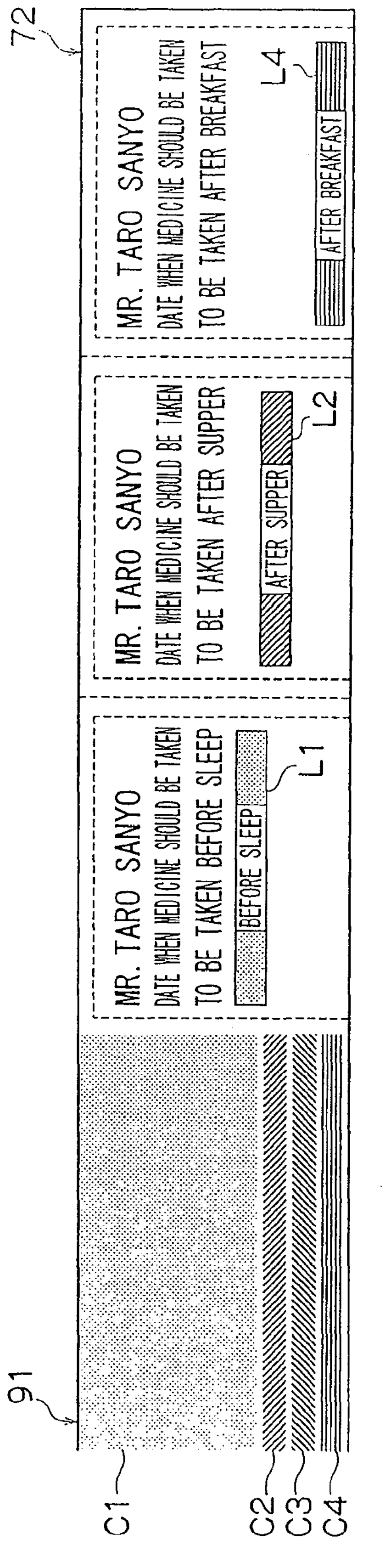
FIG. 33 is a view illustrating another example of the result of printing onto the packaging paper in the medicine supply apparatus shown in FIG. 1.

Although color printing is performed by the printer 73 onto the packaging paper 72 in accordance with this embodiment, the invention is not limited to this case. In the case shown in FIG. 40, a printer that color-prints the same information as in FIGS. 32 and 33 on a label attached to the bottle 102 may be provided within the lower structure 7C.

As described above, in accordance with a first aspect of the invention, each of tablet cases is identified by control means (control device) on the basis of identification information read by a reader (reading means) and discharge of medicine from each of the tablet cases is controlled.

Thus, the operation for detaching electric wirings when tablet cases are exchanged becomes unnecessary and thus the handling workability is significantly improved.

As shown a preferred aspect, information for instructing exchanges for tablet cases may be outputted by the control means (control device) on the basis of the identification information read by the reader (reading means). For example, if medicines to be charged do not exist in a case accommodating section when a plurality of types of medicines are charged in a package, exchangeable tablet cases may be designated. Thus, it is possible to prevent the tablet cases accommodating medicines to be charged in the package from being removed, resulting in a significant improvement in utility.

An optically readable identification code provided on the surface of a tablet case serves as the identification means (identifier) and an optical sensor capable of reading the identification code serves as the reader (reading means). Thus, an electric circuit for a tablet case can be simplified and a significant reduction in costs can be accomplished.

In accordance with a second aspect of the invention, a disconnection failure of motor can be reliably detected and a maintenance for the motor can be performed rapidly.

As the time during which the motor is rotated forward or in reverse in an abnormality detection operation (abnormality detection mode) is sufficiently shorter than the time interval during which medicine is discharged, medicine cannot be discharged by mistake. Further, the motor is firstly rotated in reverse. Thus, even if the next medicine is to be discharged in the previous discharge operation, the medicine cannot be discharged by mistake.

In accordance with a more preferable aspect, the control device successively performs the abnormality detection operation upon a plurality of tablet cases. Thus, in a case that a plurality of tablet cases are provided, disconnection failures of motors corresponding to the tablet cases can be smoothly detected.

In accordance with a third aspect of the invention, when operating elements serving as parts that wear out including a motor for driving a drum, a shutter, a thermal sealing device for packaging paper and a printer for packaging paper approximate their durability limits or reach them, it is possible to inform a user of failures and to ask the user to perform maintenance for the corresponding parts.

Thus, it is possible to conduct such operations as exchanging parts that wear out before they are broken and to prevent supply of medicine from being stopped by failures.

In accordance with a fourth aspect of the invention, the medicine supply apparatus comprises a printer with color print function (print mechanism) for printing on a container or a label for the container. For example, color ink ribbons may be used and time slots in which medicine should be taken may be displayed by different colors. Thus, how to take medicine can be shown clearly with different colors and the facility is significantly improved.

The invention may be used as a medicine supply apparatus that is installed at hospitals or pharmacies and supplies the determined number of medicines accommodated in tablet cases to a container (a bottle or a bag) on the basis of a prescription. Thus, automation and efficiency for prescription can be significantly improved.

What is claimed is:

1. A medicine supply apparatus, comprising a plurality of tablet cases for accommodating medicines, provided within a case accommodating section of a main body; a chute through which medicines discharged from the tablet cases pass; a hopper provided below the chute; a charging device for charging medicines received by the hopper into a container; identification means that is provided at each of the tablet cases and has identification information for identifying the tablet case; a reader for reading, in a non-contact manner, the identification information in the identification means for the tablet cases provided within the case accommodating section and a control device having a microcomputer and a memory with computer implemented instructions that when executed cause the microcomputer to receive prescription data, store the data in a prescribed medicine table and output information about exchange of tablet cases including an indication of tablet cases positioned in the case accommodating section that accommodate medicines not listed in the prescribed medicine table.

2. The medicine supply apparatus according to claim 1, wherein the control device is configured to control the discharge of medicine from tablet cases on the basis of the identification information read by the reader.

3. The medicine supply apparatus according to claim 2, further comprising an information output device, wherein the control device outputs information about exchange of tablet cases to the information output device on the basis of the identification information read by the reader.

4. The medicine supply apparatus according to claim 3, wherein the information about exchange of tablet cases includes information indicating medicines to be accommodated within the case accommodating section.

5. The medicine supply apparatus according to claim 3, wherein the information output device is a display device.

6. The medicine supply apparatus of claim 1, wherein the control device is configured to output information about exchange of tablet cases that includes information about frequency of preparation of the exchangeable tablet cases.

7. The medicine supply apparatus of claim 6, wherein the control device is configured to order tablet cases having a lower frequency of preparation before tablet cases having a higher frequency of preparation.

8. A medicine supply apparatus, comprising a plurality of tablet cases for accommodating medicines; a case accommodating section for accommodating the plurality of tablet cases and which selects a tablet case accommodating a designated medicine, takes the medicine out of the tablet case, and charges the same into a container; an identifier that is provided at each of the tablet cases and indicates identification information for the tablet case;

a reader for reading, in a non-contact manner, the identification information indicated by the identifiers for the tablet cases provided within the case accommodating section, wherein selection of the tablet case accommodating the designated medicine is controlled on the basis of the identification information read by the reader and a control device having a microcomputer and a memory with computer implemented instructions that when executed cause the microcomputer to receive prescription data, store the data in a prescribed medicine table and output information about exchange of tablet cases including an indication of tablet cases positioned in the case accommodating section that accommodate medicines not listed in the prescribed medicine table.

9. The medicine supply apparatus according to claim 8, wherein the identifier is an optically readable identification code provided on a surface of each of the tablet cases, and the reader is an optical sensor for reading the identification code.

10. The medicine supply apparatus of claim 8, wherein the control device is configured to output information about exchange of tablet cases that includes information about frequency of preparation of the exchangeable tablet cases.

11. The medicine supply apparatus of claim 10, wherein the control device is configured to order tablet cases having a lower frequency of preparation before tablet cases having a higher frequency of preparation.

12. A medicine supply apparatus, comprising a plurality of tablet cases for accommodating medicines, provided within a case accommodating section of a main body; a chute through which medicines discharged from the tablet cases pass; a hopper provided below the chute; a charging device for charging medicines received by the hopper into a container, the medicine supply apparatus comprising: identification means that is provided at each of the tablet cases and has identification information for identifying the tablet case; a reader for reading, in a non-contact manner, the identification information in the identification means for the tablet cases provided within the case accommodating section; a control device for controlling discharge of medicine from tablet cases on the basis of the identification information read by the reader and an information output device, the control device having a microcomputer and a memory with computer implemented instructions that when executed cause the microcomputer to output information about exchange of tablet cases to the information output device on the basis of the identification information read by the reader that includes information for indicating the accommodated positions of the tablet cases accommodating medicines which are not designated among the tablet cases accommodated within the case accommodating section, as exchangeable medicines.

13. A medicine supply apparatus for use with a plurality of medicines and prescription data, comprising a plurality of tablet cases adapted to receive the plurality of medicines, a container, a case accommodating section for receiving the plurality of tablet cases and configured to select one of the plurality of tablet cases corresponding to a designated one of the plurality of medicines, remove such medicine from such tablet case and load such medicine into the container, an identifier provided on each of the plurality of tablet cases and containing identification information for the respective tablet case, a reader for reading the identification information contained in the identifier for each of the plurality of tablet cases in the case accommodating section and a control device having a microcomputer and a memory with computer-implemented instructions that when executed cause the microcomputer to receive the prescription data, store the prescription data in a medicine table and output information about exchange of the plurality of tablet cases in the case accommodating section and including an indication of at least certain of the plurality of tablet cases in the case accommodating section that contain medicines not listed in the medicine table.

14. The medicine supply apparatus of claim 13 wherein the reader is configured to read the identification information in a non-contact manner.

15. The medicine supply apparatus of claim 13, wherein the identifier is an optically readable identification code provided on a surface of each of the tablet cases, and the reader is an optical sensor for reading the identification code.

16. The medicine supply apparatus of claim 13, wherein the control device is configured to output information about exchange of the plurality of tablet cases in the case accommodating section that includes information about frequency of preparation of each of the plurality of tablet cases.

17. The medicine supply apparatus of claim 16, wherein the control device is configured to order tablet cases having a lower frequency of preparation before tablet cases having a higher frequency of preparation.

* * * * *